United States Patent
Li et al.

(10) Patent No.: US 12,293,852 B2
(45) Date of Patent: *May 6, 2025

(54) MIXED IONIC-ELECTRONIC CONDUCTIVE MATERIALS FOR ALKALI METAL TRANSPORT DURING BATTERY CYCLING, AND BATTERIES INCORPORATING SAME

(71) Applicant: Massachusetts Institute of Technology, Cambridge, MA (US)

(72) Inventors: Ju Li, Weston, MA (US); Andrea Maurano, Somerville, MA (US); Yuming Chen, Cambridge, MA (US); Ziqiang Wang, Cambridge, MA (US); So Yeon Kim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 559 days.

This patent is subject to a terminal disclaimer.

(21) Appl. No.: 17/694,174

(22) Filed: Mar. 14, 2022

(65) Prior Publication Data
US 2022/0208410 A1  Jun. 30, 2022

Related U.S. Application Data

(63) Continuation-in-part of application No. 16/499,656, filed as application No. PCT/US2019/052422 on Sep. 23, 2019, now Pat. No. 11,482,708.
(Continued)

(51) Int. Cl.
*H01M 4/00* (2006.01)
*H01B 1/02* (2006.01)
(Continued)

(52) U.S. Cl.
CPC ............... *H01B 1/02* (2013.01); *H01B 1/06* (2013.01); *H01M 4/485* (2013.01); *H01M 4/505* (2013.01);
(Continued)

(58) Field of Classification Search
CPC .. H01M 10/056; H01M 10/0565; H01M 4/13; H01M 2300/0094; H01M 4/133; H01M 1/134; H01M 4/381; H01M 4/134
See application file for complete search history.

(56) References Cited

U.S. PATENT DOCUMENTS

| | | | |
|---|---|---|---|
| 4,436,796 A * | 3/1984 | Huggins | H01M 4/40 429/231.95 |
| 10,700,377 B2 | 6/2020 | Thomas-Alyea et al. | |

(Continued)

FOREIGN PATENT DOCUMENTS

| | | |
|---|---|---|
| CN | 103602843 A | 2/2014 |
| WO | 2011038773 A1 | 4/2011 |
| WO | 2017116599 A2 | 7/2017 |

OTHER PUBLICATIONS

Armstrong et al., "The breakdown of β-alumina ceramic electrolyte." Electrochimica acta 19.5 (1974): 187-192.
(Continued)

*Primary Examiner* — Anca Eoff
*Assistant Examiner* — Monique M Wills
(74) *Attorney, Agent, or Firm* — Smith Baluch LLP

(57) ABSTRACT

A mixed ionic-electronic conductor (MIEC) in contact with a solid electrolyte includes a material having a bandgap less than 3 eV. The material includes an end-member phase directly connected to an alkali metal by a tie-line in an equilibrium phase diagram. The material is thermodynamically stable with a solid electrolyte. The MIEC includes plurality of open pores, formed within the MIEC, to facilitate motion of the alkali metal to at least one of store the alkali metal in the plurality of open pores or release the alkali metal from the plurality of open pores. The solid electrolyte has an ionic conductivity to ions of the alkali
(Continued)

metal greater than 1 mS cm$^{-1}$, a thickness less than 100 µm, and comprises at least one of a ceramic or a polymer.

20 Claims, 89 Drawing Sheets

Related U.S. Application Data

(60) Provisional application No. 62/734,564, filed on Sep. 21, 2018.

(51) Int. Cl.
    *H01B 1/06*     (2006.01)
    *H01M 4/485*     (2010.01)
    *H01M 4/505*     (2010.01)
    *H01M 4/525*     (2010.01)
    *H01M 10/0565*     (2010.01)
    *H01M 50/00*     (2021.01)

(52) U.S. Cl.
    CPC ....... *H01M 4/525* (2013.01); *H01M 10/0565* (2013.01); *H01M 2300/0082* (2013.01); *H01M 2300/0085* (2013.01)

(56) References Cited

U.S. PATENT DOCUMENTS

| | | | |
|---|---|---|---|
| 2008/0179104 | A1 | 7/2008 | Zhang et al. |
| 2009/0176090 | A1 | 7/2009 | So et al. |
| 2010/0203351 | A1 | 8/2010 | Nayfeh |
| 2011/0061942 | A1 | 3/2011 | DiGiovanni |
| 2012/0210823 | A1 | 8/2012 | Lee et al. |
| 2013/0059074 | A1 | 3/2013 | Xu et al. |
| 2016/0344016 | A1 | 11/2016 | Biswal et al. |
| 2018/0126456 | A1 | 5/2018 | So et al. |
| 2020/0328423 | A1 | 10/2020 | Li et al. |
| 2022/0052374 | A1 | 2/2022 | Maurano et al. |

OTHER PUBLICATIONS

Basak et al. "Towards optimization of experimental parameters for studying Li—O2 battery discharge products in TEM using in situ EELS." Ultramicroscopy 188 (2018): 52-58.
Chen et al. "Li metal deposition and stripping in a solid-state battery via Coble creep." Nature 578.7794 (2020): 251-255.
Chen et al., "Nitrogen-doped carbon for sodium-ion battery anode by self-etching and graphitization of bimetallic MOF-based composite." Chem 3.1 (2017): 152-163.
Egerton et al., "Radiation damage in the TEM and SEM." Micron 35.6 (2004): 399-409.
Esawi et al., "Effect of carbon nanotube (CNT) content on the mechanical properties of CNT-reinforced aluminium composites." Composites Science and Technology 70.16 (2010): 2237-2241.
Fu et al. "Toward garnet electrolyte-based Li metal batteries: an ultrathin, highly effective, artificial solid-state electrolyte/metallic Li interface. Sci. Adv. 3, e1601659 (2017)." (2017): 59. (12 pages).
Han et al. "Negating interfacial impedance in garnet-based solid-state Li metal batteries." Nature materials 16.5 (2017): 572-579.
He et al., "High dislocation density-induced large ductility in deformed and partitioned steels." Science 357.6355 (2017): 1029-1032.
Herring, "Diffusional viscosity of a polycrystalline solid." Journal of applied physics 21.5 (1950): 437-445.
Huang et al., "Nanowire liquid pumps." Nature nanotechnology 8.4 (2013): 277. 5 pages.
International Search Report and Written Opinion in International Patent Application No. PCT/US2019/052422 mailed Dec. 11, 2019, 9 pages.
International Search Report and Written Opinion issued by the International Searching Authority in regards to International Patent Application No. PCT/US16/21781, mailed Jun. 27, 2016, 9 pages.
Jin et al., "3D lithium metal embedded within lithiophilic porous matrix for stable lithium metal batteries." Nano Energy 37 (2017): 177-186.
Kushima et al., "Liquid cell transmission electron microscopy observation of lithium metal growth and dissolution: Root growth, dead lithium and lithium flotsams." Nano Energy 32 (2017): 271-279.
Li et al., "Atomic structure of sensitive battery materials and interfaces revealed by cryo-electron microscopy." Science 358.6362 (2017): 506-510.
Li et al., "Developing high-performance lithium metal anode in liquid electrolytes: challenges and Progress." Advanced Materials 30.17 (2018): 1706375.
Li et al., "Mastering the interface for advanced all-solid-state lithium rechargeable batteries." Proceedings of the National Academy of Sciences 113.47 (2016): 13313-13317.
Liang et al., "Composite lithium metal anode by melt infusion of lithium into a 3D conducting scaffold with lithiophilic coating." Proceedings of the National Academy of Sciences 113.11 (2016): 2862-2867.
Lin et al., "Layered reduced graphene oxide with nanoscale interlayer gaps as a stable host for lithium metal anodes." Nature nanotechnology 11.7 (2016): 626-632.
Liu et al., "Lithium-coated polymeric matrix as a minimum volume-change and dendrite-free lithium metal anode." Nature communications 7 (2016): 10992. 9 pages.
Liu et al., "Sequential self-folding of polymer sheets." Science Advances 3.3 (2017): e1602417. 8 pages.
Liu et al., "Significance of interfaces in solid-state cells with porous electrodes of mixed ionic-electronic conductors." Solid State Ionics 107.1-2 (1998): 105-110.
Liu et al., "Transforming from planar to three-dimensional lithium with flowable interphase for solid lithium metal batteries." Science advances 3.10 (2017): eaao0713. 11 pages.
Lu et al., "High-performance anode materials for rechargeable lithium-ion batteries." Electrochemical Energy Reviews 1.1 (2018): 35-53.
Lv et al., "Application of the soluble salt-assisted route to scalable synthesis of ZnO nanopowder with repeated photocatalytic activity." Nanotechnology 23.6 (2012): 065402. 9 pages.
Mali et al., "6Li and 7Li diffusion coefficients in solid lithium measured by the NMR pulsed field gradient technique." Journal of Physics F: Metal Physics 18.3 (1988): 403. 11 pages.
Malis et al., "EELS log-ratio technique for specimen-thickness measurement in the TEM." Journal of electron microscopy technique 8.2 (1988): 193-200.
Manthiram et al., "Lithium battery chemistries enabled by solid-state electrolytes." Nature Reviews Materials 2.4 (2017): 16103, 16 pages.
Nitta et al., "High-capacity anode materials for lithium-ion batteries: choice of elements and structures for active particles." Particle & Particle Systems Characterization 31.3 (2014): 317-336.
Porz et al., "Mechanism of lithium metal penetration through inorganic solid electrolytes." Advanced Energy Materials 7.20 (2017): 1701003. 12 pages.
Richards et al., "Interface stability in solid-state batteries." Chemistry of Materials 28.1 (2016): 266-273.
Saito et al., Physical properties of carbon nanotubes—7.5 Coiled Carbon Nanotubes. World scientific, 1998. pp. 130-135.
Shen et al., "Load transfer issues in the tensile and compressive behavior of multiwall carbon nanotubes." Materials Science and Engineering: A 429.1-2 (2006): 66-73.
Sun et al., "Liquid-like pseudoelasticity of sub-10-nm crystalline silver particles." Nature materials 13.11 (2014): 1007-1012.
Suo et al., "Fluorine-donating electrolytes enable highly reversible 5-V-class Li metal batteries." Proceedings of the National Academy of Sciences 115.6 (2018): 1156-1161.
Wang et al., Selective targeting of gold nanorods at the mitochondria of cancer cells: implications for cancer therapy. Nano letters 11.2 (2011): 772-780.

(56) References Cited

OTHER PUBLICATIONS

Xie et al., "In situ study of the initiation of hydrogen bubbles at the aluminium metal/oxide interface." Nature materials 14.9 (2015): 899-903.

Yang et al. "Continuous plating/stripping behavior of solid-state lithium metal anode in a 3D ion-conductive framework." Proceedings of the National Academy of Sciences 115.15 (2018): 3770-3775.

Yang et al., "Liquid-like, self-healing aluminum oxide during deformation at room temperature." Nano letters 18.4 (2018): 2492-2497.

Yang et al., "Protected Lithium-Metal Anodes in Batteries: From Liquid to Solid." Advanced materials 29.36 (2017): 1701169. 28 pages.

Yuan et al., "Understanding materials challenges for rechargeable ion batteries with in situ transmission electron microscopy." Nature communications 8.1 (2017): 1-14.

Zhang et al., "High-capacity, low-tortuosity, and channel-guided lithium metal anode." Proceedings of the National Academy of Sciences 114.14 (2017): 3584-3589.

Zhang et al., "Li2O-reinforced Cu nanoclusters as porous structure for dendrite-free and long-lifespan lithium metal anode." ACS applied materials & interfaces 8.40 (2016): 26801-26808.

Zhang et al., "Lithiophilic sites in doped graphene guide uniform lithium nucleation for dendrite-free lithium metal anodes." Angewandte Chemie International Edition 56.27 (2017): 7764-7768.

Zhao et al., "Air-stable and freestanding lithium alloy/graphene foil as an alternative to lithium metal anodes." Nature nanotechnology 12.10 (2017): 993-999.

Zheng et al. "Beam-assisted large elongation of in situ formed Li2O nanowires." Scientific reports 2.1 (2012): 1-4.

Zhu et al. "High rate and stable solid-state lithium metal batteries enabled by electronic and ionic mixed conducting network interlayers." ACS applied materials & interfaces 11.18 (2019): 16578-16585.

Zhu et al., "Ultra-strength materials." Progress in Materials Science 55.7 (2010): 710-757.

\* cited by examiner

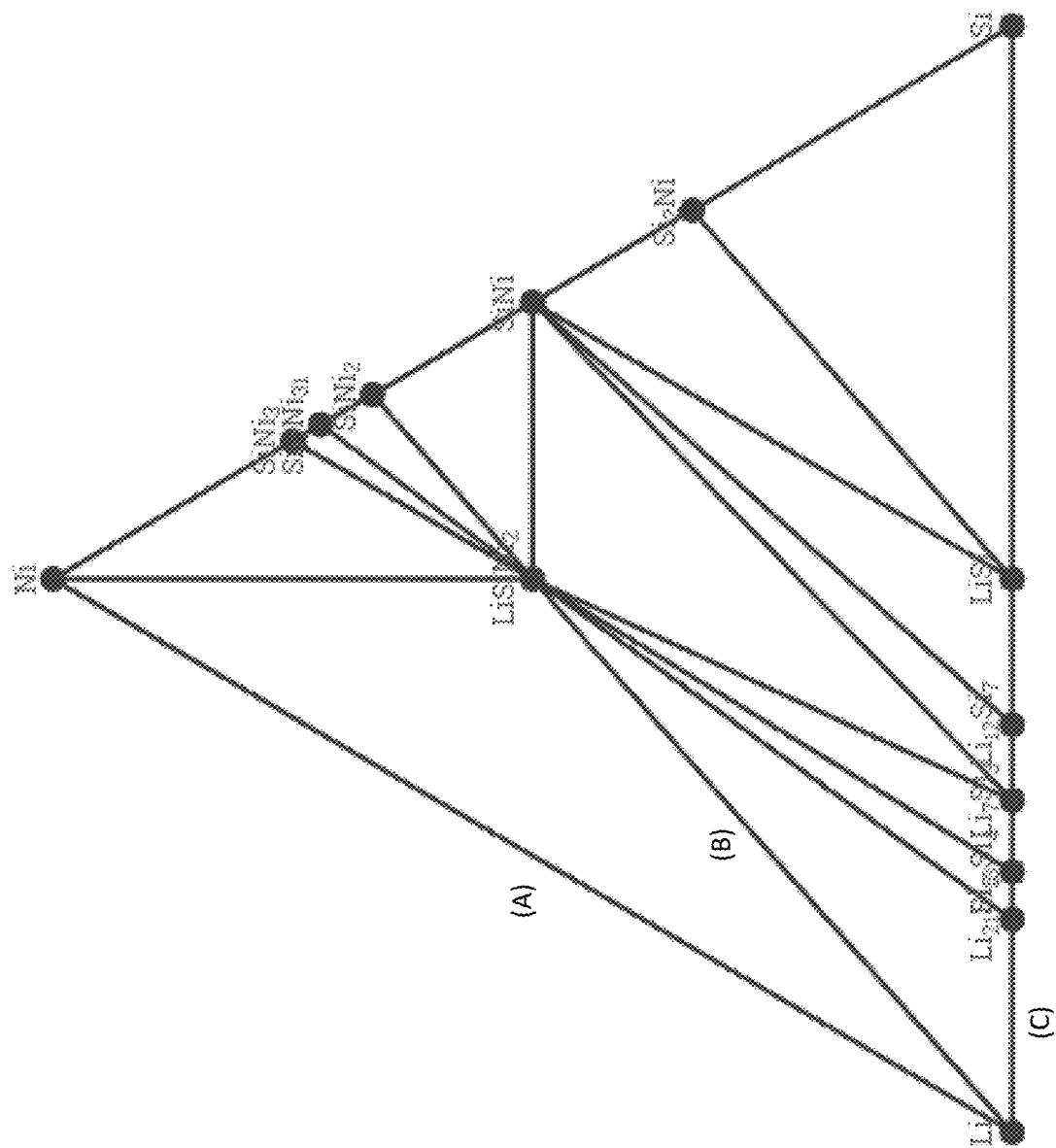

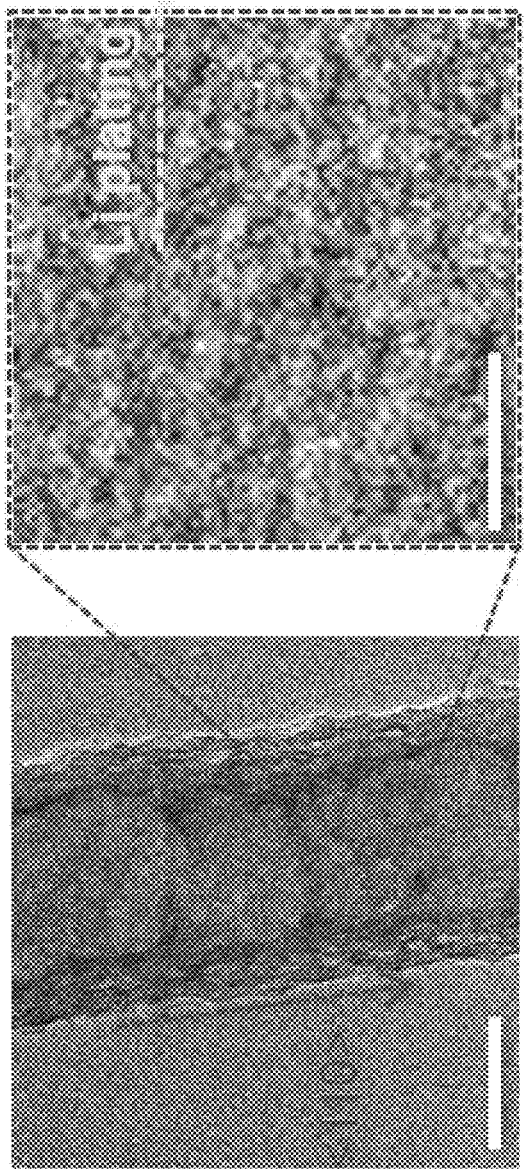
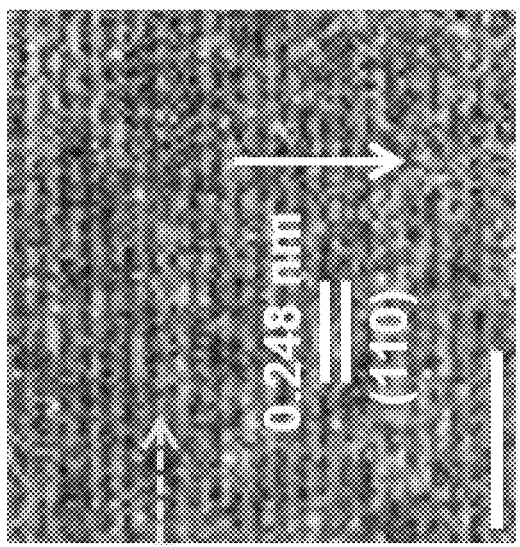
FIG. 14A
FIG. 14B
FIG. 14C

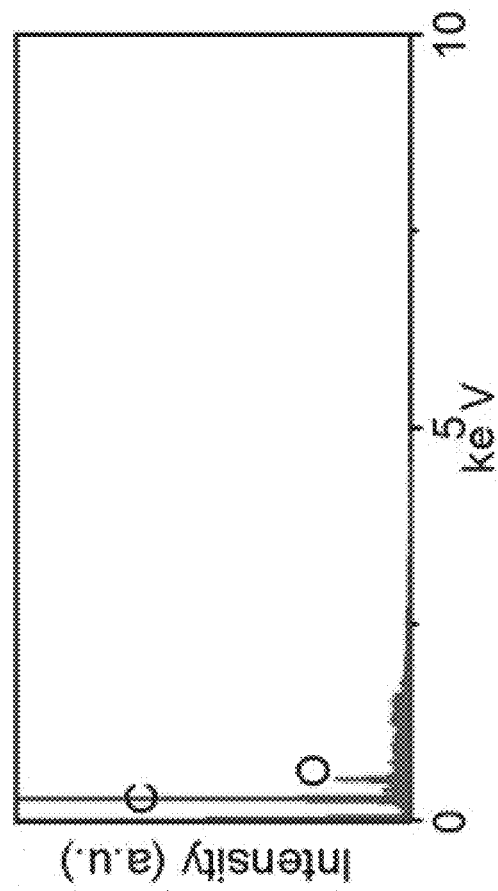
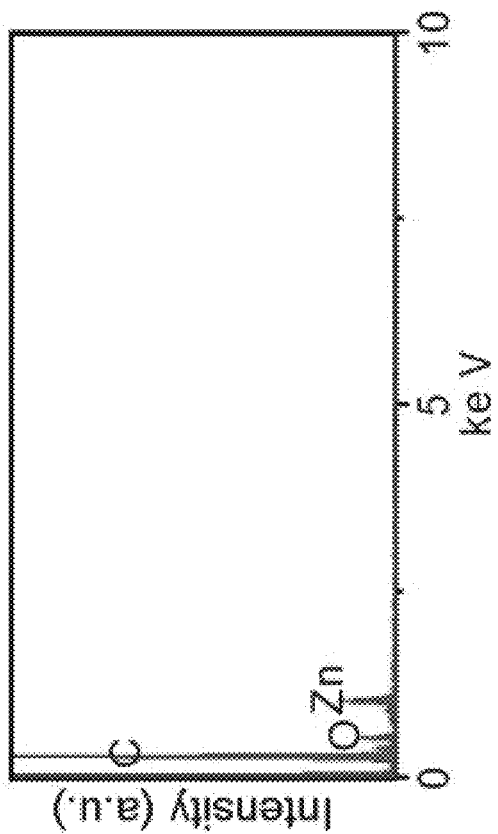
FIG. 28A
FIG. 28B

| Binding Energy (eV) | |
|---|---|
| Element | Atom (%) |
| O | 10.01 |
| Zn | 2.03 |
| Before acid treatment | |
| O | 9.09 |
| After acid treatment | |

FIG. 29

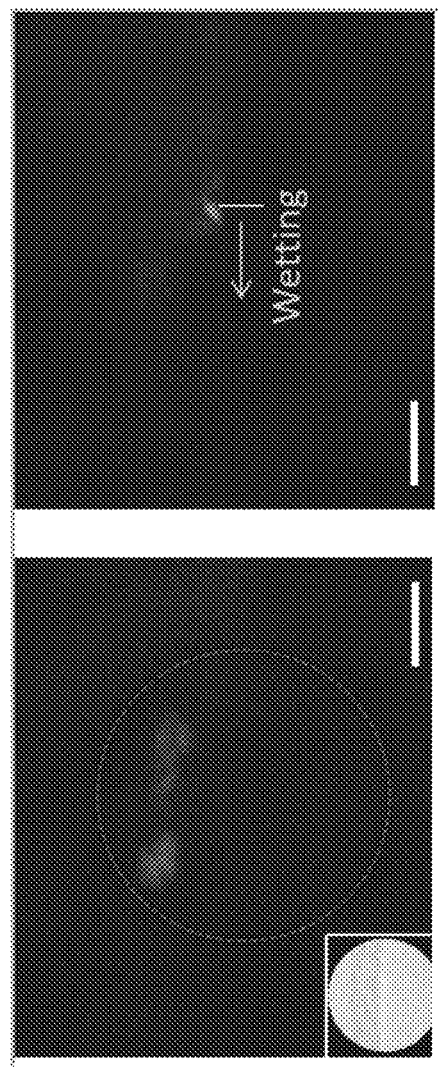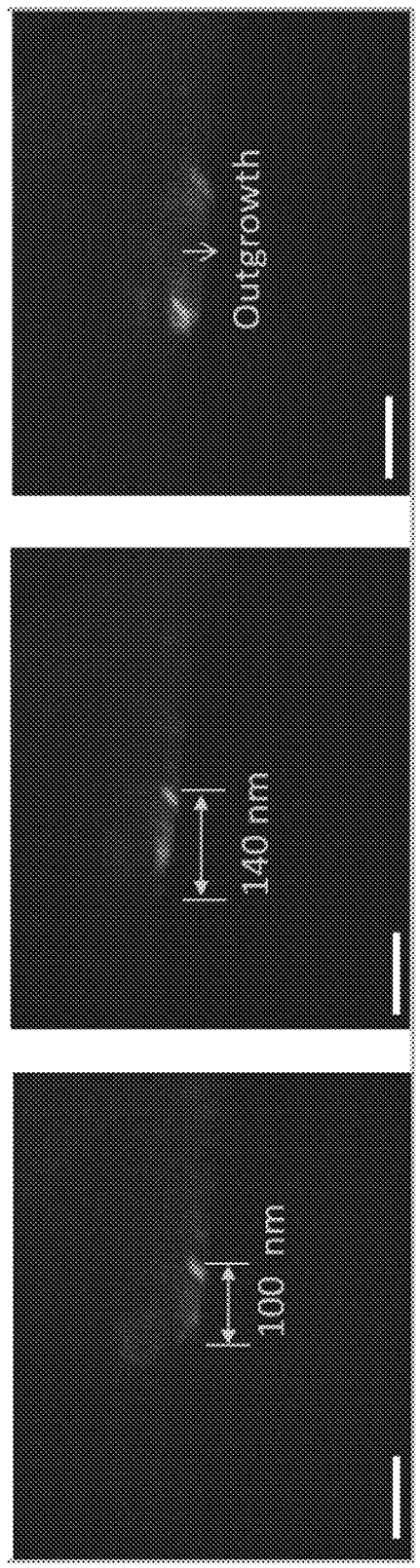
FIG. 30A  FIG. 30B  FIG. 30C  FIG. 30D  FIG. 30E

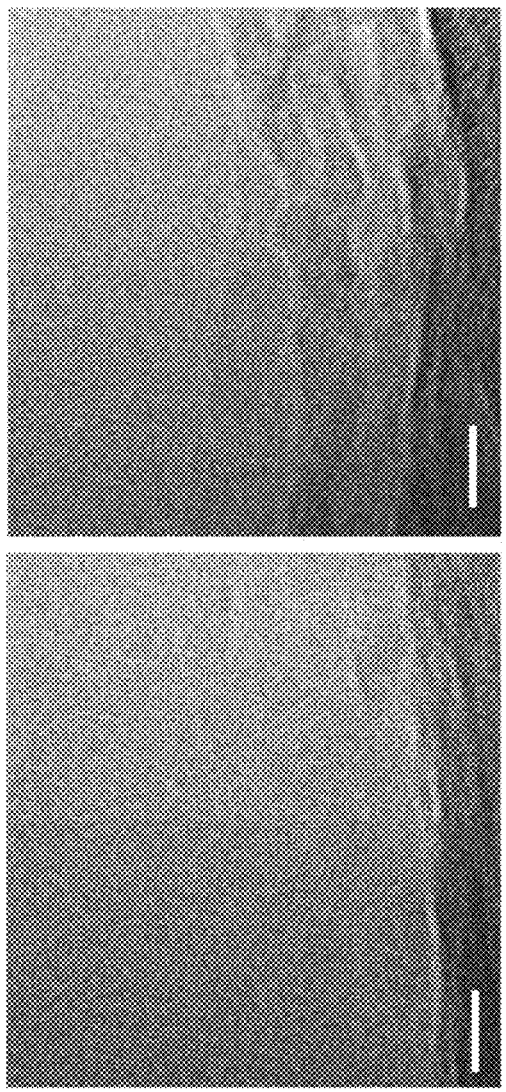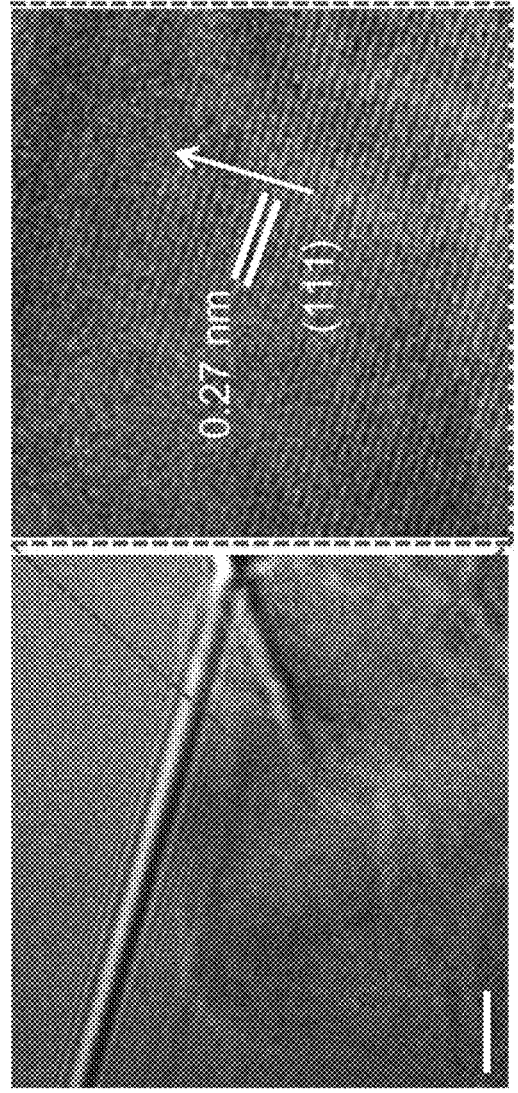
FIG. 32A  FIG. 32B  FIG. 32C  FIG. 32D

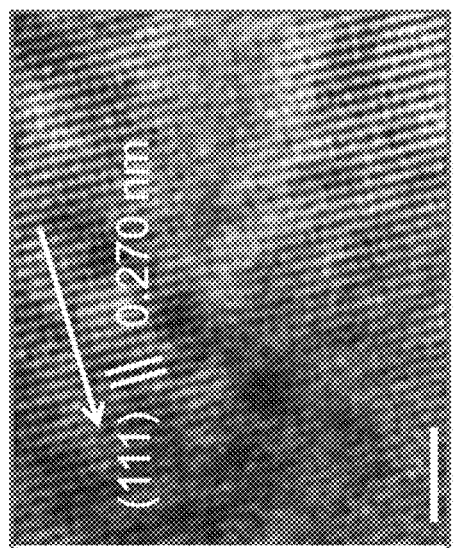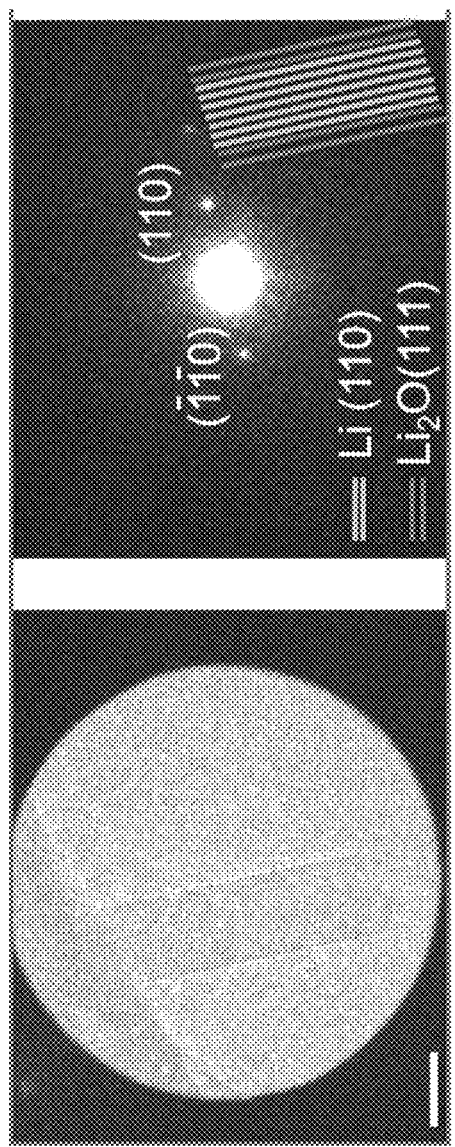
FIG. 34C
FIG. 34B
FIG. 34A

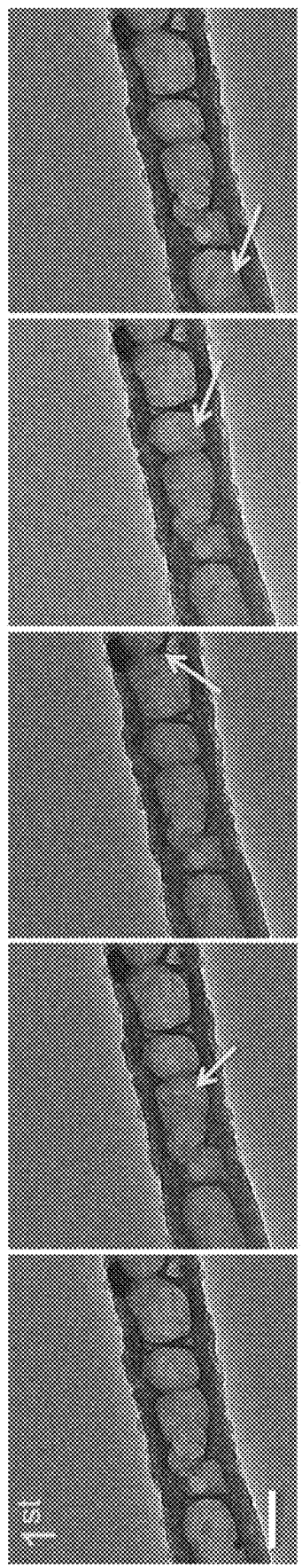
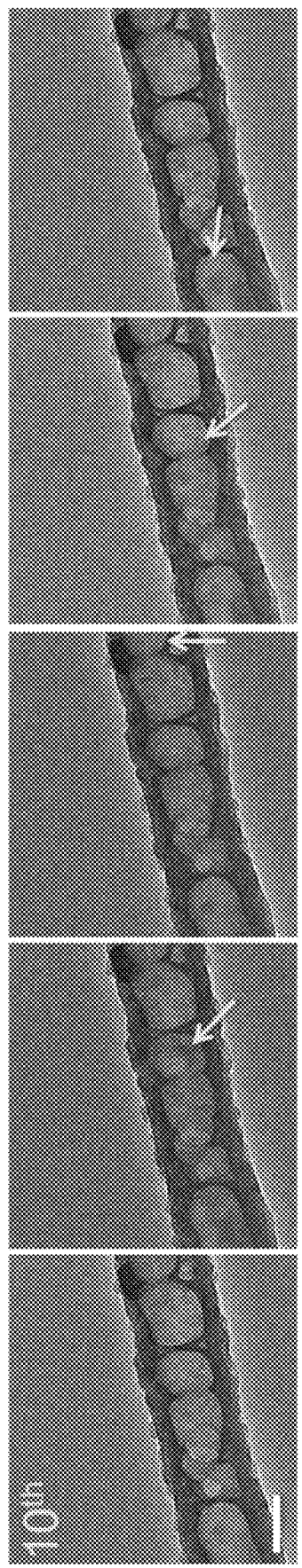
FIG. 37A
FIG. 37B

MIXED IONIC-ELECTRONIC CONDUCTIVE MATERIALS FOR ALKALI METAL TRANSPORT DURING BATTERY CYCLING, AND BATTERIES INCORPORATING SAME

CROSS-REFERENCE TO RELATED PATENT APPLICATION(S)

This application is a continuation-in-part application of U.S. nonprovisional application Ser. No. 16/499,656, filed on Sep. 30, 2019, entitled "METHODS AND APPARATUS TO FACILITATE ALKALI METAL TRANSPORT DURING BATTERY CYCLING, AND BATTERIES INCORPORATING SAME," which is a National Stage application under 35 U.S.C. § 371 of International Application No. PCT/US2019/052422, filed on Sep. 23, 2019, entitled, "METHODS AND APPARATUS TO FACILITATE ALKALI METAL TRANSPORT DURING BATTERY CYCLING, AND BATTERIES INCORPORATING SAME," which in turn claims priority to U.S. Provisional Application No. 62/734,564, filed on Sep. 21, 2018, entitled "RAIL-GUIDED Li METAL PLATING/STRIPPING FOR SOLID-STATE Li BATTERIES." Each of the aforementioned applications is incorporated herein by reference in its entirety.

GOVERNMENT SUPPORT STATEMENT

This invention was made with government support under DE-SC0002633 awarded by the Department of Energy, and ECCS-1610806 awarded by the National Science Foundation. The government has certain rights in the invention.

BACKGROUND

An all-solid-state battery (also referred to herein as "a solid-state battery") includes a solid anode, a solid cathode, and a solid electrolyte disposed between the anode and the cathode. Compared to a conventional battery that uses a liquid electrolyte, a solid-state battery may achieve a higher energy density due, in part, to the solid electrolyte occupying a smaller volume, thus enabling the battery to be packaged more compactly. The energy density of the solid-state battery may be further enhanced by using a pure alkali metal anode. For example, the theoretical gravimetric capacity of pure lithium (Li) is 3861 mAh/g, which is ten times larger than the theoretical gravimetric capacity of conventional graphite anodes at 372 mAh/g. Although the density of Li (0.534 g/cm$^3$) is lower than graphite (1.6 g/cm$^3$), the volumetric capacity of Li (3861 mAh/g×0.534 g/cm$^3$=2062 mAh/cm$^3$) is still three times larger than graphite (372 mAh/g×1.6 g/cm$^3$=600 mAh/cm$^3$). Furthermore, the solid-state battery may be safer and more durable than a conventional battery because (1) the solid electrolyte may be formed from materials that are less flammable and less toxic than conventional liquid electrolytes and (2) the solid electrolyte does not leak unlike a liquid electrolyte.

SUMMARY

Disclosed herein is a mixed ionic-electronic conductor (MIEC). Embodiments of the MIEC include a material having a bandgap less than 3 eV. The material includes an end-member phase directly connected to an alkali metal by a tie-line in an equilibrium phase diagram. The material is thermodynamically stable with a solid electrolyte. The MIEC includes a plurality of open pores, formed within the MIEC, to facilitate motion of the alkali metal to at least one of store the alkali metal in the plurality of open pores or release the alkali metal from the plurality of open pores. The solid electrolyte is ionically conductive to ions of the alkali metal. The solid electrolyte has an ionic conductivity to ions of the alkali metal greater than 1 mS cm$^{-1}$, a thickness less than 100 μm, and includes at least one of a ceramic or a polymer. In one embodiment, the material may exclude any lanthanides and/or any rare earth metals.

In an embodiment, the solid electrolyte includes the polymer. The polymer may include at least one of a polyethylene, a polypropylene, a polyethylene oxide, a polyacetal, a polyolefin, a poly(alkylene oxide), a polymethacrylate, a polycarbonate, a polystyrene, a polyester, a polyamide, a polyimide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone, a polybenzoxazole, a polyphthalide, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyethylene terephthalate, a polybutylene terephthalate, a polyurethane, an ethylene propylene diene rubber, a polytetrafluoroethylene, a fluorinated ethylene propylene, a perfluoroalkoxyethylene, a polychlorotrifluoroethylene, or a polyvinylidene fluoride.

In another embodiment, the solid electrolyte includes the ceramic. The ceramic may include at least one of Li$_7$La$_3$Zr$_2$O$_{12}$; Li$_3$OX wherein X is at least one of Cl, Br, or I; Li$_3$SX wherein X is at least one of Cl, Br, or I; Li$_{1.3}$Al$_{0.3}$Ti$_{1.7}$(PO$_4$)$_3$; Li$_6$PS$_5$Cl; Li$_{10}$MP$_2$S$_{12}$ wherein M is at least one of Ge, Si, or Sn; Li$_3$PS$_4$; Li$_7$P$_3$Sn; Li$_3$N; Li$_2$S; LiBH$_4$; Li$_3$BO$_3$; Li$_2$S—P$_2$S$_5$; Li$_2$S—P$_2$S$_5$-L$_4$SiO$_4$; Li$_2$S—Ga$_2$S$_3$—GeS$_2$; Li$_2$S—Sb$_2$S$_3$—GeS$_2$; Li$_{3.25}$—Ge$_{0.25}$—P$_{0.75}$S$_4$; (La$_{1-x}$Li$_x$)TiO$_3$ wherein 0<x<1; Li$_6$La$_2$CaTa$_2$O$_{12}$; Li$_6$La$_2$ANb$_2$O$_{12}$ wherein A is at least one of Ca, Sr, or Ba; Li$_6$La$_3$Zr$_{1.5}$WO$_{12}$; Li$_{6.5}$La$_3$Zr$_{1.5}$TaO$_{12}$; Li$_{6.625}$Al$_{0.25}$La$_3$Zr$_2$O$_{12}$; Li$_3$BO$_{2.5}$N$_{0.5}$; Li$_9$SiAlO$_8$; Li$_{1+x}$Al$_x$Ge$_{2-x}$(PO$_4$)$_3$; Li$_{1+x}$Al$_x$Ti$_{2-x}$(PO$_4$)$_3$; Li$_{1+x}$Ti$_{2-x}$Al$_x$Si$_y$(PO$_4$)$_{3-y}$ wherein 0<x<1 and 0≤y<1; LiAl$_x$Zr$_{2-x}$(PO$_4$)$_3$; LiTi$_x$Zr$_{2-x}$(PO$_4$)$_3$ wherein 0<x<2; Li$_6$PS$_5$X, wherein X is at least one of Cl, Br, or I; Li$_2$In$_x$Sc$_{0.666-x}$Cl$_4$ wherein 0≤x≤0.666; or Li$_{3-x}$E$_{1-x}$Zr$_x$Cl$_6$ wherein E is at least one of Y or Er.

In another embodiment, the solid electrolyte may include at least one of a polyether solid electrolyte, a thiophosphate solid electrolyte, or a garnet-type solid electrolyte. The solid electrolyte may include the polyether solid electrolyte, which may include polyethylene oxide (PEO). The solid electrolyte may include the thiophosphate solid electrolyte, which may include Li$_{10}$GeP$_2$S$_{12}$ (LGPS) or Li$_6$PS$_5$X, wherein X is at least one of Cl, Br, or. The solid electrolyte may include the garnet-type solid electrolyte, which may include Li$_7$La$_3$Zr$_2$O (LLZO).

Another embodiment of the present technology includes an anode. The anode includes the MIEC described above, where the MIEC does not reversibly store and release the alkali metal. The anode's MIEC may have a thickness of about 0.5 μm to about 67 μm. The MIEC may have a porosity greater than 45%. The anode may have an areal capacity of about 6±0.5 mAh cm$^{-2}$. The anode may include the alkali metal. Another embodiment of the present technology includes a battery. The battery includes the anode described above and the solid electrolyte described above.

Another embodiment of the present technology includes an anode including a MIEC. The MIEC includes at least one of $A_xB_y$, $A_xB_yC$, or $A_xB_yC_zD_w$ and a plurality of open pores, formed within the MIEC, to facilitate motion of an alkali metal to at least one of store the alkali metal in the plurality of open pores or release the alkali metal from the plurality of open pores. The MIEC does not reversibly store and release the alkali metal. The at least one of $A_xB_y$, $A_xB_yC_z$, or $A_xB_yC_zD_w$ includes an end-member phase directly connected to an alkali metal by a tie-line in an equilibrium phase diagram. A is an alkali metal. At least one of B or C is at least one of an alkaline earth metal, a group 13 element, Sc, Y, Ti, Zr, Hf, V, Nb, Ta, Cr, Mo, W, Mn, Fe, Co, Ni, Cu, Zn, Cd, Hg, C, N, Si, Sn, Pb, Bi, La, Ce, Nd, Sm, Eu, Gd, Ho, Er, or Yb. X, y, z, and w each have a value of about 1 to about 149.

Both B and C may be at least one of an alkaline earth metal, a group 13 element, Sc, Y, Ti, Zr, Hf, V, Nb, Ta, Cr, Mo, W, Mn, Fe, Co, Ni, Cu, Zn, Cd, Hg, C, N, Si, Sn, Pb, Bi, La, Ce, Nd, Sm, Eu, Gd, Ho, Er, or Yb. B may be an alkaline earth metal. B may be a group 13 element. B may be a period 4 transition metal. B may be a period 5 transition metal. B may be a period 6 transition metal. B may be a lanthanide.

Another embodiment of the present technology includes an anode. The anode includes the MIEC described above, and a plurality of open pores, formed within the MIEC, to facilitate motion of an alkali metal to store the alkali metal in the plurality of open pores and/or release the alkali metal from the plurality of open pores. The MIEC does not reversibly store and/or release the alkali metal. The alkali metal may include at least one of lithium (Li), sodium (Na), or potassium (K).

Another embodiment of the present technology includes an anode. The anode MIEC including $Ti_wAl_xC_yNi_z$ and a plurality of open pores, formed within the MIEC, to facilitate motion of an alkali metal to store the alkali metal in the plurality of open pores and/or release the alkali metal from the plurality of open pores. W, x, y, and z each have a value less than or equal to 8.

Another embodiment of the present technology includes a battery including the anode described above and a solid electrolyte. The solid electrolyte is coupled to a portion of the MIEC. The solid electrolyte includes polyethylene oxide (PEO).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 7C shows an exemplary equilibrium phase diagram between Li, Si, and nickel (Ni).

The diffraction spots located on the red dashed circle correspond to the lattice spacing for (110) BCC Li planes of 0.248 nm. The scale bar is 5 nm$^{-1}$.

Figure 13:
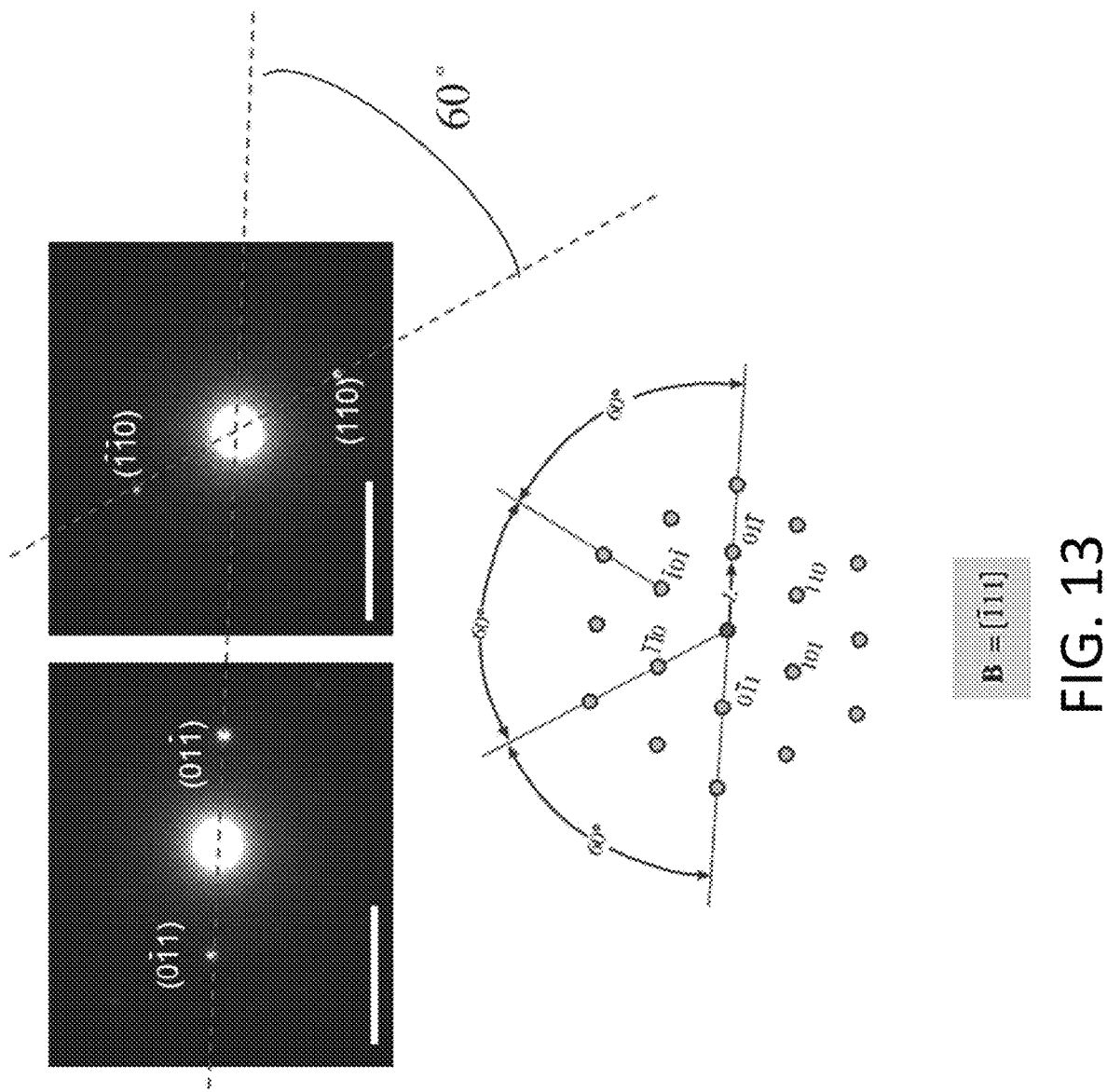

FIG. 13 shows SAED patterns of an exemplary CHT obtained after Li plating, which are used to determine the crystal phase of the Li. The diffraction patterns were recorded with a camera length of 100 cm. The scale bars are 5 nm$^{1}$.

FIG. 14A shows a high resolution transmission electron microscope (HRTEM) image of a Li crystal forming with (110) crystal planes inside a CHT. The scale bar is 100 nm.

FIG. 14B shows a magnified HRTEM image of the CHT of FIG. 14A before Li deposition.

The scale bar is 2 nm.

FIG. 14C shows a magnified HRTEM image of the CHT of FIG. 14A after Li deposition.

The scale bar is 2 nm.

Figure 15B:
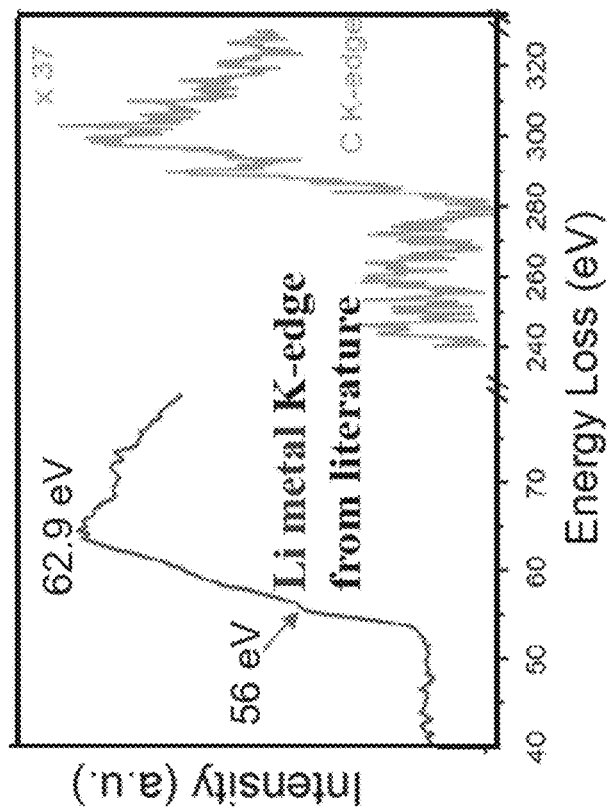
Figure 15A:
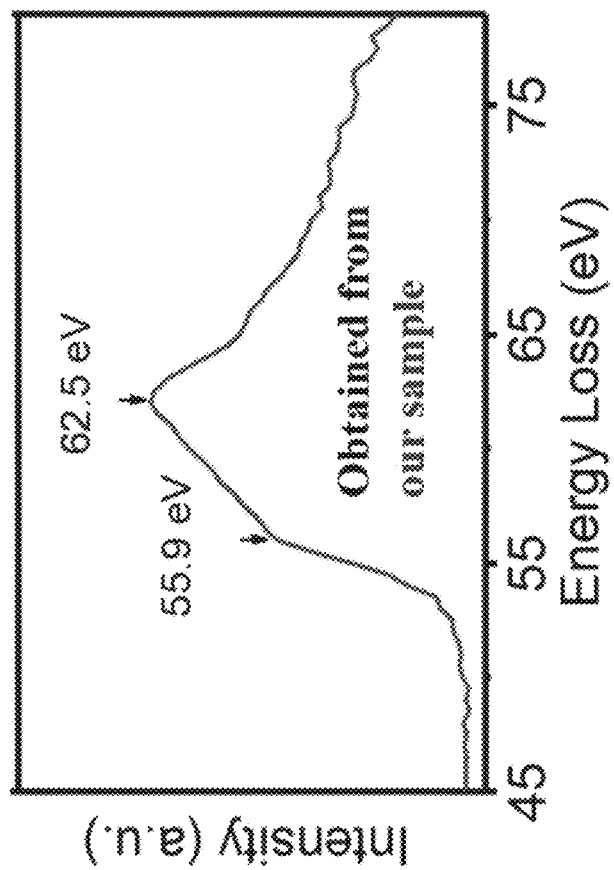

FIG. 15A shows electron energy loss spectroscopy (EELS) spectra of the Li K-edge measured after Li deposition inside a CHT.

FIG. 15B shows a reference EELS spectra of the Li K-edge for a Li metal dendrite measured at cryogenic conditions. [Li, Y. et al., Science 358, 506-510 (2017)]

Figure 16B:
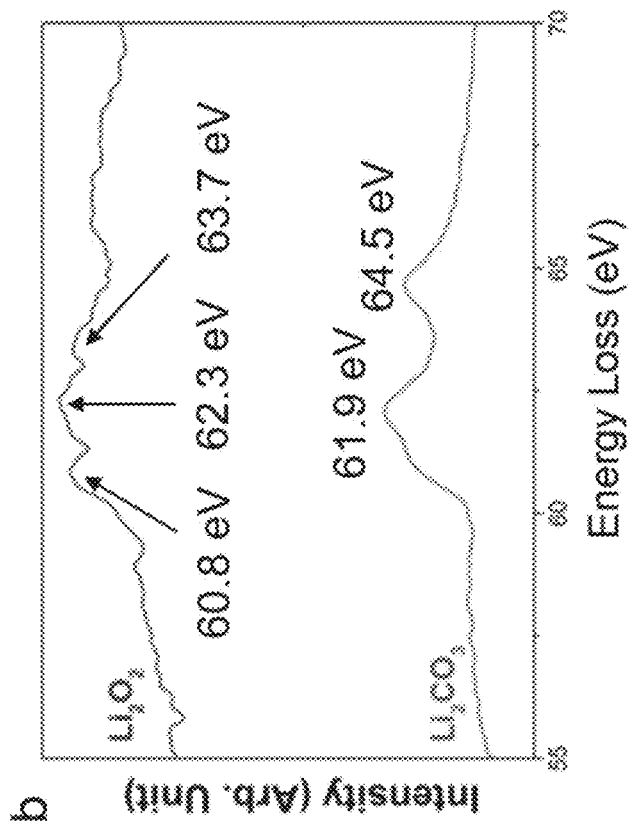
Figure 16A:
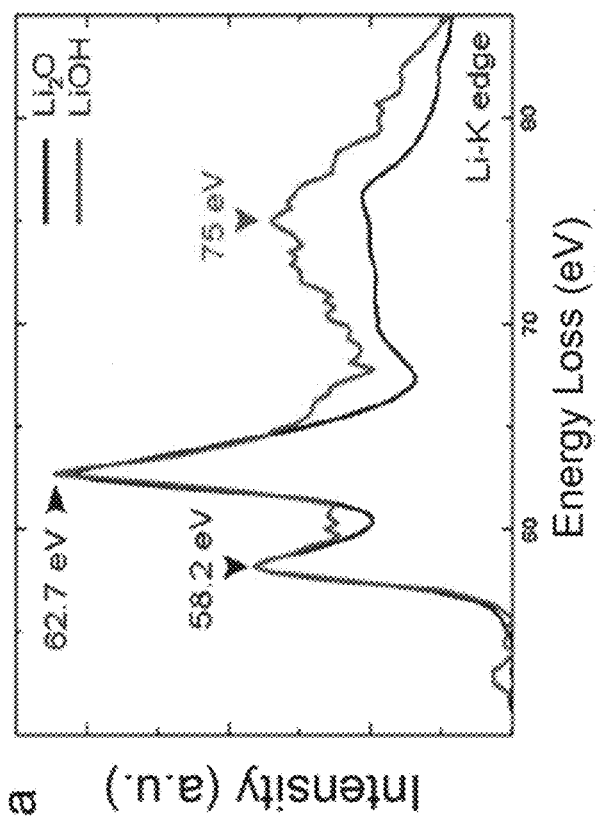

FIG. 16A shows a reference EELS spectra of the Li K-edge for Li$_2$O (red) and LiOH (black). The Li K-edge peaks for Li$_2$O and LiOH rise at about 58.2 eV, 62.7 eV and 75 eV. [Zheng, H. et al., Sci. Rep. 2, 542 (2012)].

FIG. 16B shows a reference EELS spectra of the Li K-edge for Li$_2$O$_2$ and Li$_2$CO$_3$. [Basak, S. et al., Ultramicroscopy 188, 52-58 (2018)]

Figure 17C:
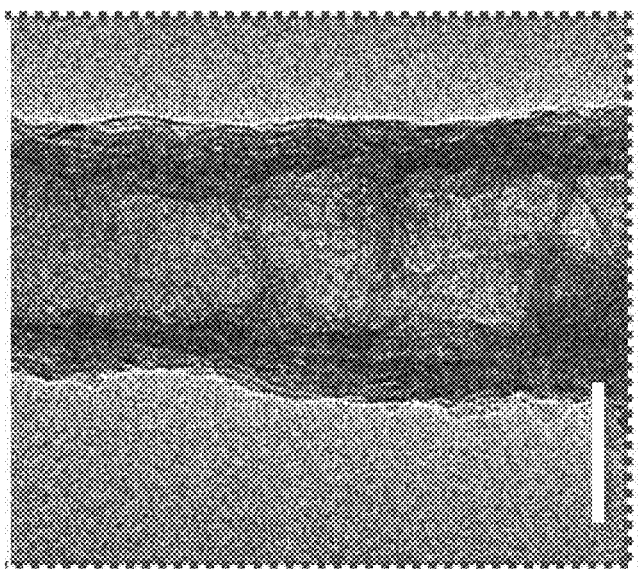
Figure 17B:
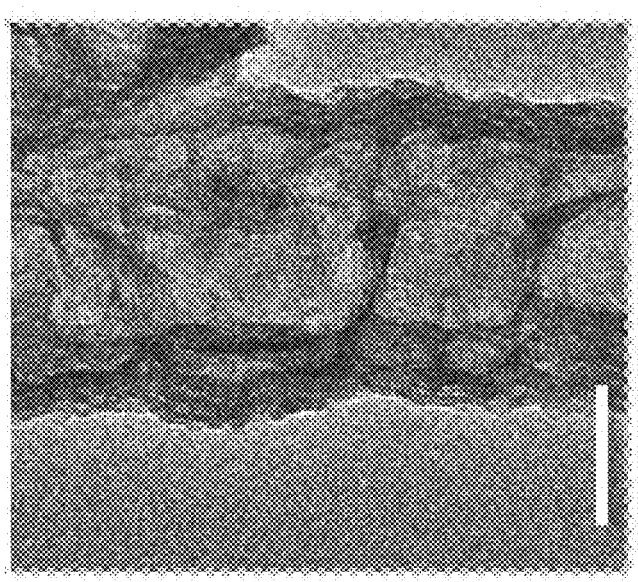
Figure 17A:
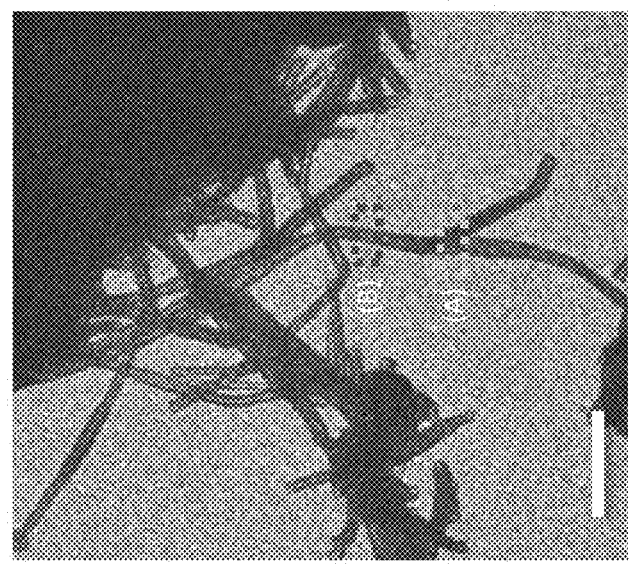

FIG. 17A shows a TEM image of a single long CHT. The scale bar is 2 μm.

FIG. 17B shows a magnified TEM image of section (A) of the CHT of FIG. 17A. The scale bar is 100 nm.

FIG. 17C shows a magnified TEM image of section (B) of the CHT of FIG. 17A. The scale bar is 100 nm.

Figure 17D:
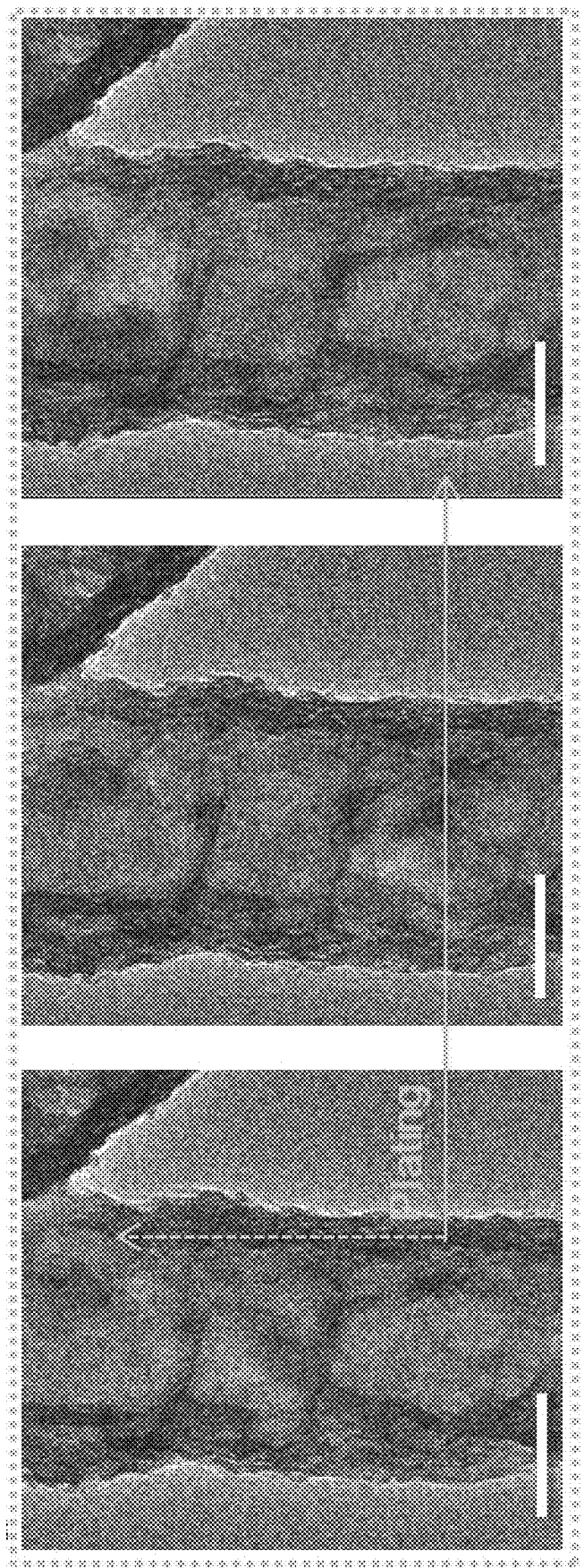

FIG. 17D shows a series of TEM images where section (A) of the CHT of FIG. 17A is plated with Li.

Figure 17E:
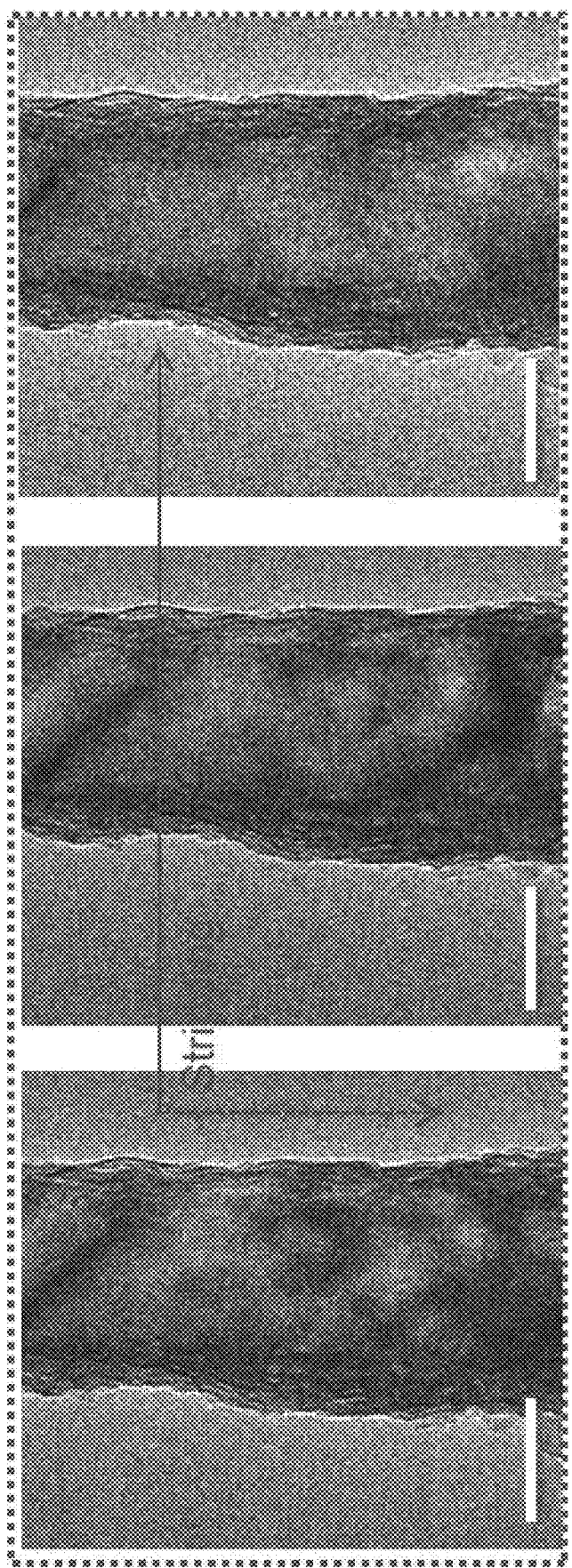

FIG. 17E shows a series of TEM images where section (B) of the CHT of FIG. 17A is stripped of Li.

Figure 18B:
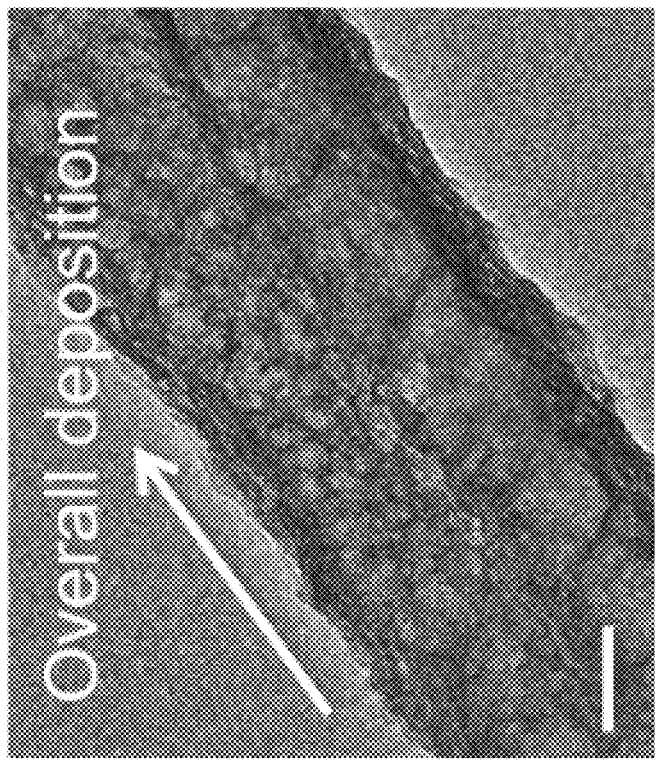
Figure 18A:
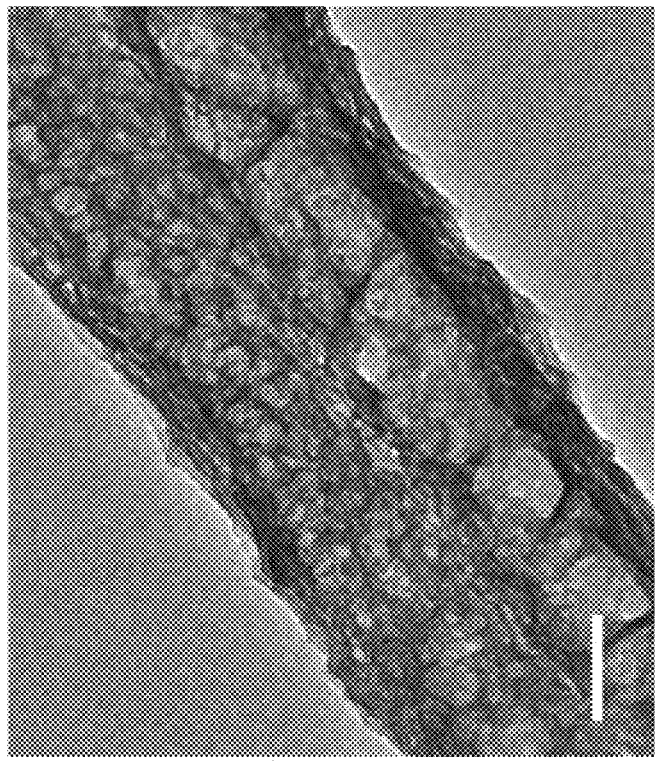
Figure 18D:
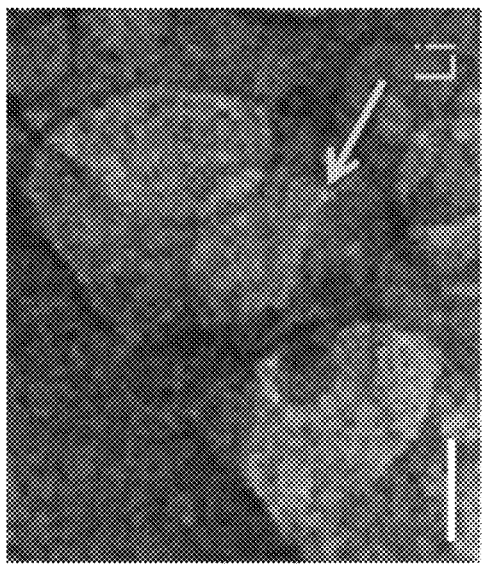
Figure 18F:
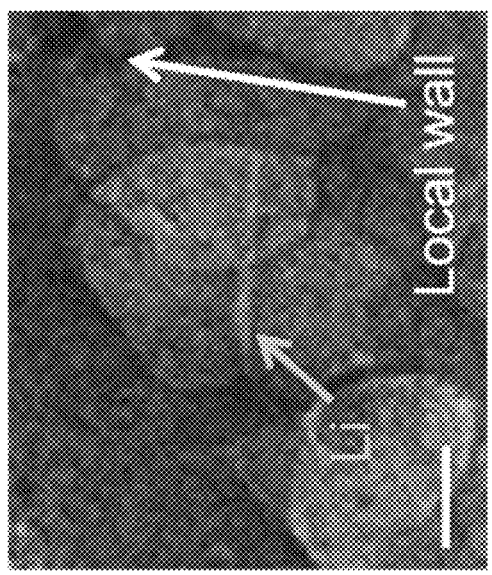
Figure 18C:
Figure 18E:
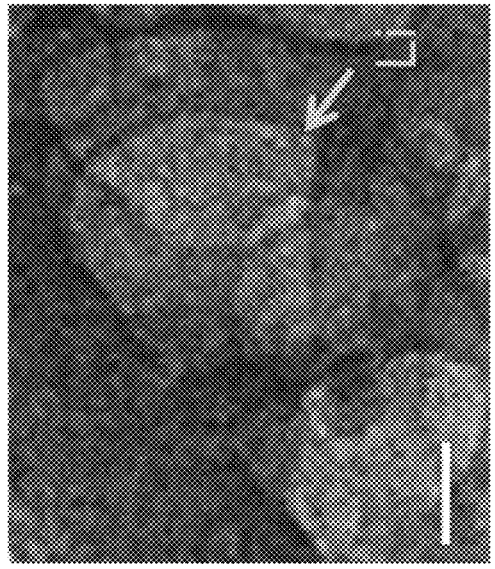

FIG. 18A shows a TEM image of an exemplary CHT having a local 3D porous structure disposed inside the cavity of the CHT before Li plating. The scale bar is 100 nm.

FIG. 18B shows a TEM image of the CHT of FIG. 18A after Li plating. The scale bar is 100 nm.

FIGS. 18C-18F show a series of TEM images of a local 3D porous structure in a CHT being plated with Li. The scale bars are 50 nm.

Figure 19:
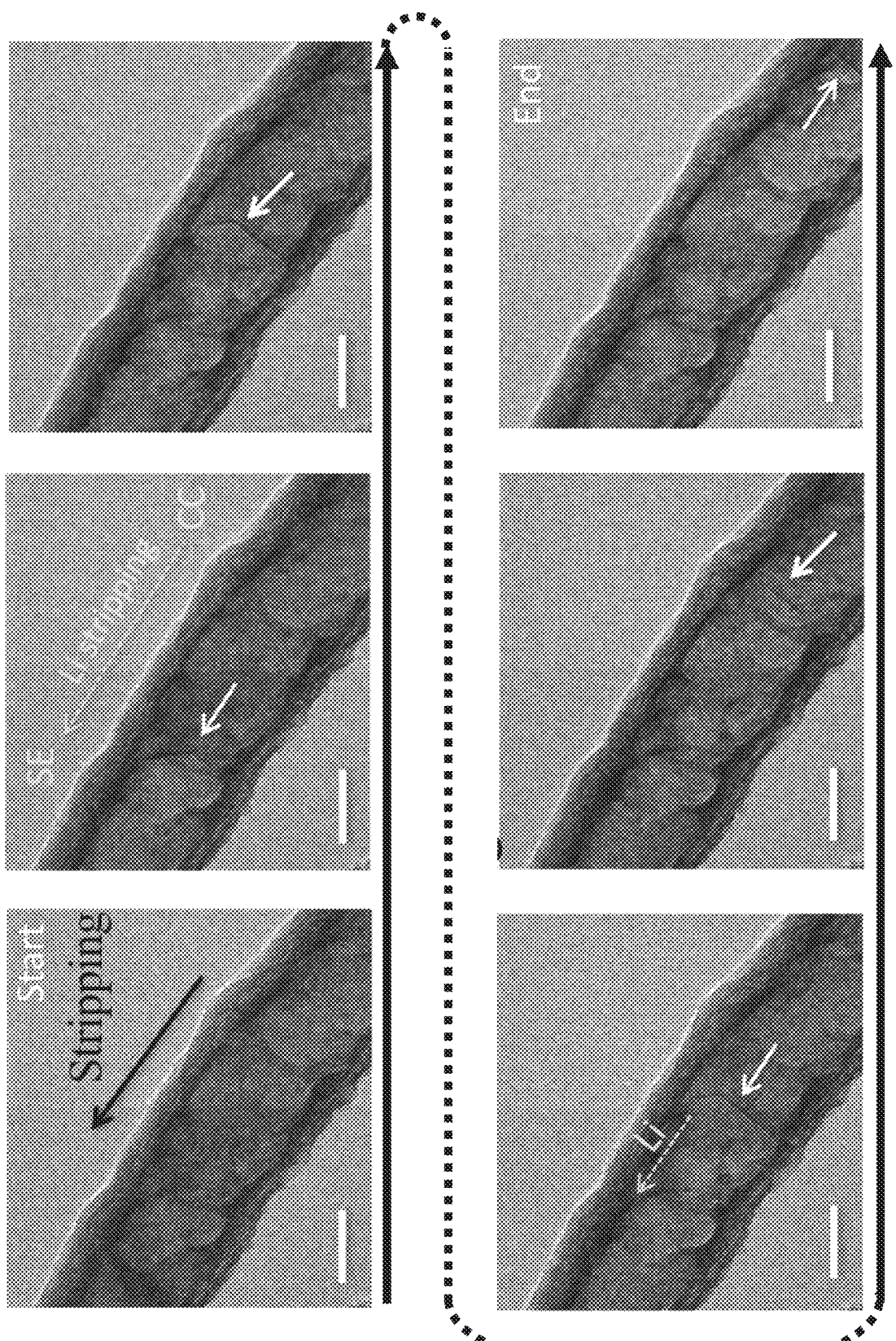

FIG. 19 shows a series of TEM images of an exemplary CHT where Li is being stripped. A void space is present between the Li metal and the solid electrolyte. The scale bar is 100 nm.

Figure 20A:
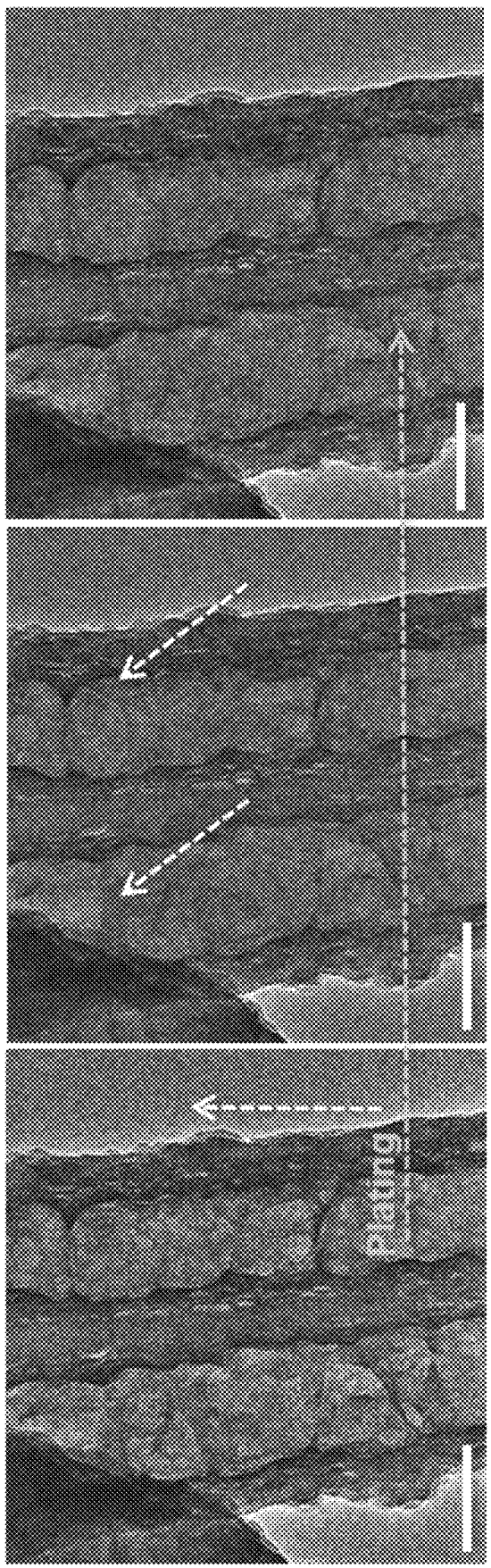

FIG. 20A shows a series of TEM images of two aligned CHT's being plated with Li. The respective fronts of Li metal in each CHT is indicated by the white arrow. The scale bar is 100 nm.

Figure 20B:
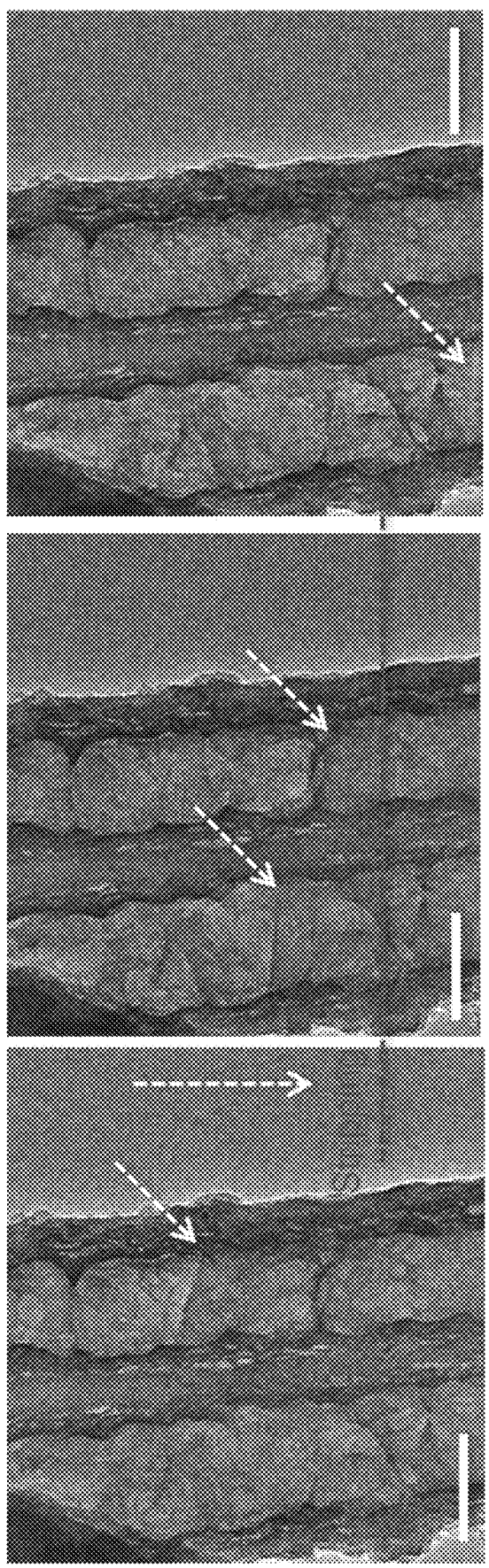

FIG. 20B shows a series of TEM images of the two aligned CHT's of FIG. 20A being stripped of Li. The respective fronts of Li metal in each CHT is indicated by the white arrow. The scale bar is 100 nm.

Figure 20D:
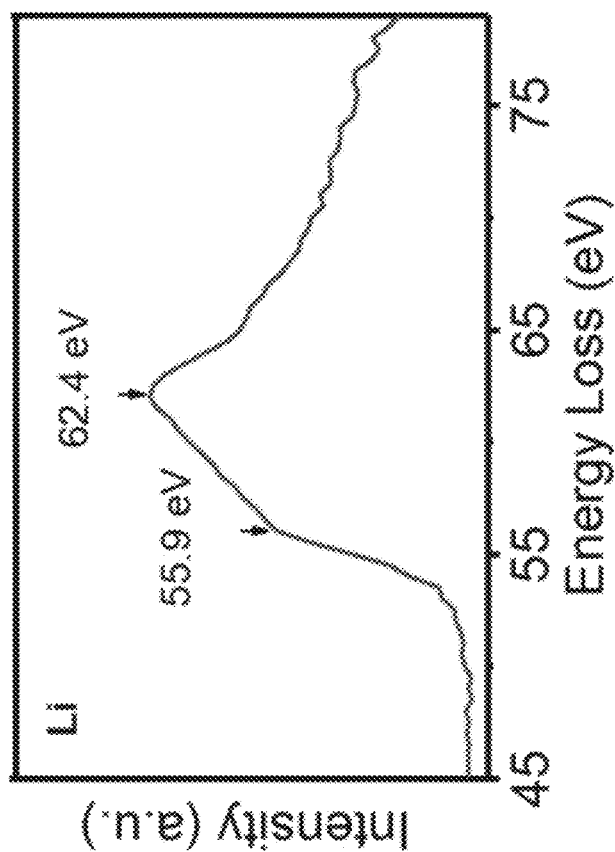
Figure 20C:
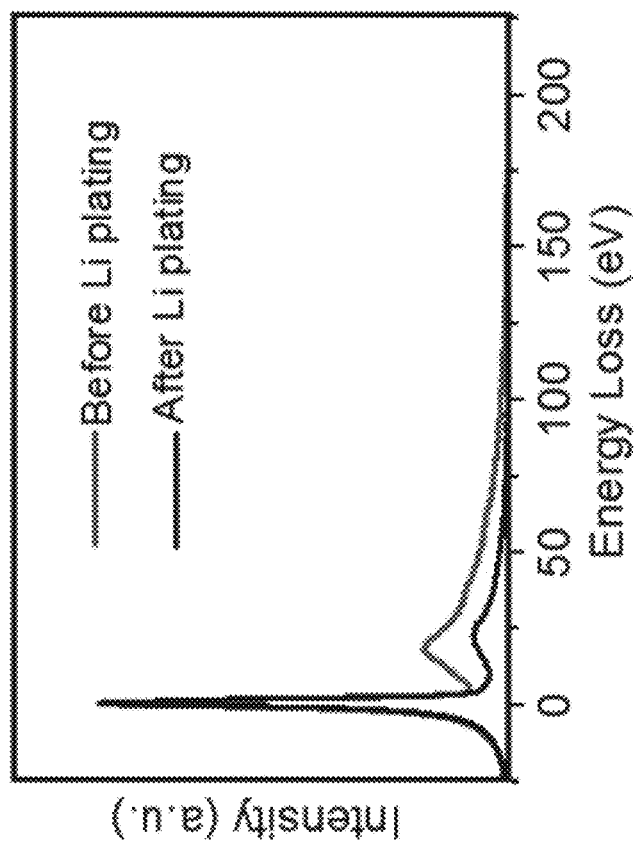

FIG. 20C shows EELS spectra acquired at the cross in FIG. 20A before and after Li plating.

FIG. 20D shows EELS spectra of the Li K-edge with fine structure after Li plating and background subtraction.

Figure 21B:
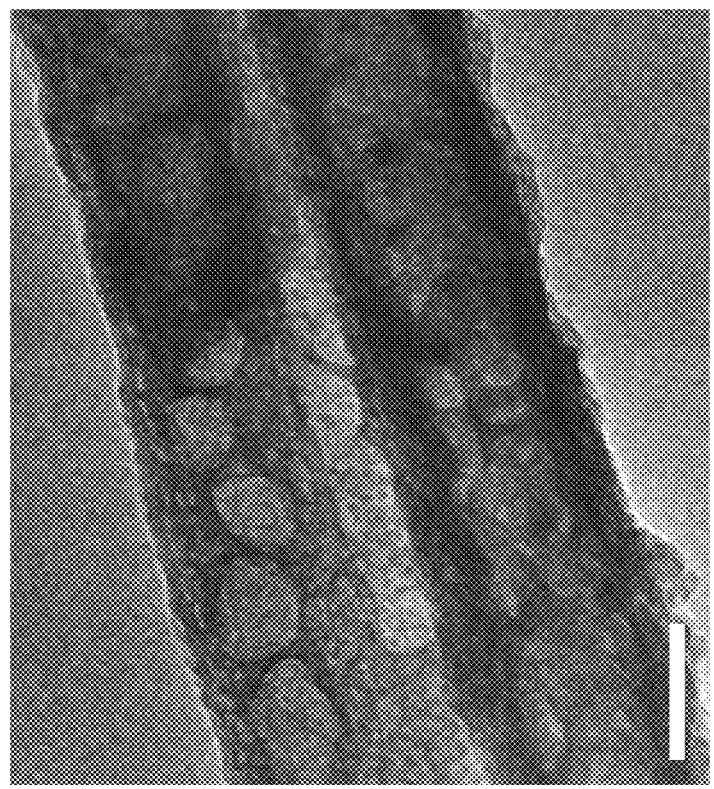
Figure 21A:
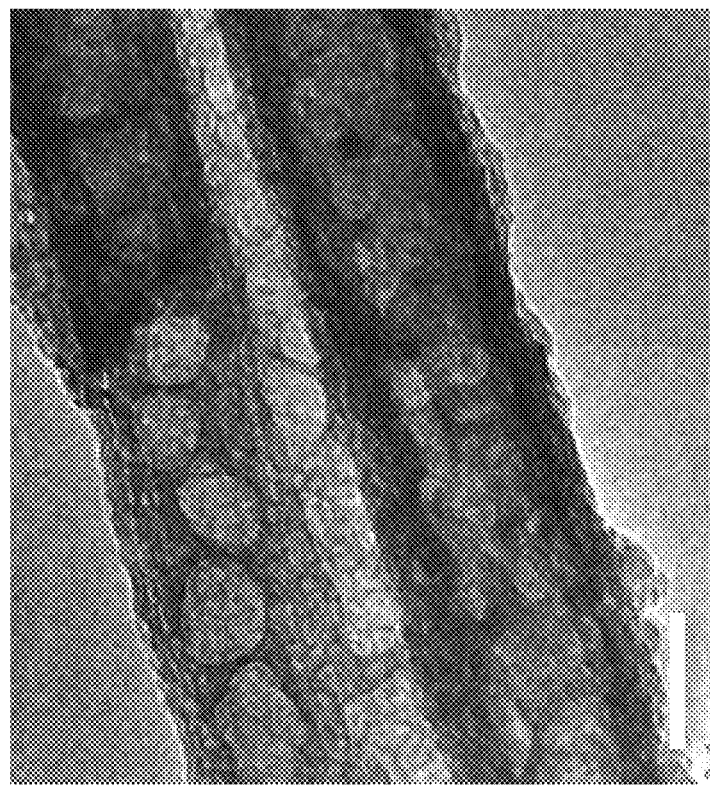

FIG. 21A shows a TEM image of three aligned CHT's before Li plating. The scale bar is 100 nm.

FIG. 21B shows a TEM image of three aligned CHT's after Li plating. The scale bar is 100 nm.

Figure 22A:
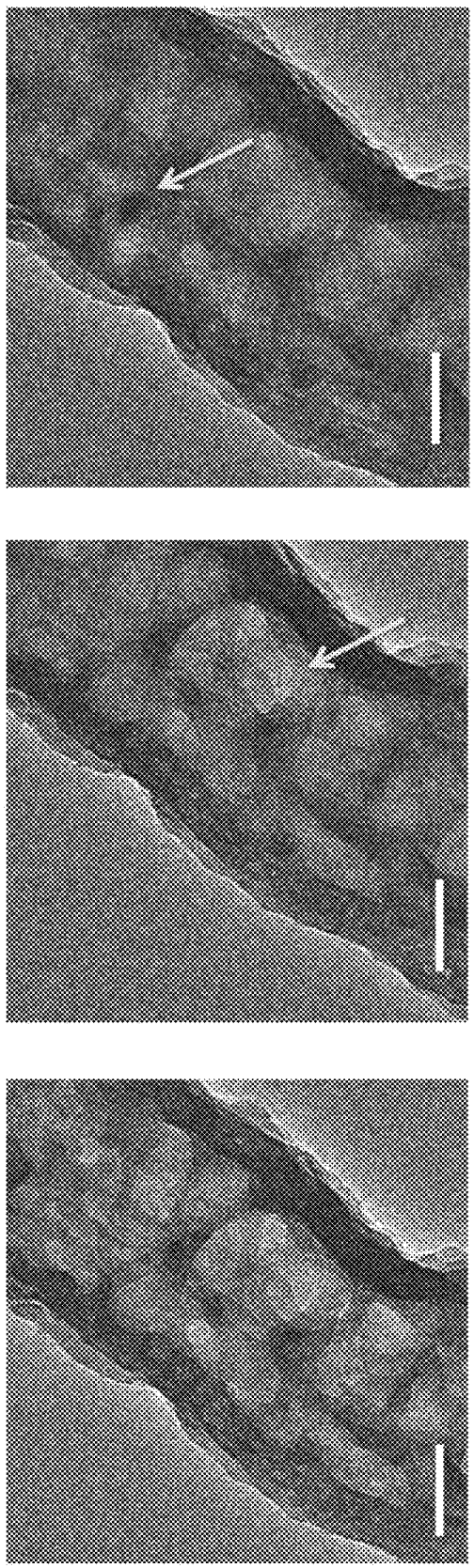

FIG. 22A shows a series of TEM images of an exemplary CHT being plated with Li. The CHT has an inner diameter of about 200 nm and a wall thickness of 50 nm. The scale bars are 100 nm.

Figure 22B:
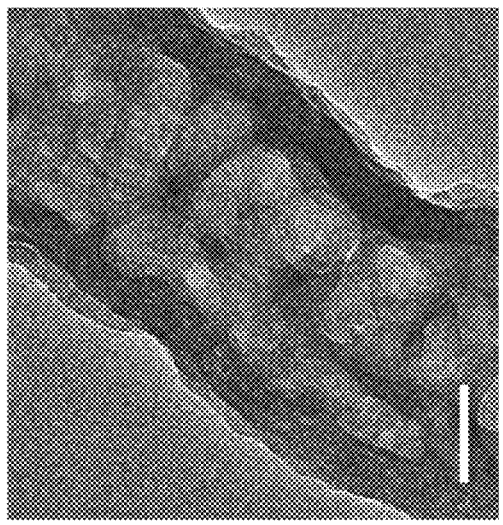
Figure 22B:
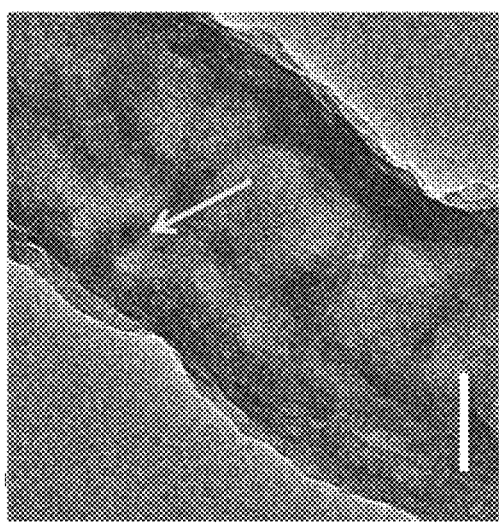
Figure 22B:
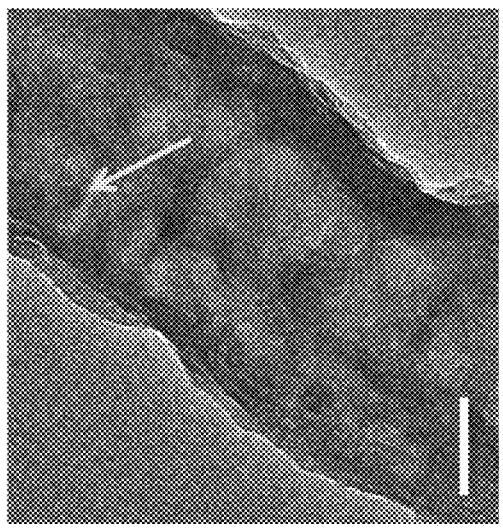

FIG. 22B shows a series of TEM images of the CHT of FIG. 22A being stripped of Li. The scale bars are 100 nm.

Figure 23A:
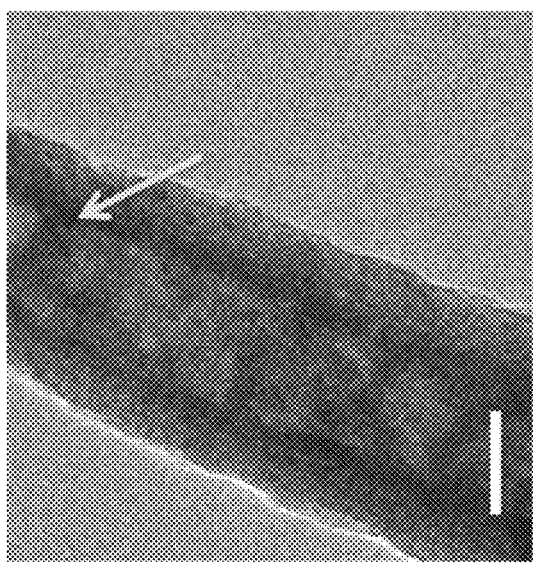
Figure 23A:
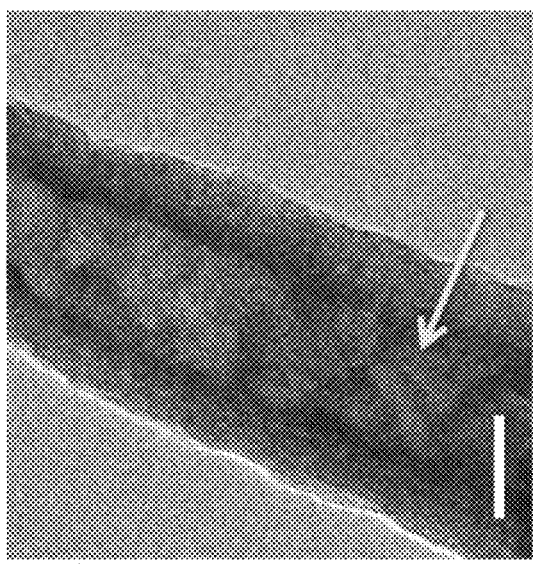
Figure 23A:
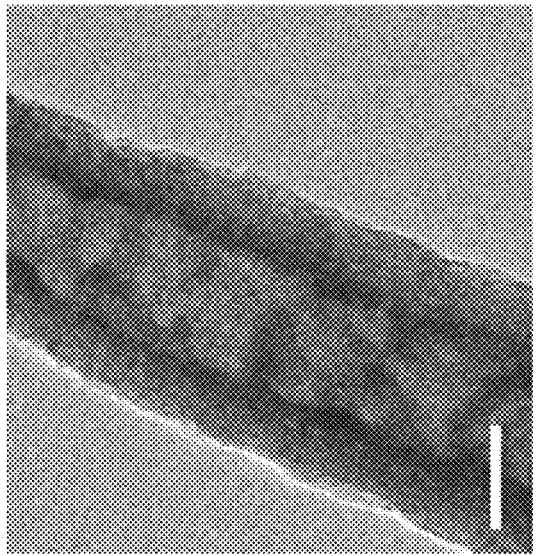

FIG. 23A shows a series of TEM images of an exemplary CHT being plated with Li. The CHT has an inner diameter of about 100 nm and a wall thickness of 60 nm. The scale bars are 100 nm.

Figure 23B:
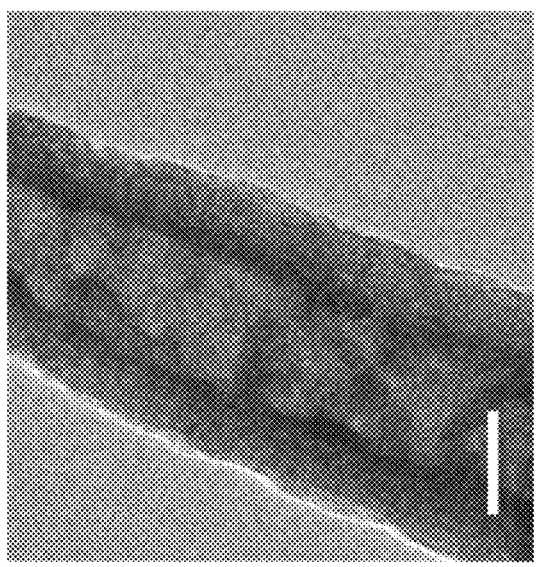
Figure 23B:
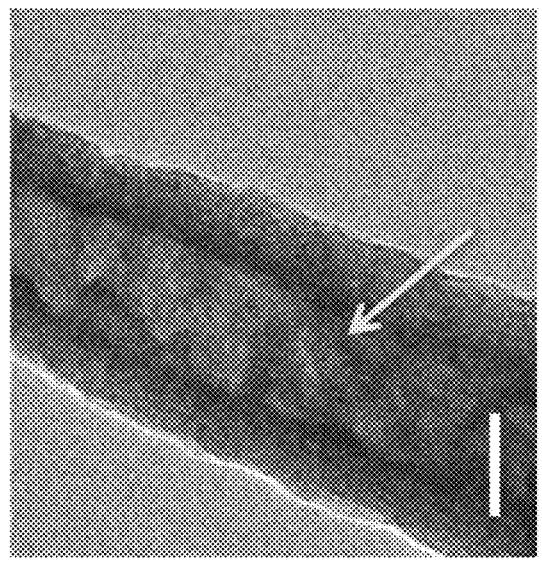
Figure 23B:
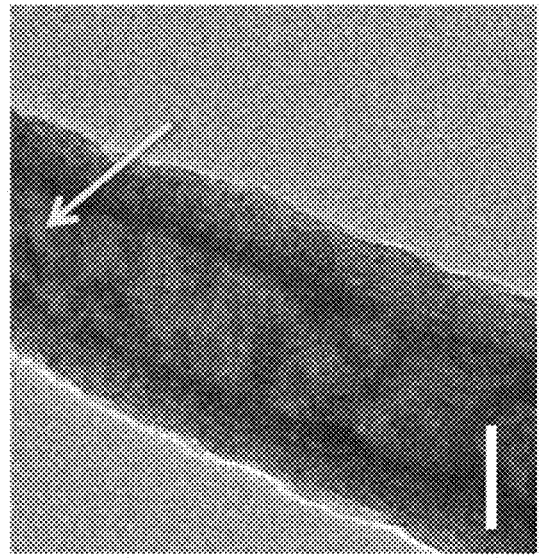

FIG. 23B shows a series of TEM images of the CHT of FIG. 23A being stripped of Li. The scale bars are 100 nm.

Figure 24:
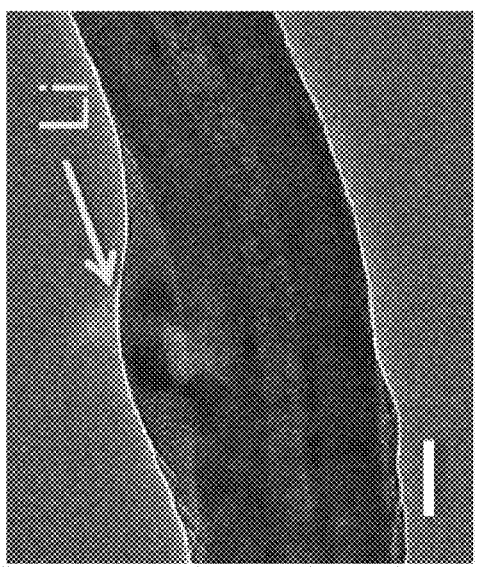
Figure 24:
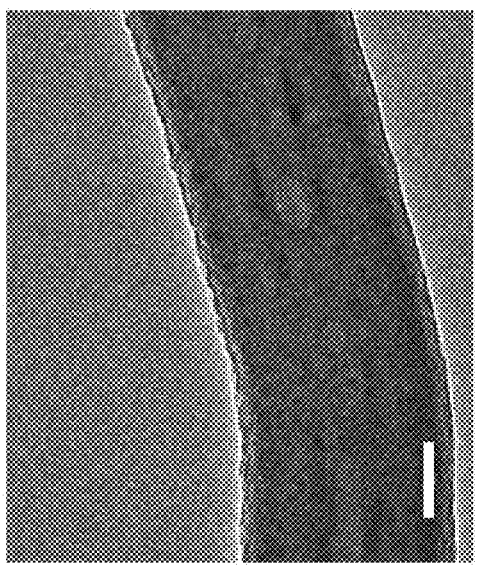
Figure 24:
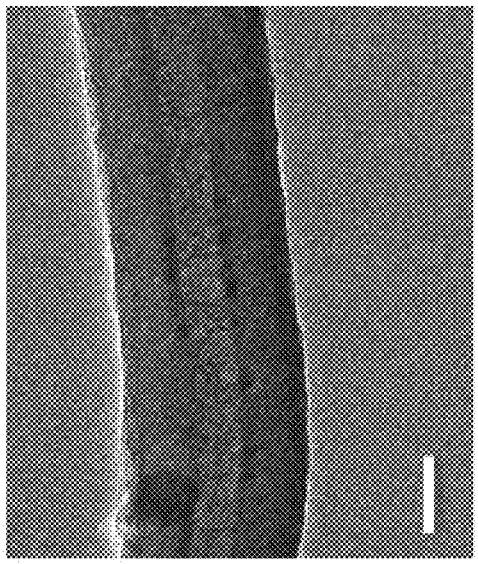

FIG. 24 shows a series of TEM images of an exemplary carbon nanotube being plated with Li. The carbon nanotube has an inner diameter of about 30 nm and a wall thickness of 50 nm. The scale bar is 50 nm.

Figure 25:
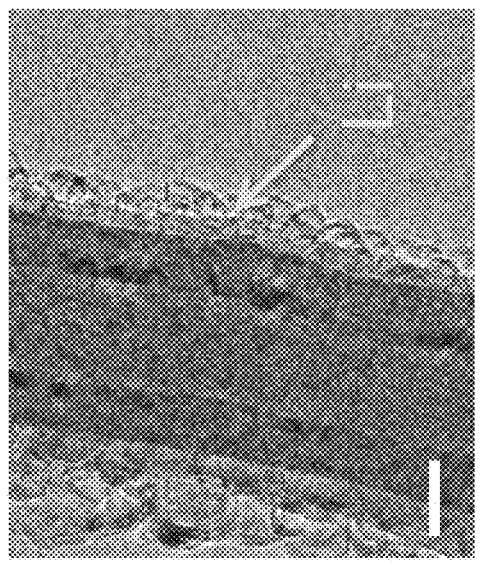
Figure 25:
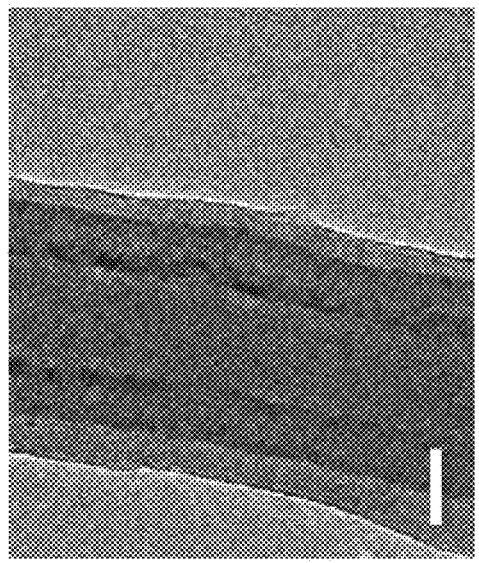
Figure 25:
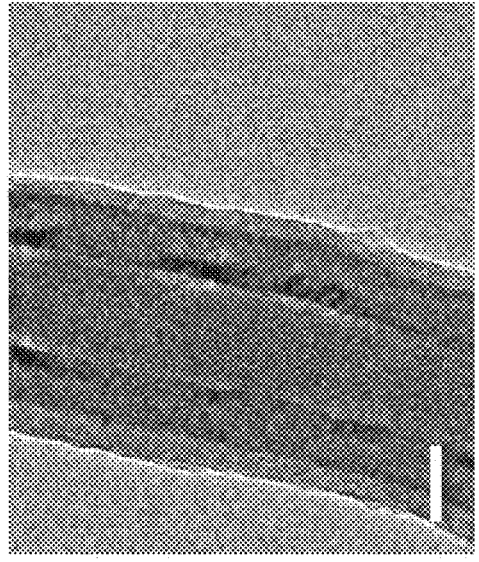

FIG. 25 shows a series of TEM images of an exemplary carbon nanotube being plated with Li. The carbon nanotube has an inner diameter of about 60 nm and a wall thickness of about 60 nm. The scale bar is 50 nm.

Figure 26A:
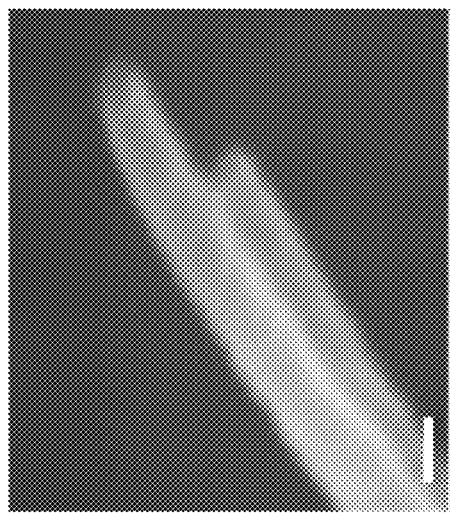

FIG. 26A shows a scanning electron microscope (SEM) image of several exemplary CHT's. The scale bar is 100 nm.

Figure 26D:
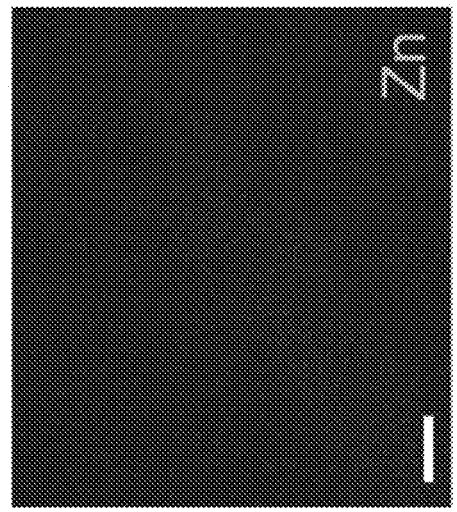
Figure 26C:
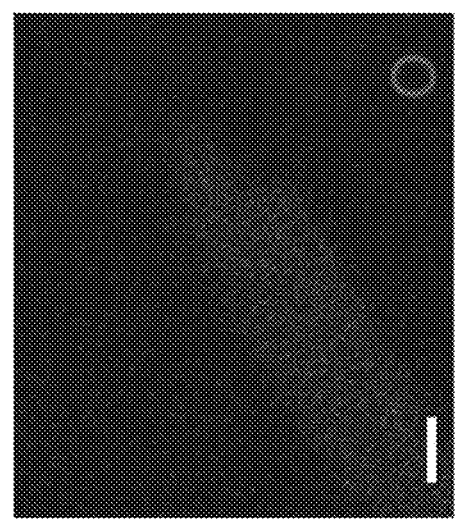
Figure 26B:
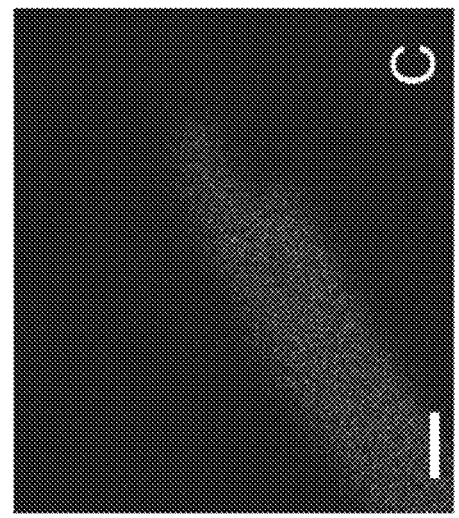

FIG. 26B shows an electron-dispersive x-ray (EDX) map of carbon (C) of the CHT's of FIG. 26A. The scale bar is 100 nm.

FIG. 26C shows an EDX map of oxygen (O) of the CHT's of FIG. 26A. The scale bar is 100 nm.

FIG. 26D shows an EDX map of zinc (Zn) of the CHT's of FIG. 26A. The scale bar is 100 nm.

Figures 27A, 27B, 27C:
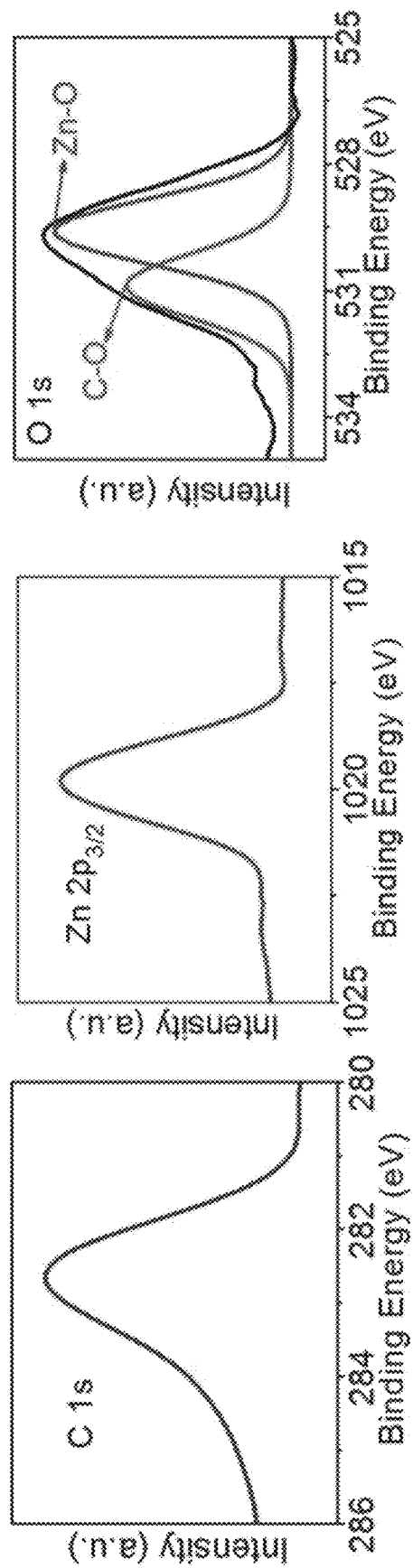

FIG. 27A shows x-ray photoelectron spectroscopy (XPS) spectra of the CIs line acquired using the CHT's of FIG. 27A.

FIG. 27B shows XPS spectra of the Zn2p$_{3/2}$ line acquired using the CHT's of FIG. 27A.

FIG. 27C shows XPS spectra of the O1s line acquired using the CHT's of FIG. 27A.

FIG. 28A shows EDX spectra of the CHT's of FIG. 26A before acid treatment.

FIG. 28B shows EDX spectra of the CHT's of FIG. 26A after acid treatment.

FIG. 29 shows a table of the ratio of Zn and O in the CHT's of FIG. 26A before and after acid treatment.

FIG. 30A shows a dark-field TEM image of Li wetting the outer surface of an exemplary CHT. This image shows Li is plated inside the CHT before being extruded out of the CHT with additional deposition. The dark-field image was acquired when the ($\bar{1}10$) diffraction beam of the Li crystal (see inset) is allowed to pass through the objective aperture. The dashed circle denotes the selected area aperture. The scale bar is 100 nm.

FIG. 30B shows a dark-field TEM image of the CHT of FIG. 30A where Li begins to wet the outer surface of the CHT. The scale bar is 100 nm.

FIG. 30C shows a dark-field TEM image of the CHT of FIG. 30A where Li wets the outer surface of the CHT along a length of 100 nm. The scale bar is 100 nm.

FIG. 30D shows a dark-field TEM image of the CHT of FIG. 30A where Li wets the outer surface of the CHT along a length of 140 nm. The scale bar is 100 nm.

FIG. 30E shows a dark-field TEM image of the CHT of FIG. 30A where Li begins to grow outward from the outer surface of the CHT. The scale bar is 100 nm.

Figure 31:
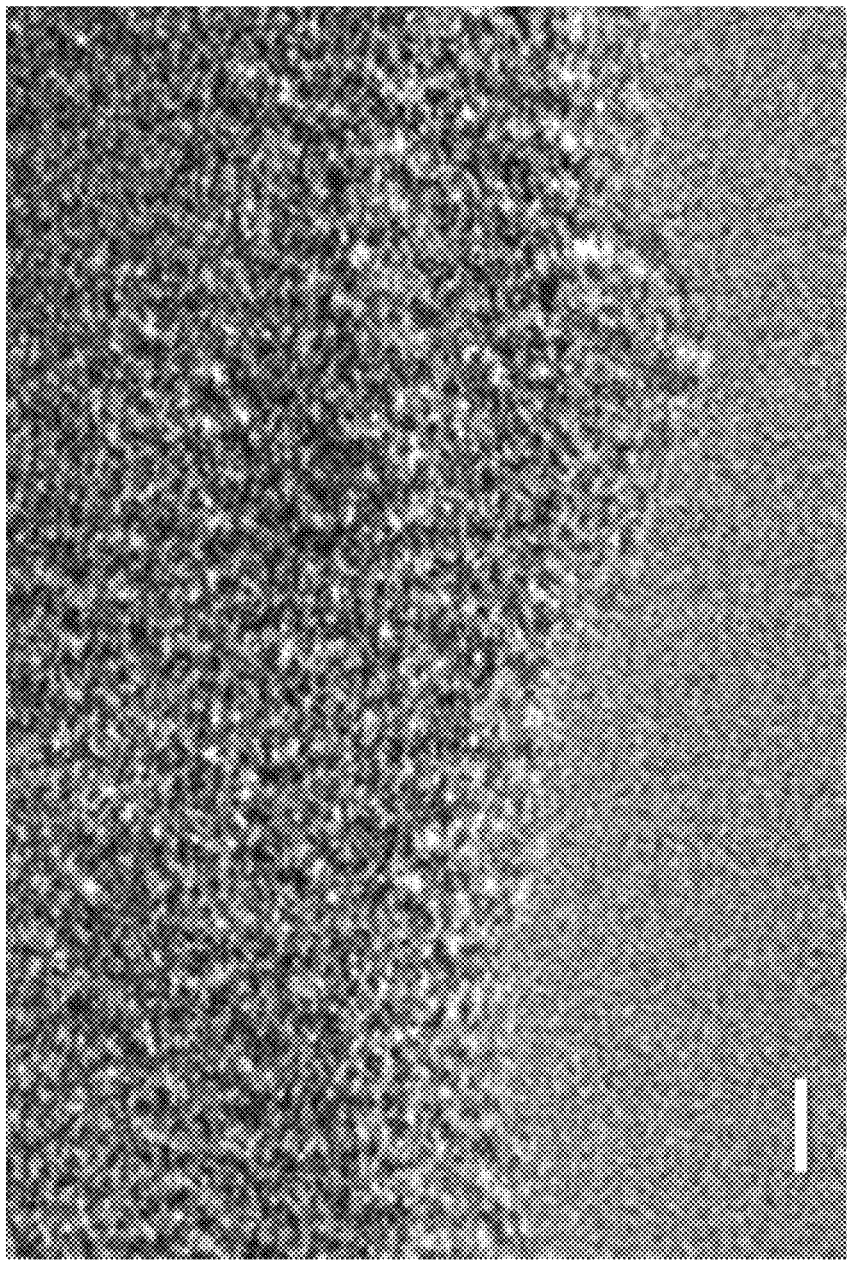

FIG. 31 shows a TEM image of the outer surface of an exemplary CHT before Li plating.

The scale bar is 2 nm.

FIGS. 32A-32C show a series of TEM images of $Li_2O$ being grown out of a carbon tubule surface. The scale bar is 2 nm.

FIG. 32D shows a HRTEM image of the $Li_2O$ layer growing out of the CHT surface.

Figure 33:
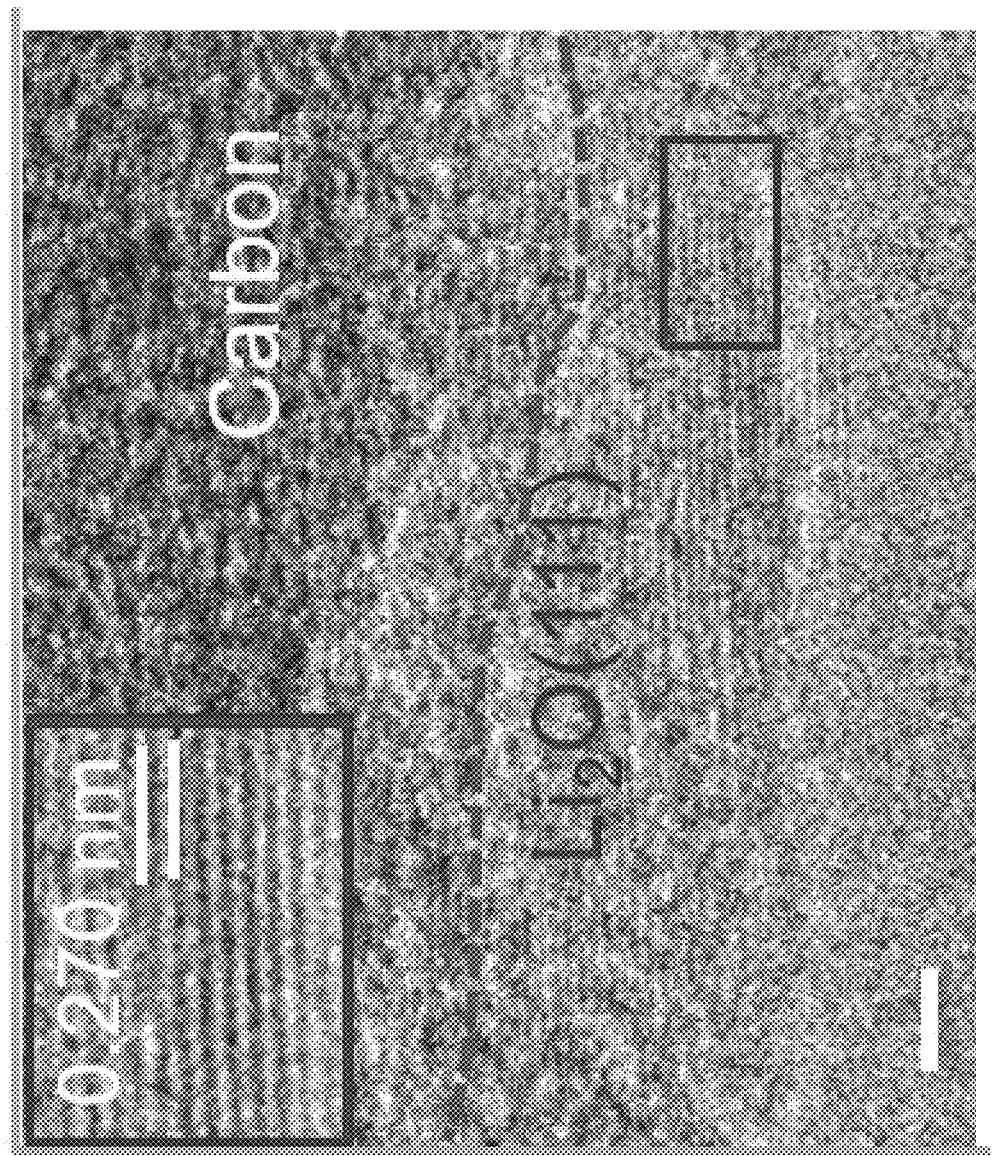

FIG. 33 shows a HRTEM image of a layer of $Li_2O$ on outer surface of CHT. The scale bar is 2 nm.

FIG. 34A shows a TEM image of a Li whisker grown from a single CHT. $ZnO_x$ is disposed inside the CHT within the selected area aperture. The scale bar is 100 nm.

FIG. 34B shows a SAED pattern showing the side edges of the Li whisker in {110} planes.

FIG. 34C shows a HRTEM image of the $Li_2O$ on the Li whisker. The $Li_2O$ is measured with a lattice spacing of 0.27 nm between the $Li_2O$ (111) planes on the side edge of the whisker corresponding to the interface of Kurdjumov-Sachs {110}BCC Li//{111}FCC $Li_2O$ orientation relationship indicated by the inset of FIG. 34B. The scale bar is 2 nm.

Figure 35C:
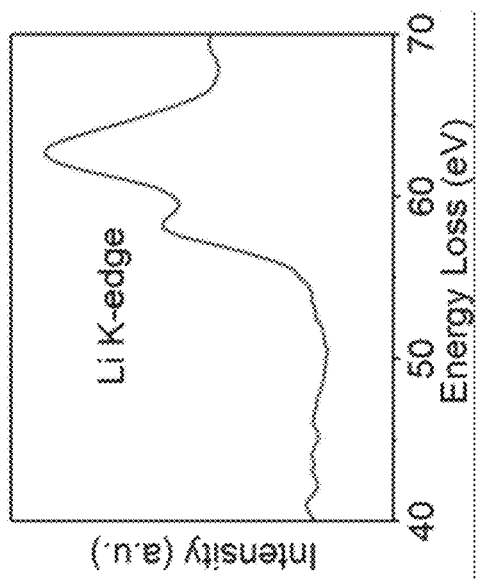
Figure 35B:
Figure 35A:
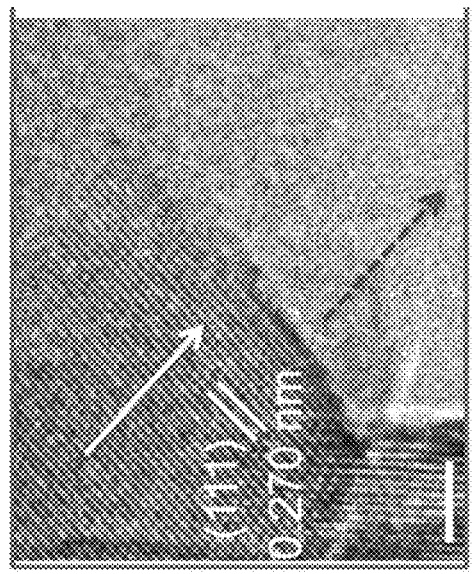

FIG. 35A shows a HRTEM image of in situ lateral growth of $Li_2O$ on the outer layer of one thick flake of Li. The {111} planes are shown to be parallel to the outer surface and the advancement of {111} planes are marked between red dashed lines. The scale bar is 2 nm.

FIG. 35B shows a HRTEM image of the outer layer of one thick flake of Li of FIG. 35A taken at a later time. The {111} planes are shown to be parallel to the outer surface and the advancement of {111} planes are marked between red dashed lines. The scale bar is 2 nm FIG. 35C shows EELS spectra of the Li K-edge on the outer layer of $Li_2O$. A shoulder features is observed indicating the presence of $Li_2O$.

Figure 36A:
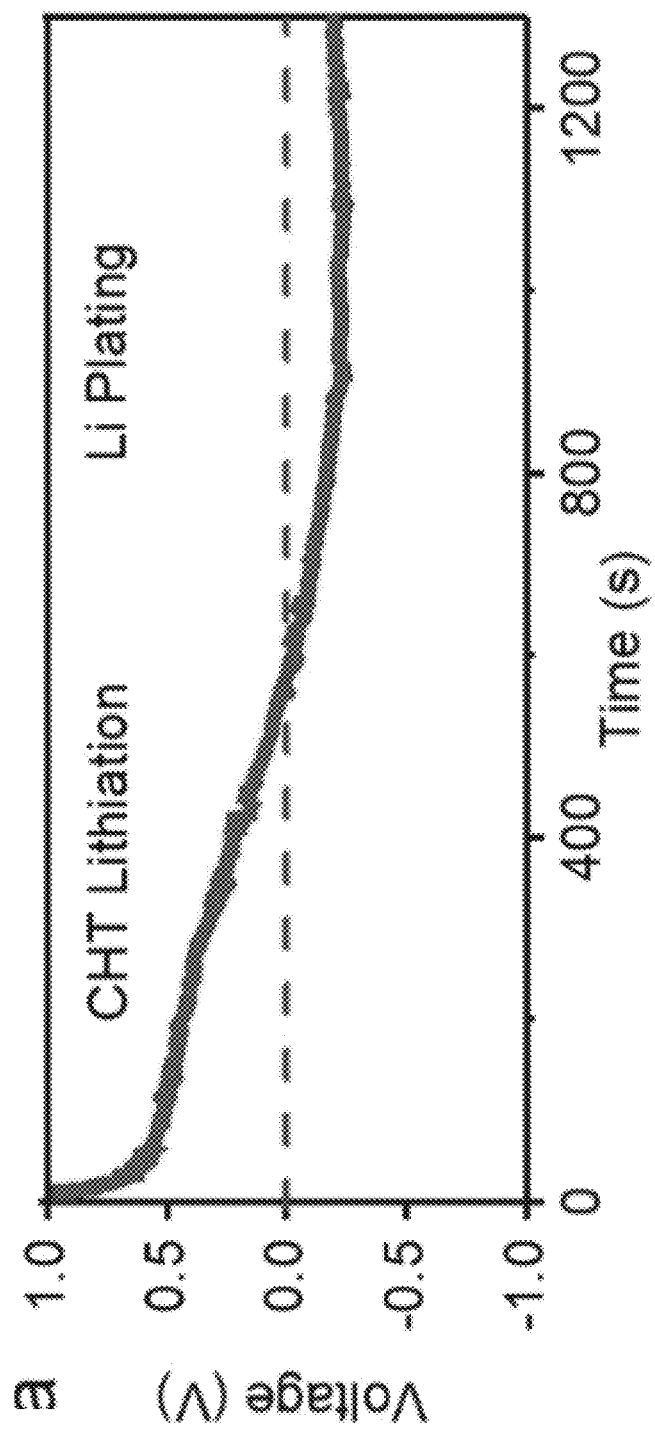

FIG. 36A shows an exemplary first charging profile of a CHT.

Figure 36B:
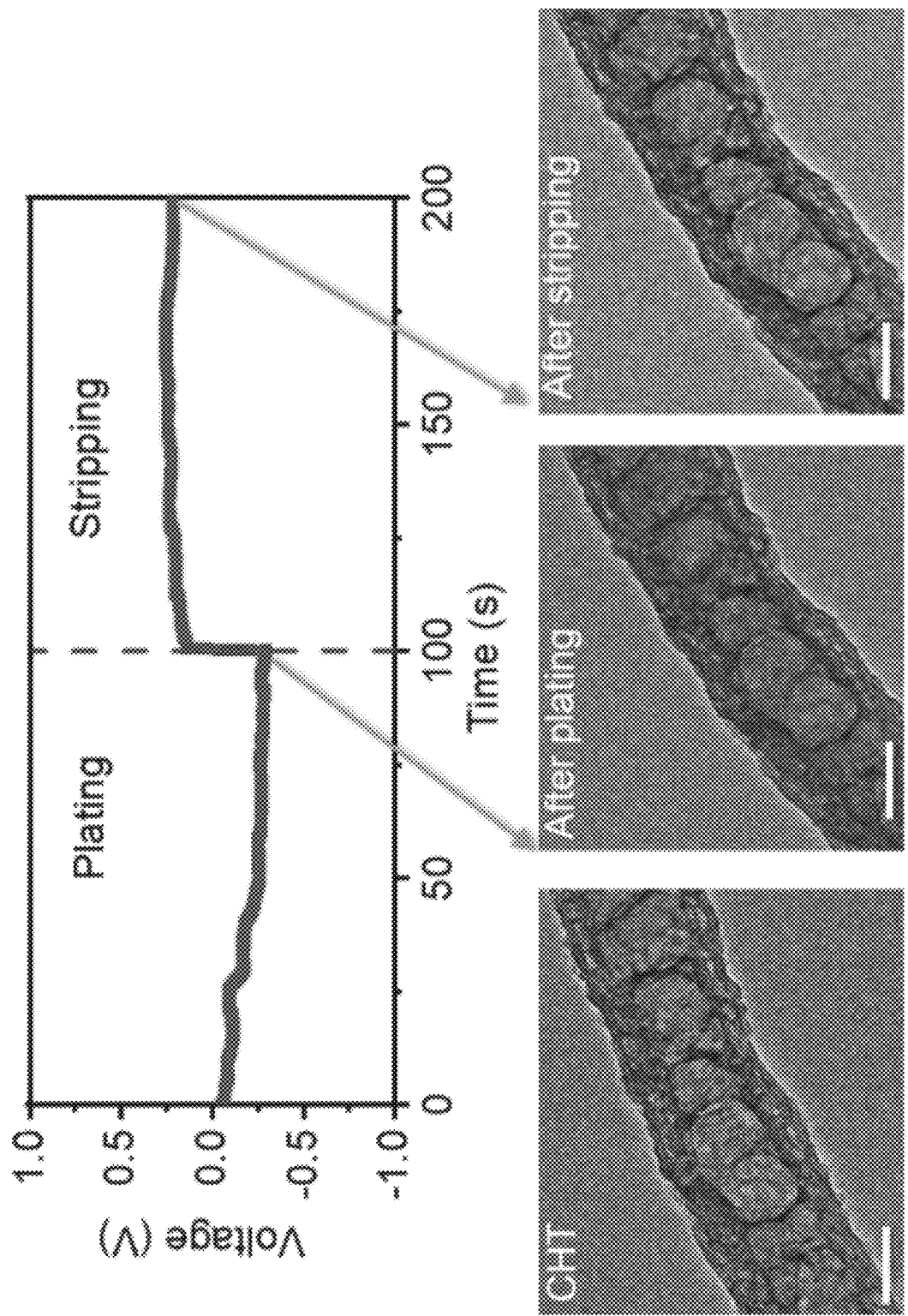
Figure 37C:
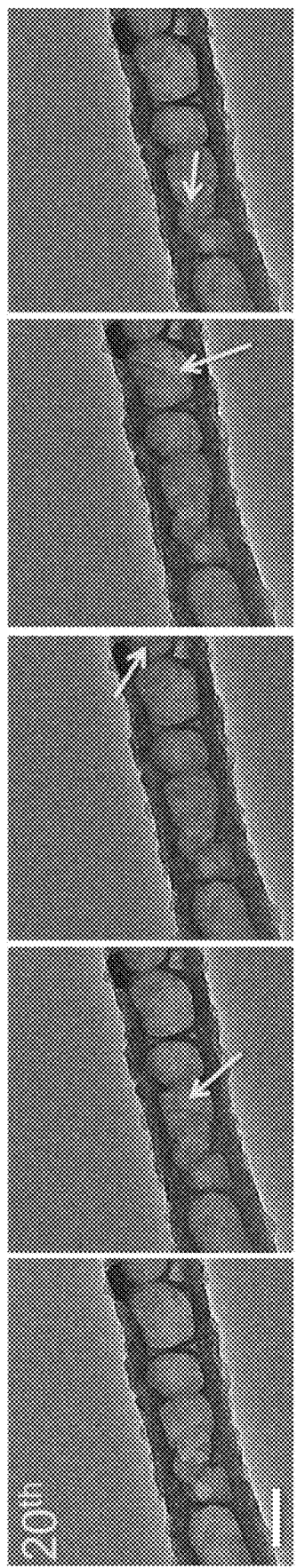
Figure 37D:
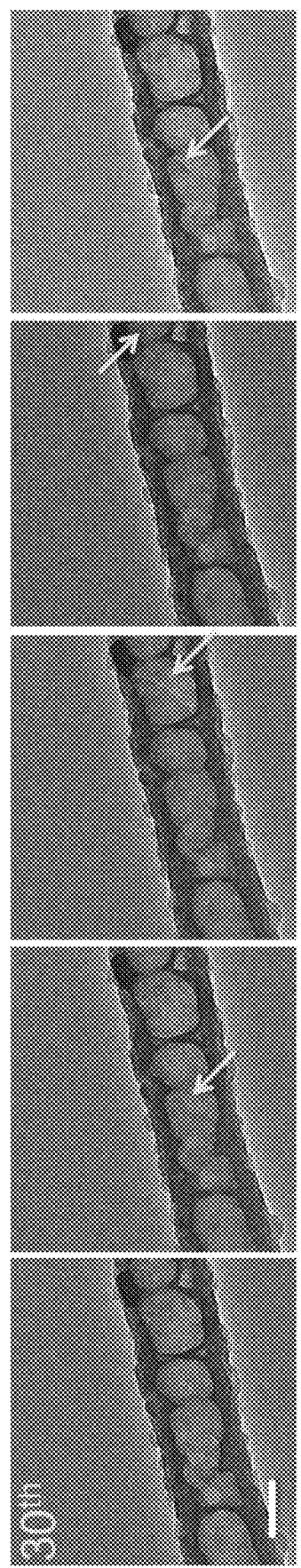
Figure 37E:
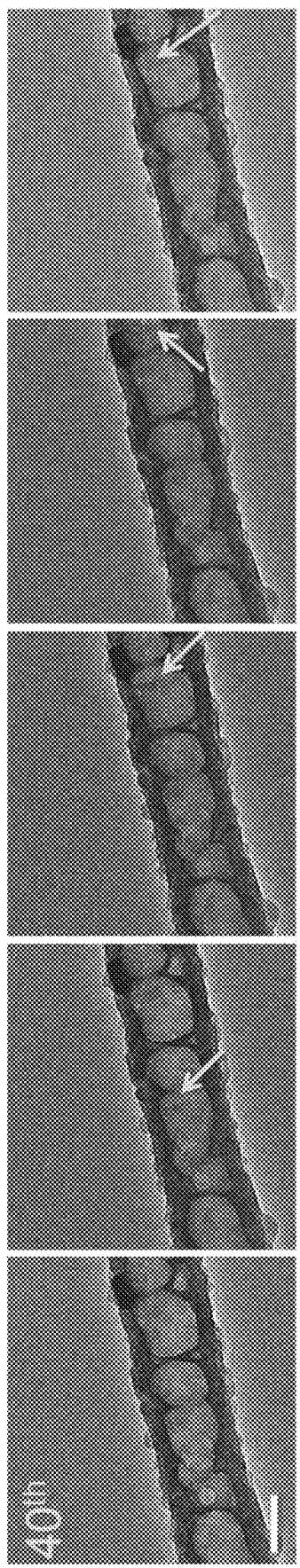
Figure 37F:
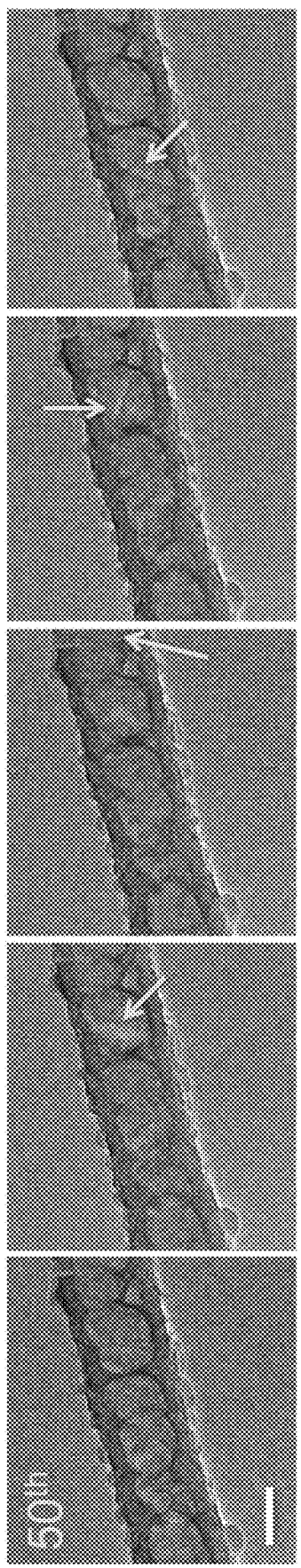
Figure 37G:
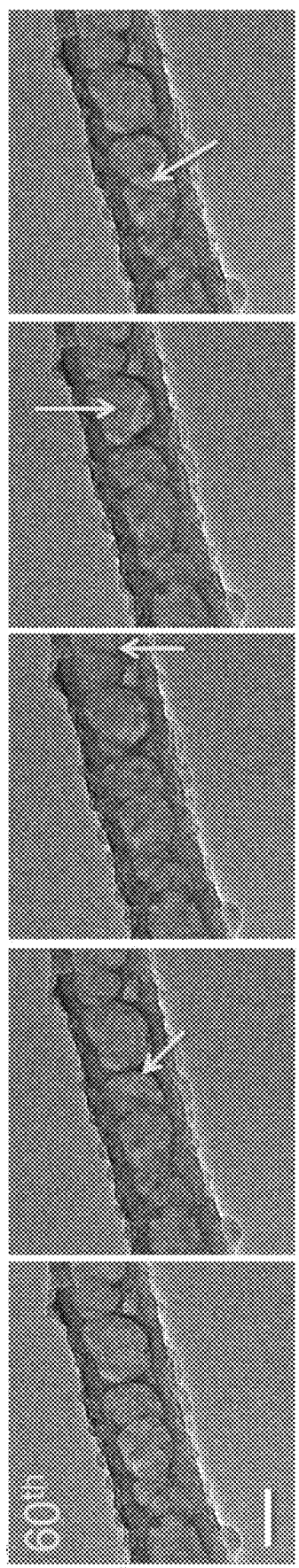
Figure 37H:
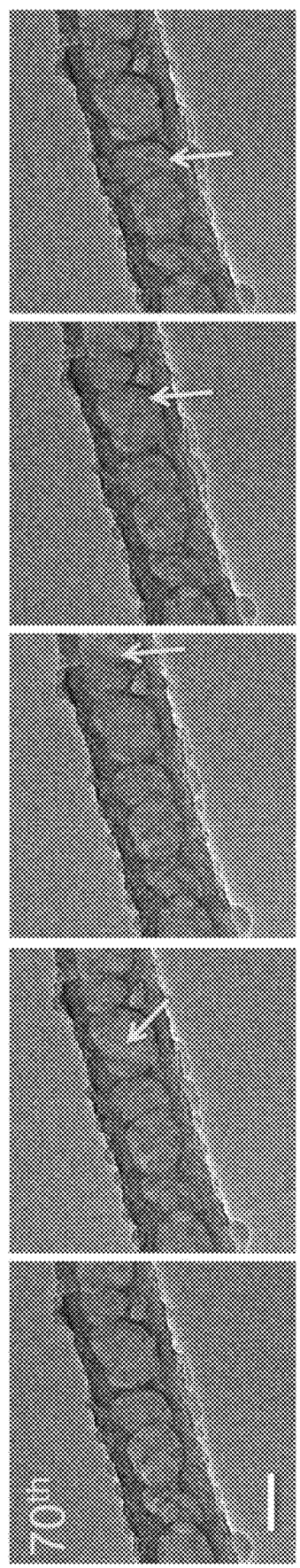
Figure 37I:
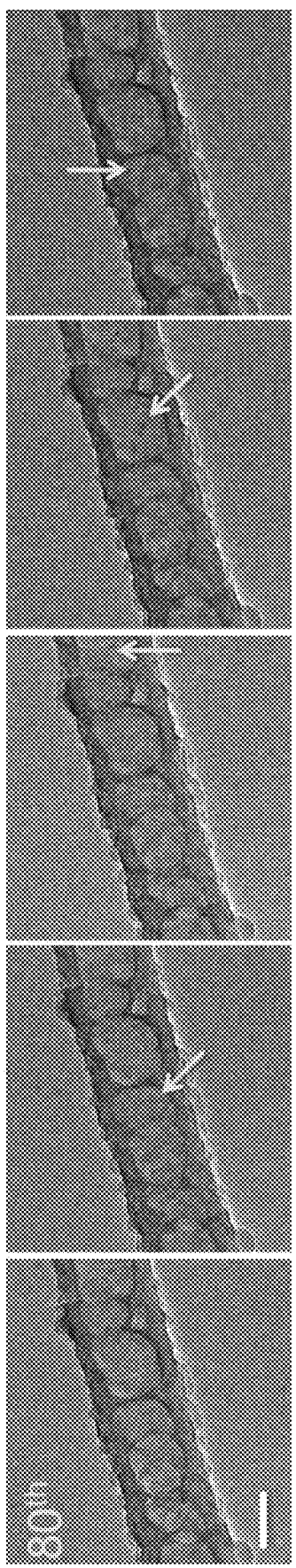
Figure 37J:
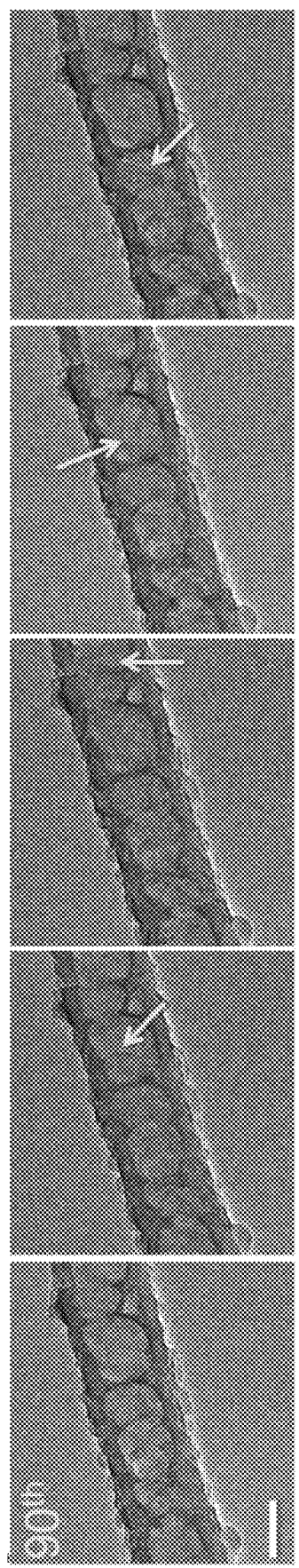
Figure 37K:
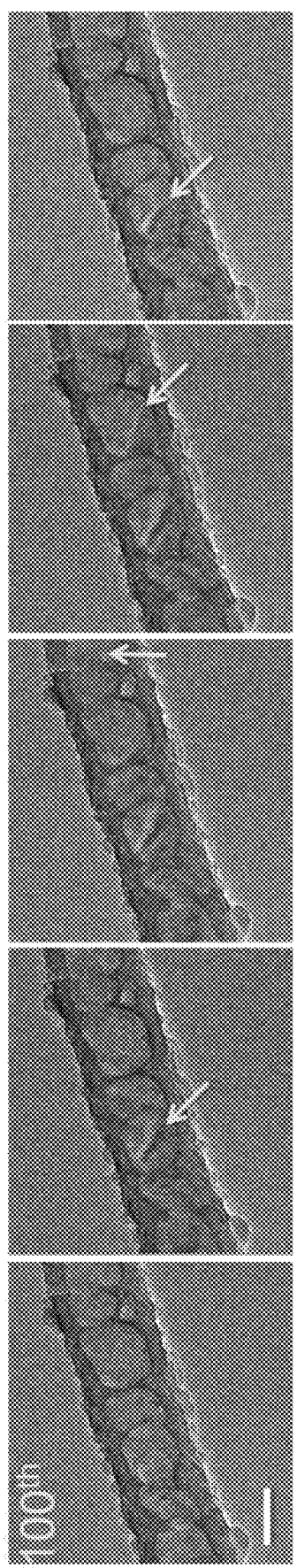

FIG. 36B shows an exemplary plating/stripping profile of a CHT.

FIGS. 37A-37K each show a series of TEM images of Li being plated and stripped along a single exemplary CHT for a single cycle (from a $1^{st}$ cycle to a $100^{th}$ cycle). The scale bars in each image are 100 nm.

Figure 38A:
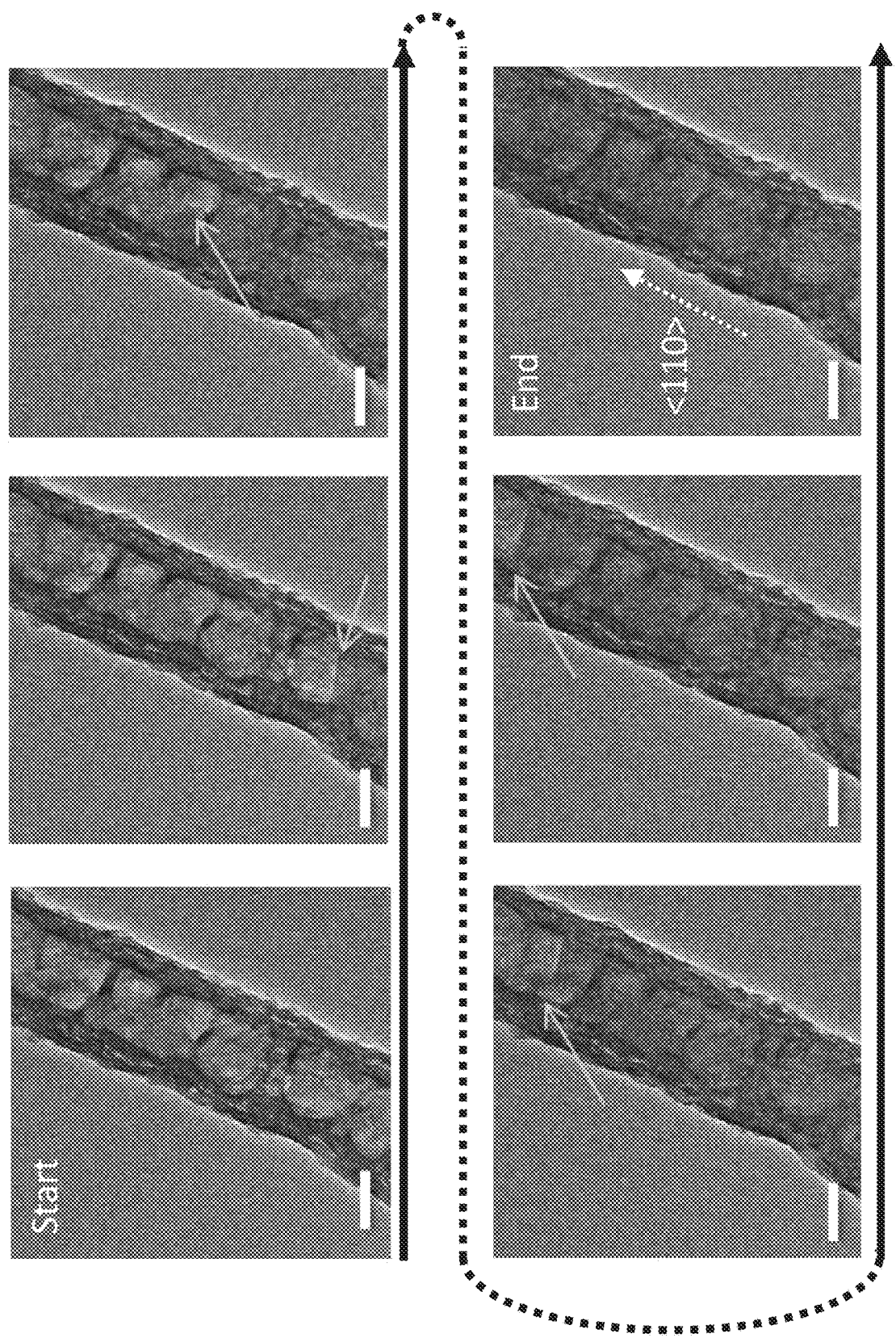

FIG. 38A shows a series of TEM images of a single exemplary CHT being plated with sodium (Na). The scale bar is 100 nm.

Figure 38B:
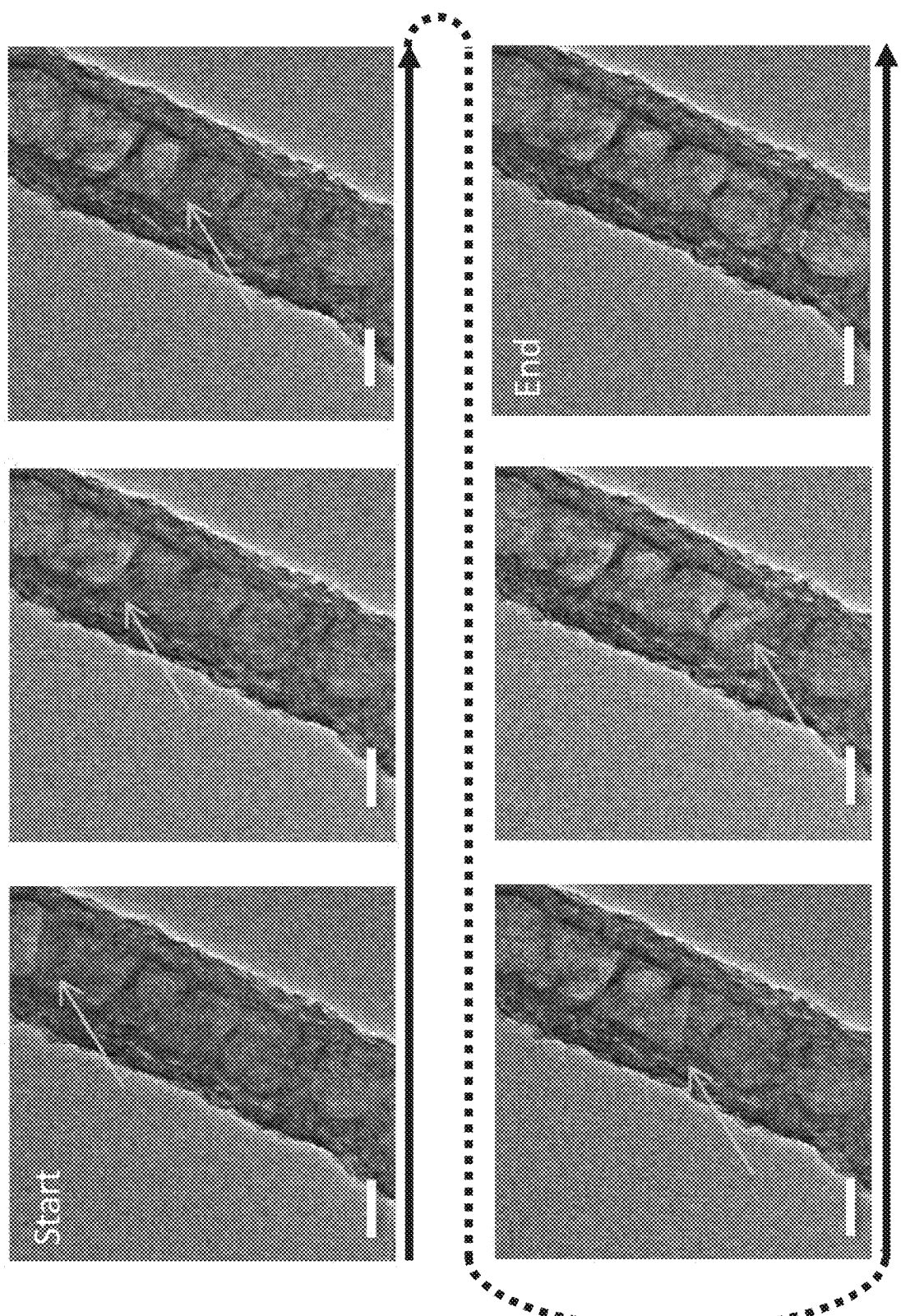

FIG. 38B shows a series of TEM images of the single CHT of FIG. 38A being stripped of Na. The scale bar is 100 nm.

Figure 38C:
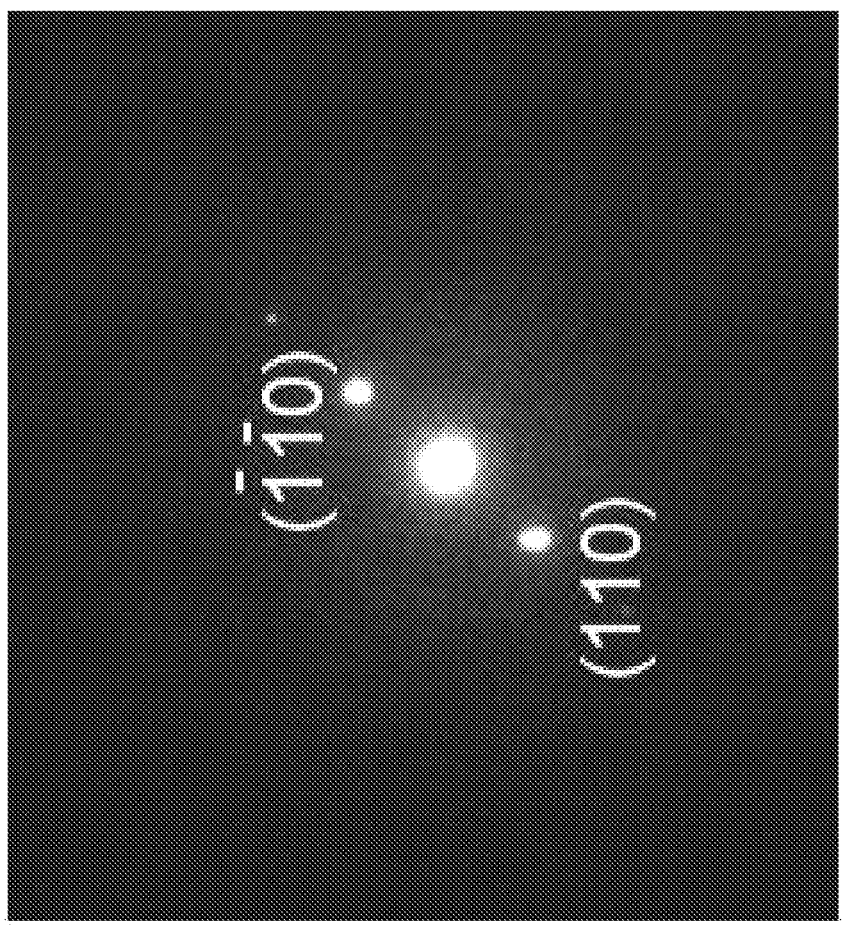

FIG. 38C shows a SAED pattern of the Na-plated single CHT of FIG. 38B showing that the Na is a single crystal.

Figure 39A:
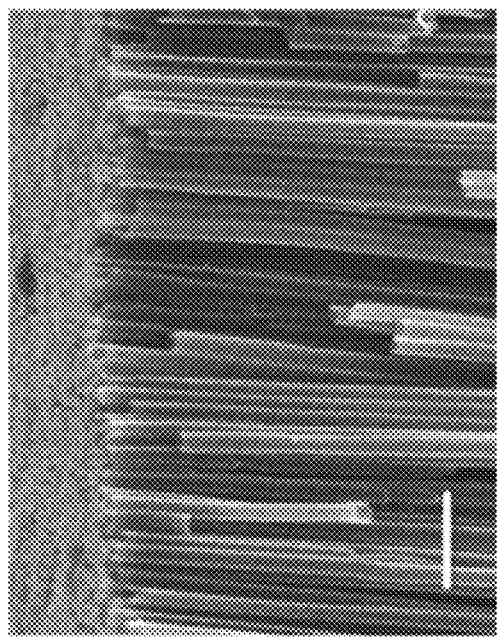

FIG. 39A shows a field-emission scanning electron microscope (FESEM) image of an exemplary carbonaceous MIEC beehive (also referred to herein as a "honeycomb"). The scale bar is 1 μm.

Figure 39C:
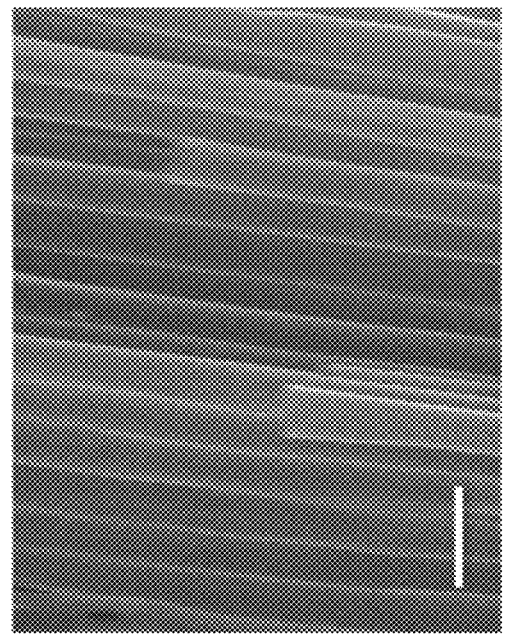
Figure 39B:
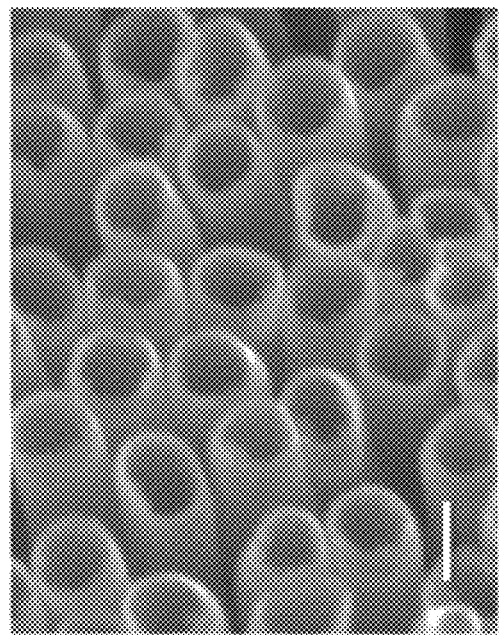

FIG. 39B shows a magnified FESEM image of the respective ends of the MIEC beehive of FIG. 39A. The scale bar is 200 nm.

FIG. 39C shows a magnified FESEM image of the respective sides of the MIEC beehive of FIG. 39A. The scale bar is 500 nm.

Figure 40:
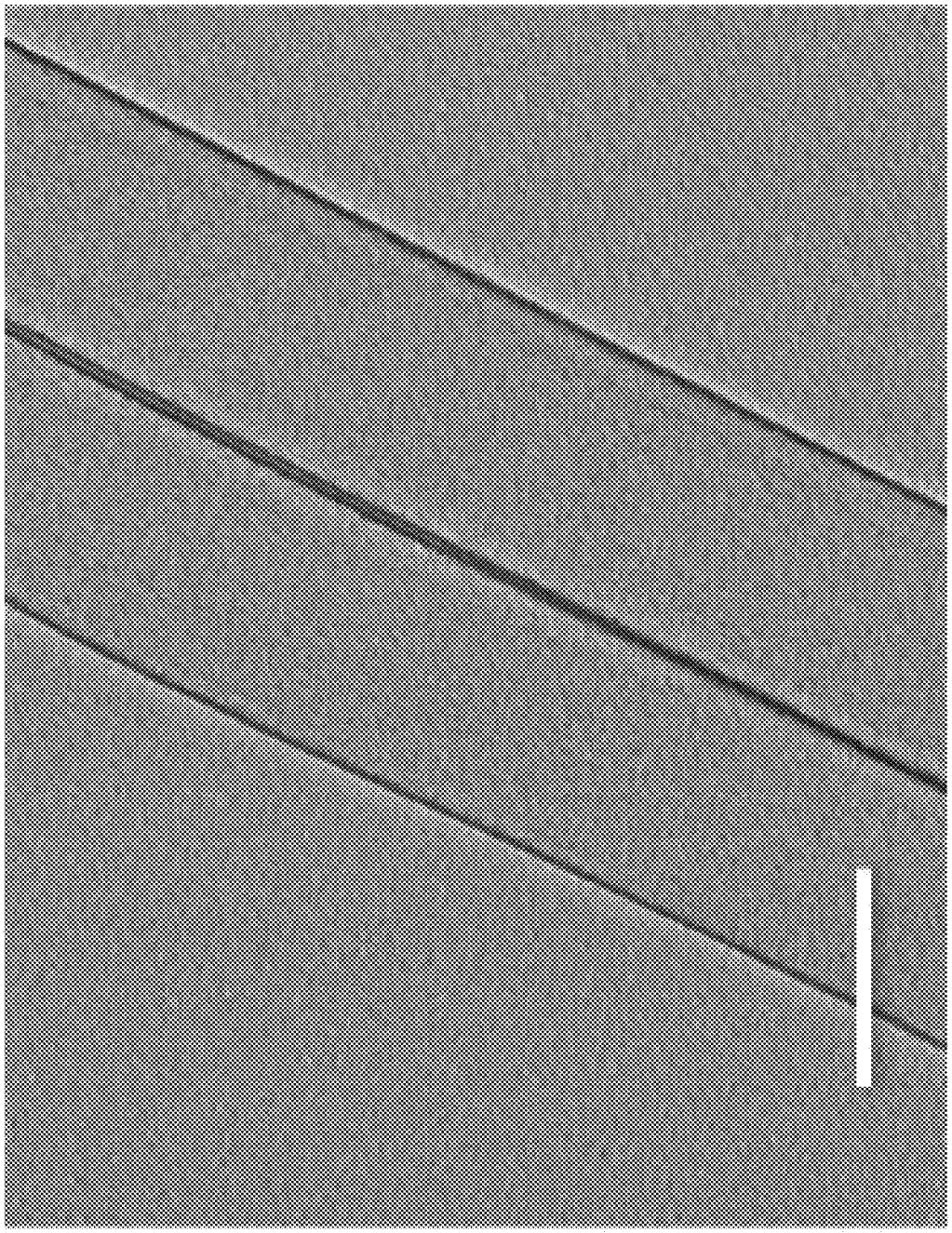

FIG. 40 shows a TEM image of the MIEC beehive of FIG. 39A. The scale bar is 200 nm.

Figure 41A:
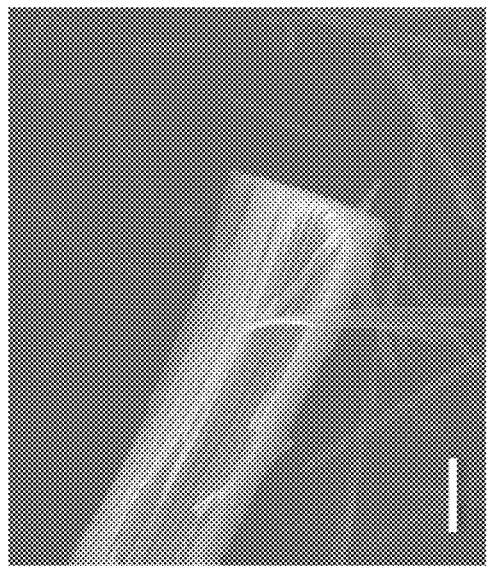

FIG. 41A shows a FESEM image of an exemplary ZnO-coated carbonaceous beehive. The scale bar is 2 μm.

Figure 41D:
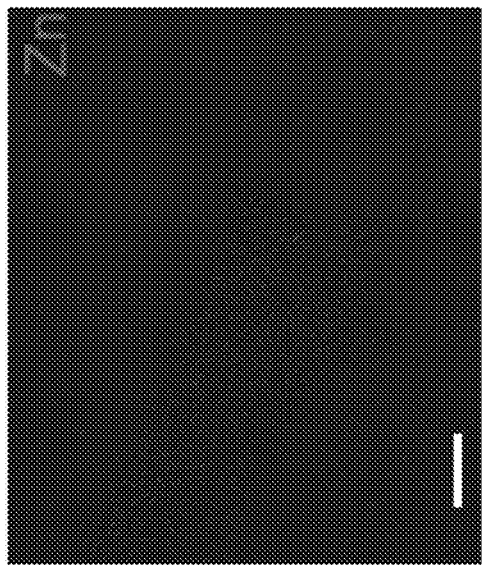
Figure 41C:
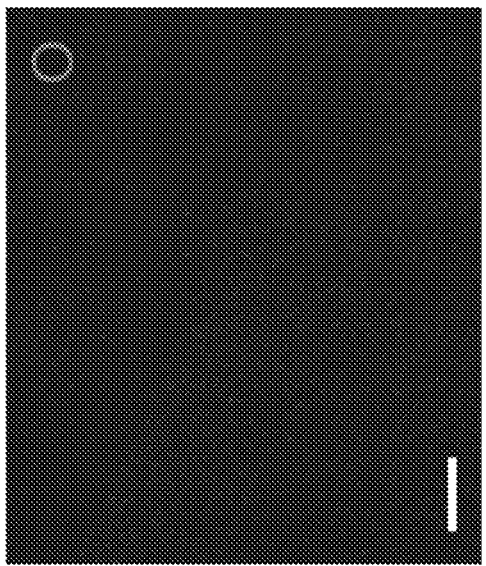
Figure 41B:
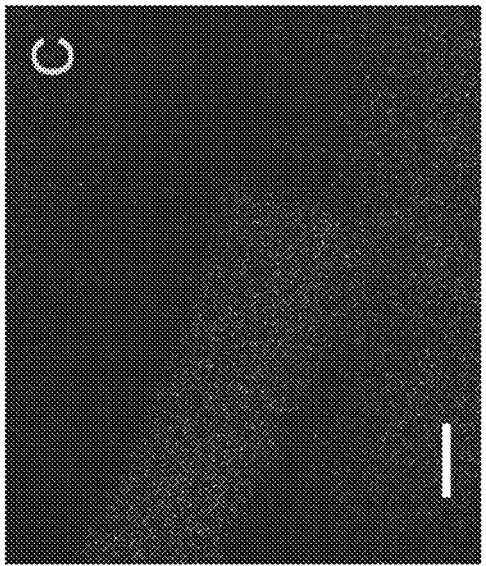

FIG. 41B shows an EDX map of C in the ZnO-coated carbonaceous beehive of FIG. 41A. The scale bar is 2 μm.

FIG. 41C shows an EDX map of O in the ZnO-coated carbonaceous beehive of FIG. 41A. The scale bar is 2 μm.

FIG. 41D shows an EDX map of Zn in the ZnO-coated carbonaceous beehive of FIG. 41A. The scale bar is 2 μm.

Figure 42:
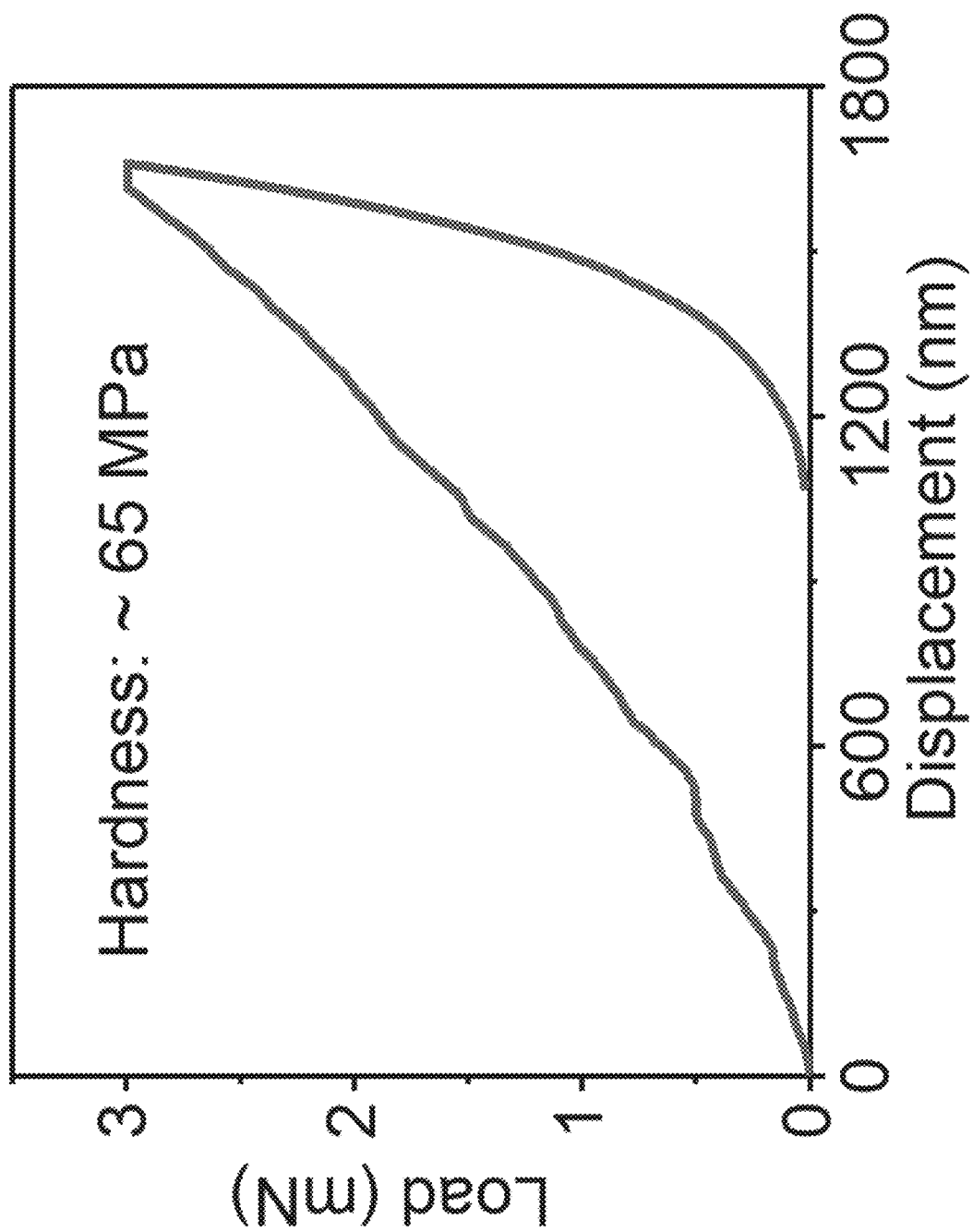

FIG. 42 shows an exemplary load-displacement curve of the MIEC beehive measured based on nanoindentation tests.

Figure 43:
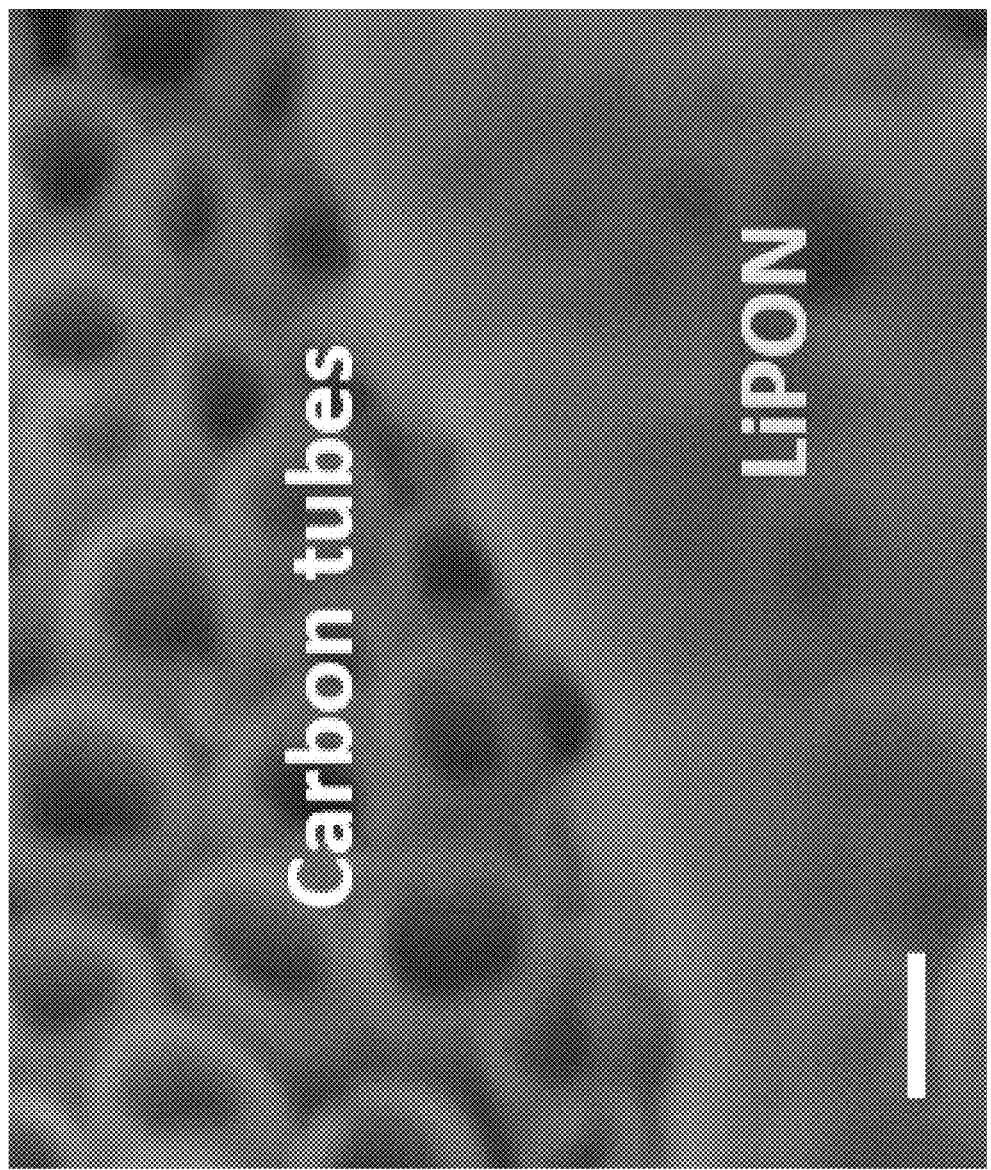

FIG. 43 shows a FESEM image of an exemplary carbonaceous beehive covered with a layer of LiPON. The scale bar is 200 nm.

Figure 44B:
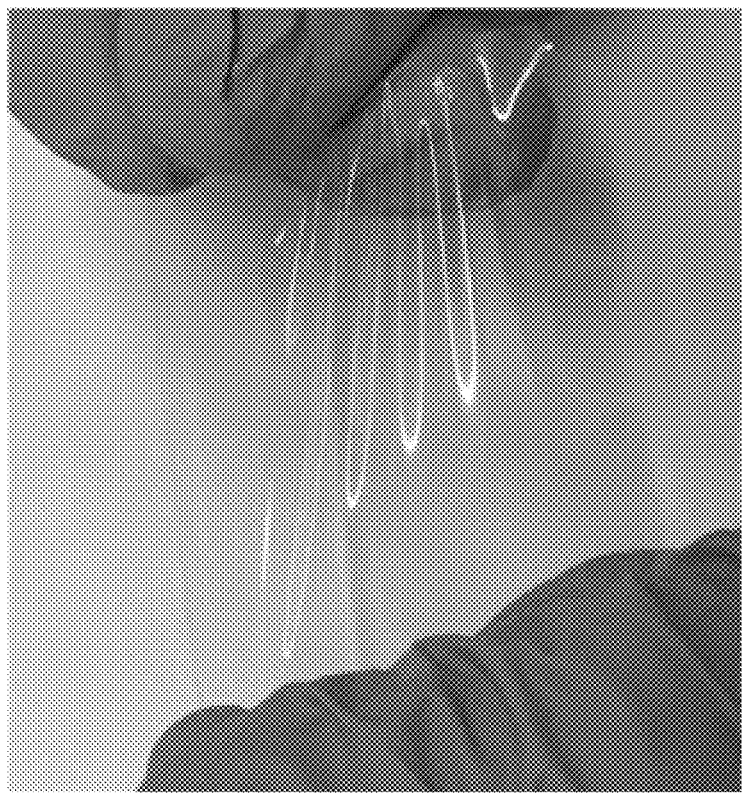
Figure 44A:
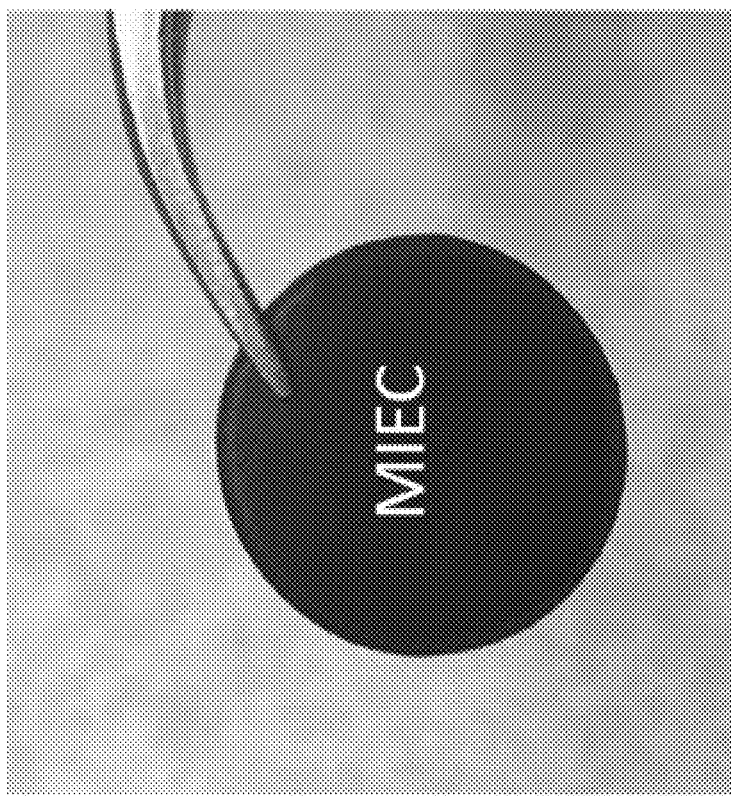

FIG. 44A shows a top view of an exemplary carbonaceous MIEC beehive.

FIG. 44B shows an image of an exemplary P(EO/EM/AGE)/LiTFSI solid electrolyte film.

Figure 44D:
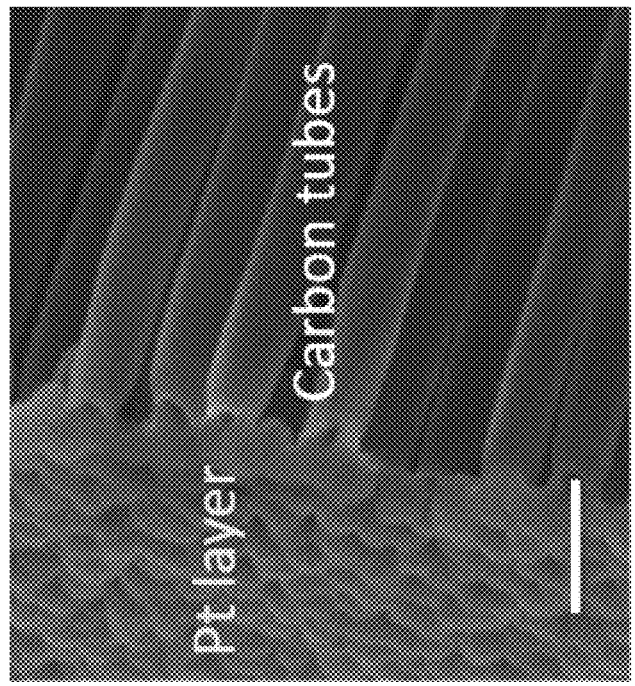
Figure 44C:
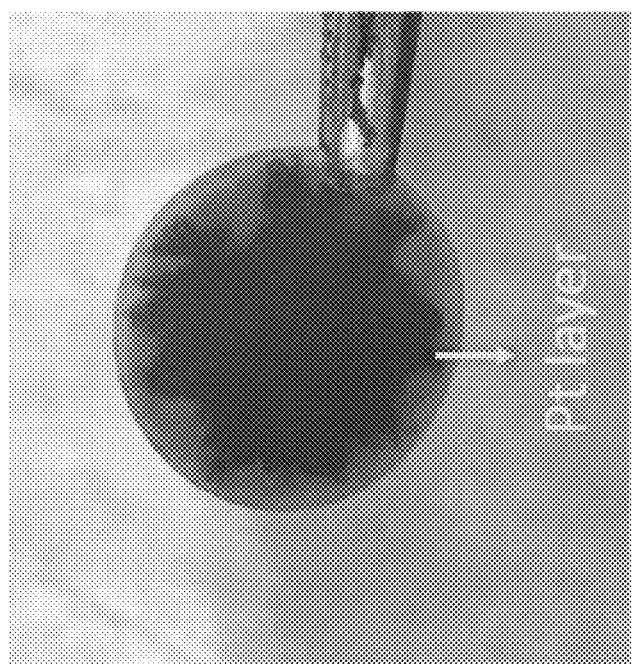

FIG. 44C shows a bottom view of the MIEC beehive of FIG. 44A. The platinum (Pt) layer is shown.

FIG. 44D shows a FESEM image of the MIEC beehive of FIG. 44A. As shown, the aligned carbon tubes are bonded to the Pt layer. The scale bar is 500 nm.

Figure 45A:
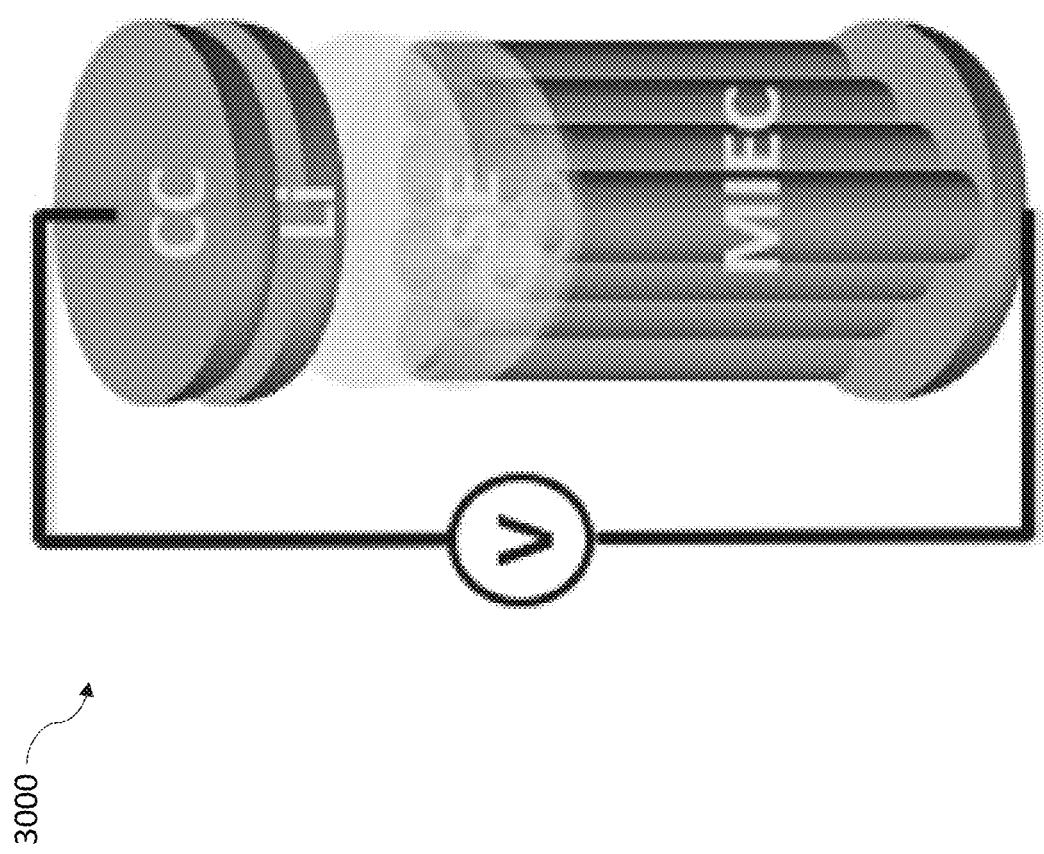

FIG. 45A shows a schematic of an exemplary half-cell using a MIEC beehive to evaluate electrochemical performance.

Figure 45C:
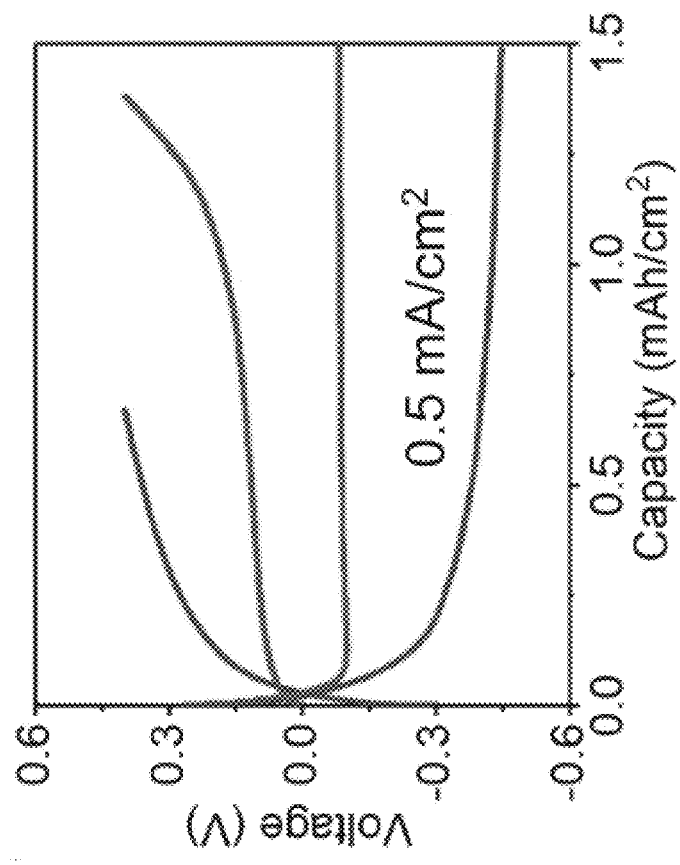
Figure 45B:
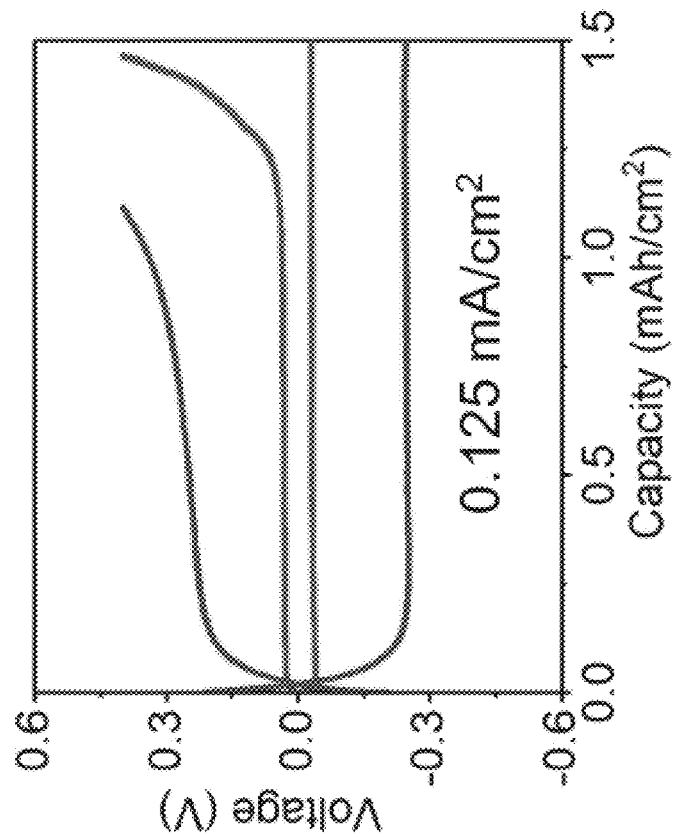

FIG. 45B shows an exemplary charge/discharge profile for Li plating of a half-cell.

FIG. 45C shows an exemplary charge/discharge profile for Li stripping of a half-cell.

Figure 45D:
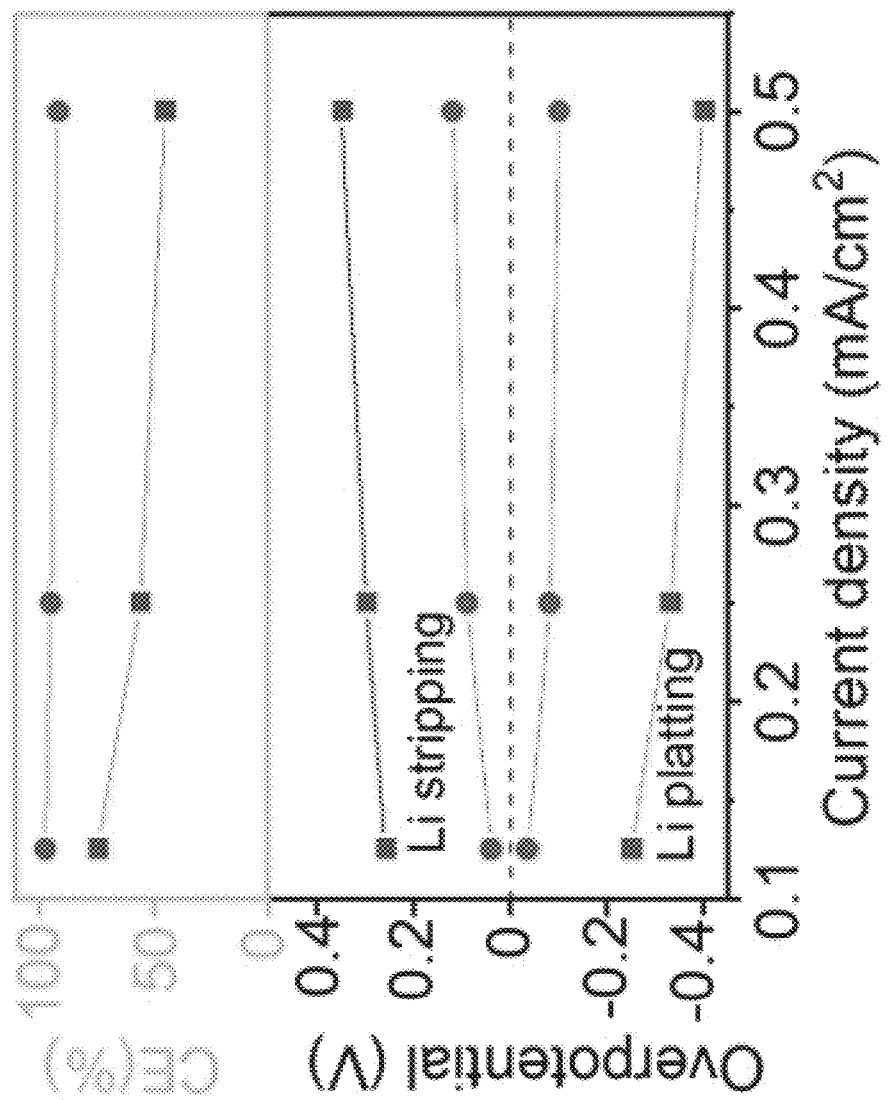

FIG. 45D shows the overpotential and CE of the half-cell at various current densities.

Figure 45E:
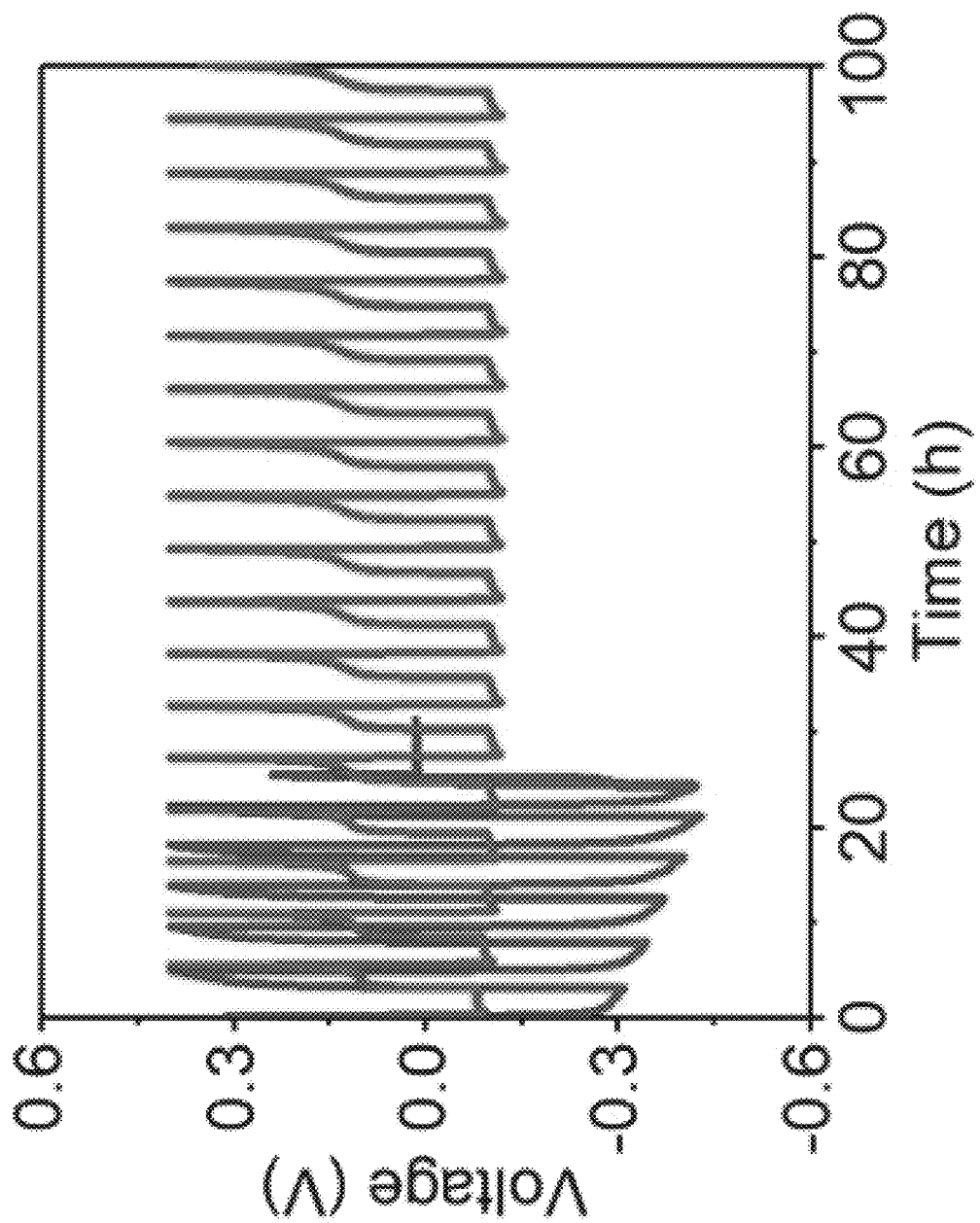

FIG. 45E shows the charge/discharge voltage profile of the Li/SE/MIEC beehive half-cell as a function of time.

Figure 45F:
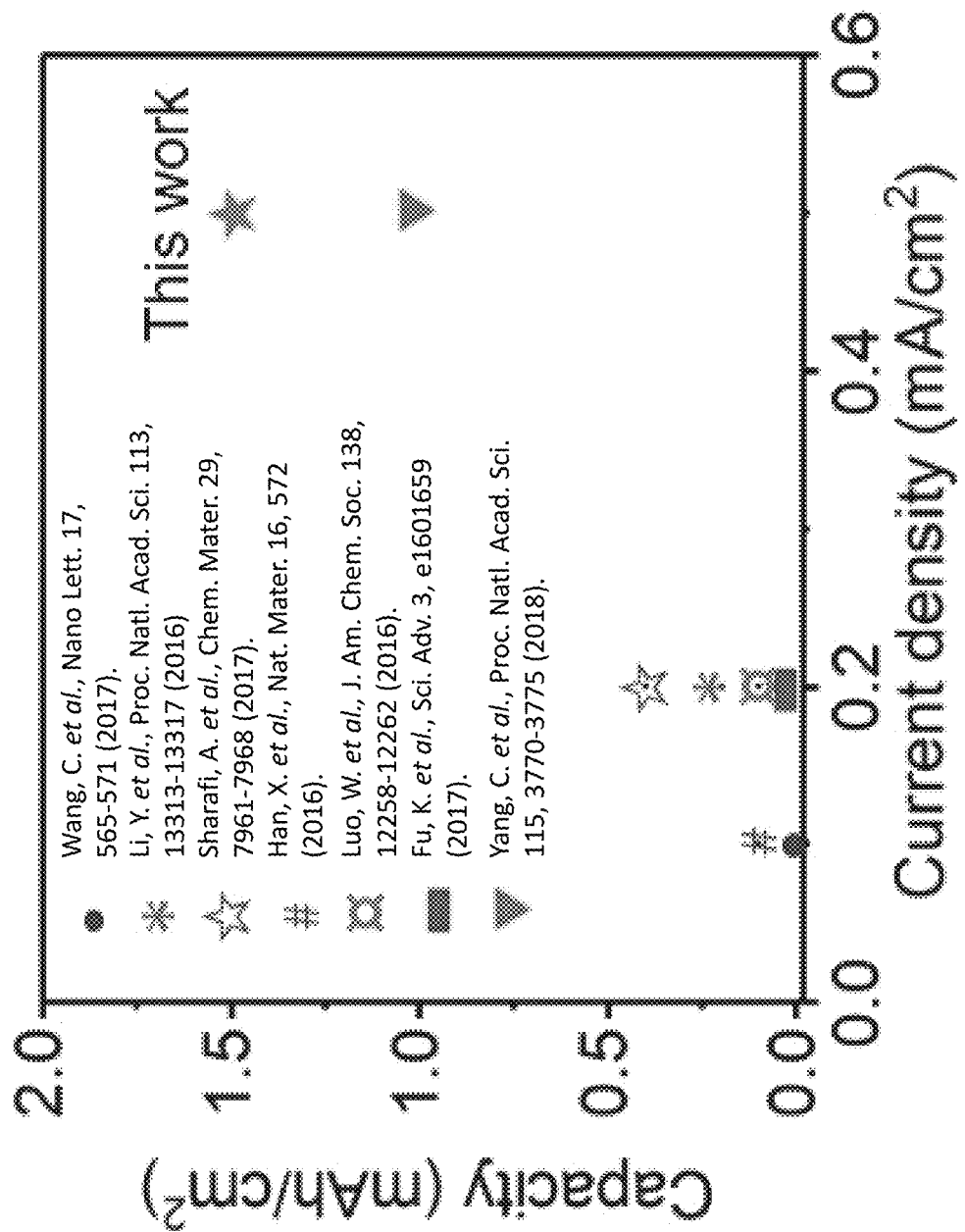

FIG. 45F shows a comparison of the current density and areal capacity of the anode in the present disclosure and previous anodes used in all-solid-state batteries. The pink symbol represents a half-cell with a 3D MIEC beehive on the Pt layer as a Li host. The green symbol represents a half-cell with a carbon-coated Cu foil as a Li host.

Figure 46:
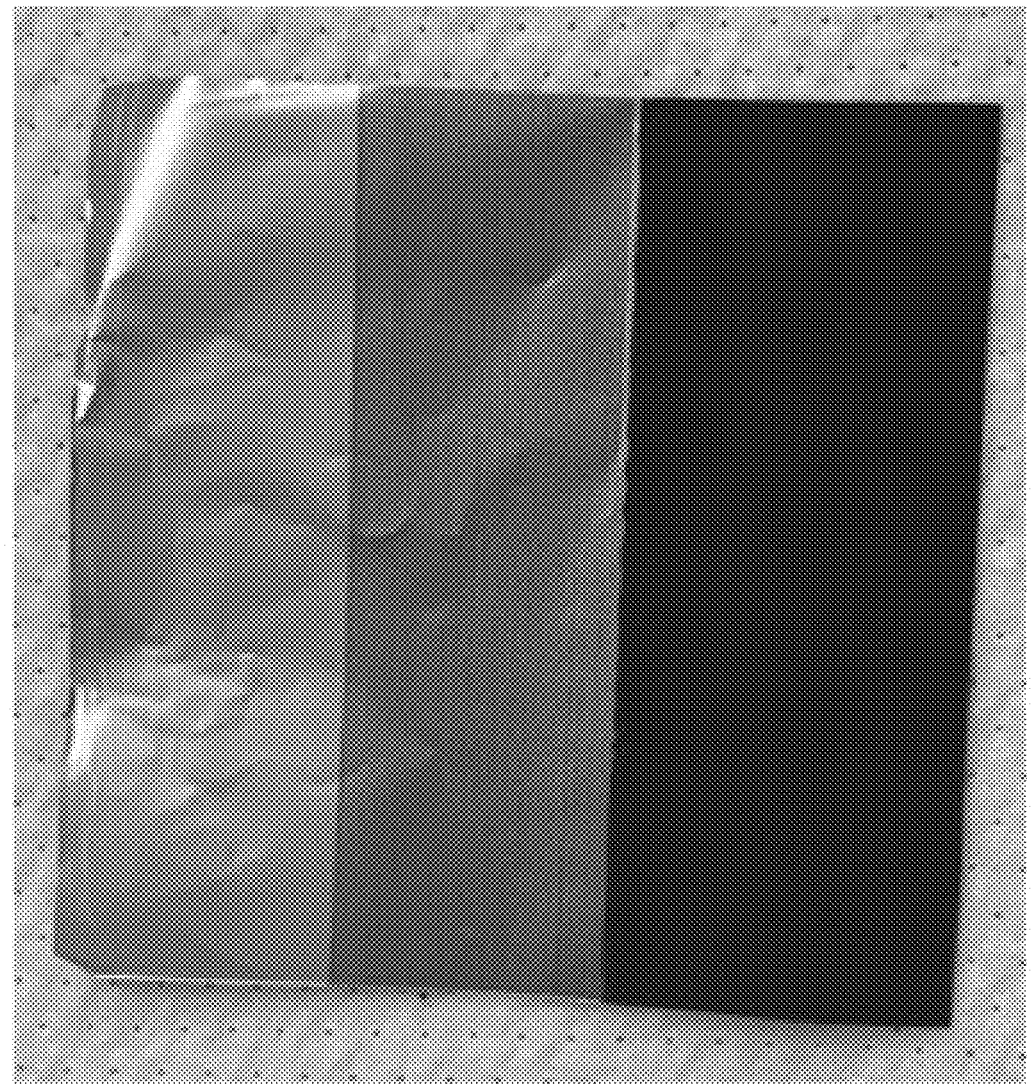

FIG. 46 shows an image of an exemplary $LiFePO_4$ cathode.

Figure 47B:
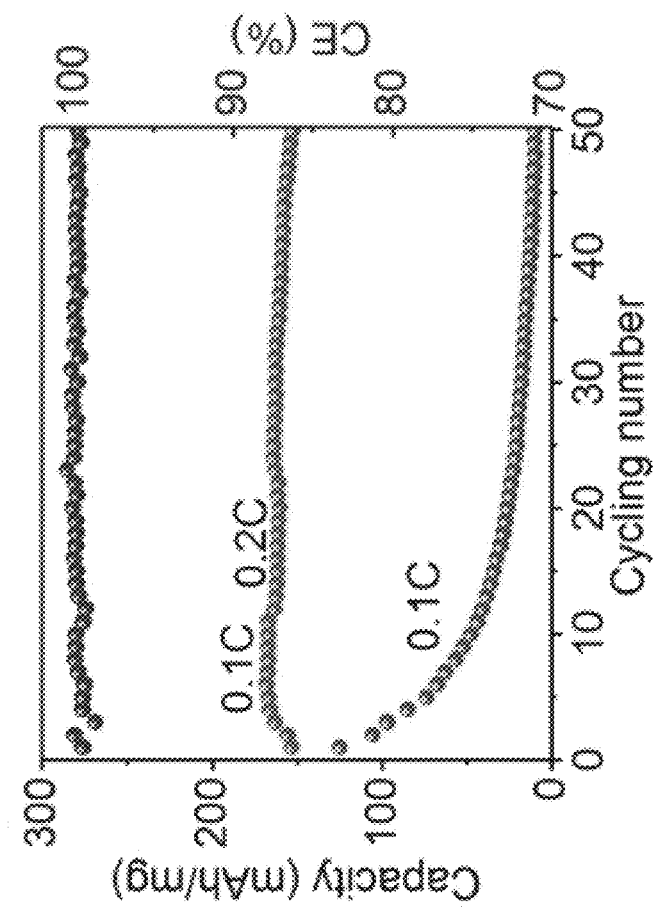
Figure 47A:
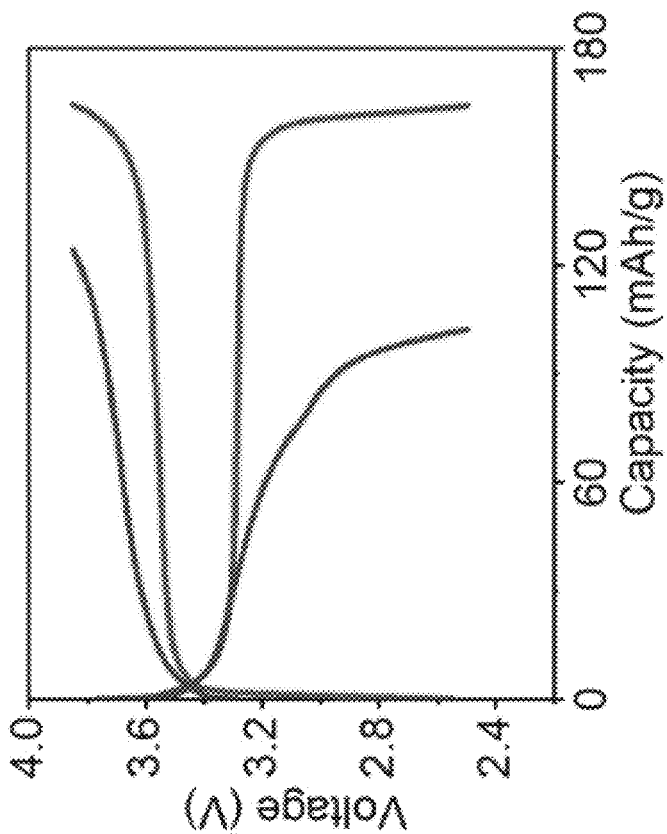

FIG. 47A shows the charge/discharge profile at 0.1 C of an exemplary full-cell all-solid-state battery with the MIEC beehive. The battery is a 1× excess Li-pre-deposited MIEC/SE/$LiFePO_4$ battery.

FIG. 47B shows the capacity and Coulombic efficiency (CE) as a function of the number of cycles for the all-solid-state battery of FIG. 47A. The blue line is the CE of the all-solid-state battery with the 3D MIEC beehive.

Figure 48B:
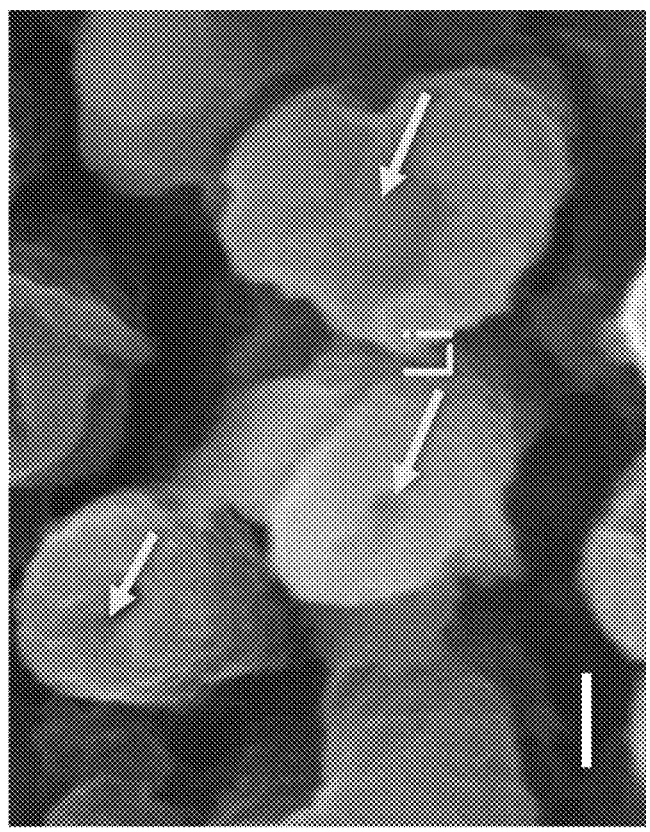
Figure 48A:
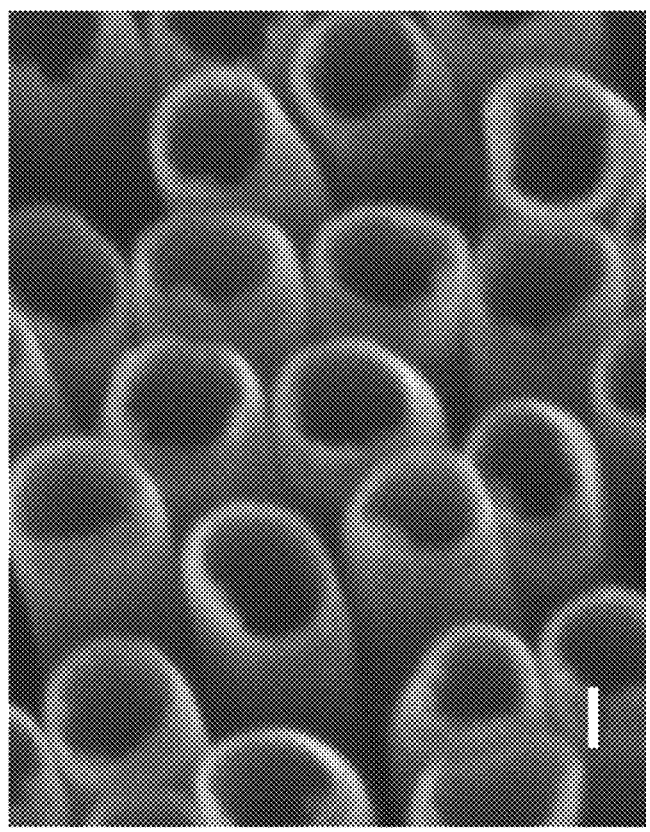

FIG. 48A shows a FESEM image of the open pore structure of the MIEC before Li plating. The scale bar is 100 nm.

FIG. 48B shows a FESEM image of the open pore structure of the MIEC after Li plating. The scale bar is 100 nm.

Figure 49A:
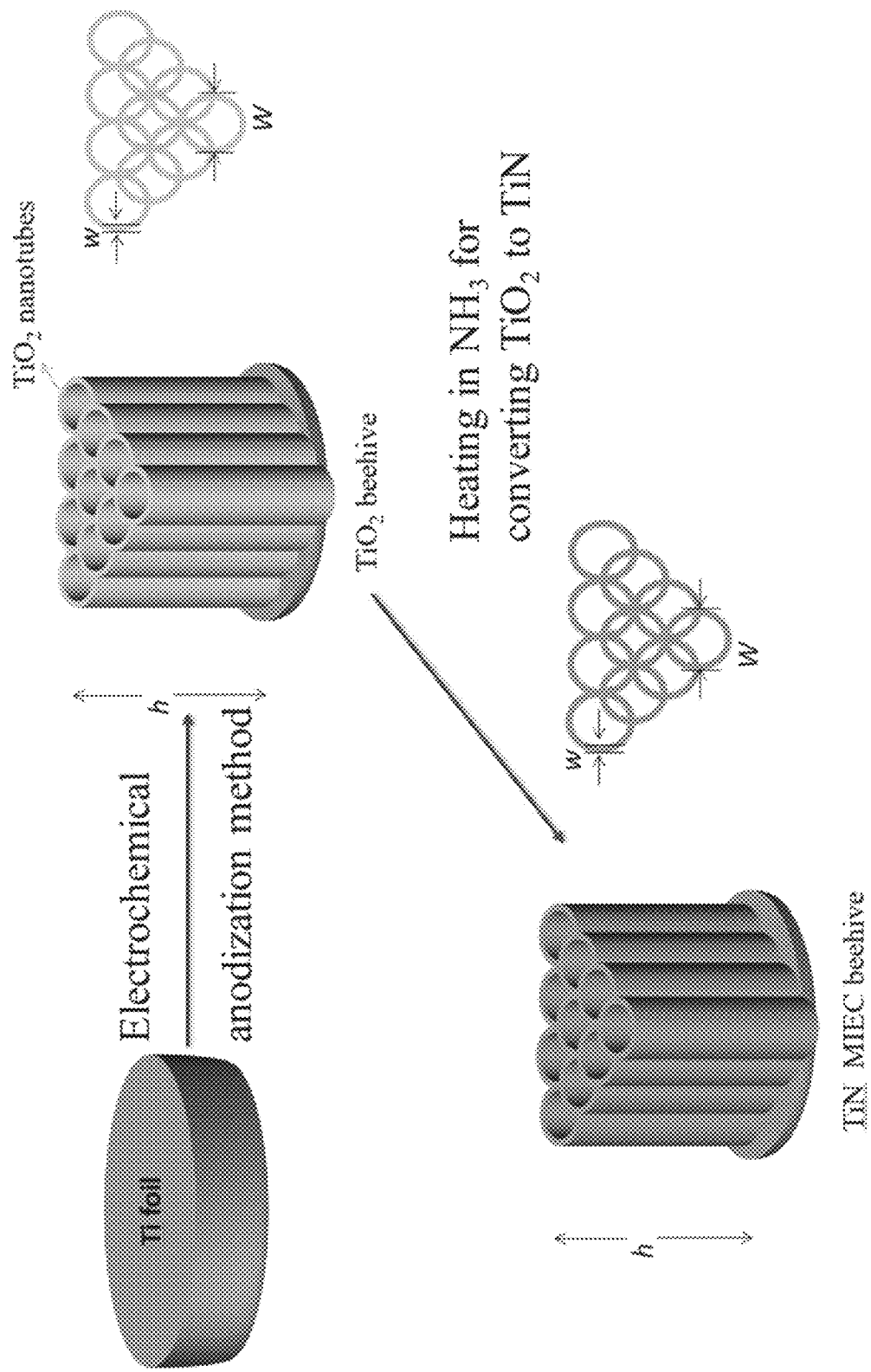

FIG. 49A shows a schematic of an exemplary titanium nitride (TiN) MIEC beehive fabrication process.

Figure 49C:
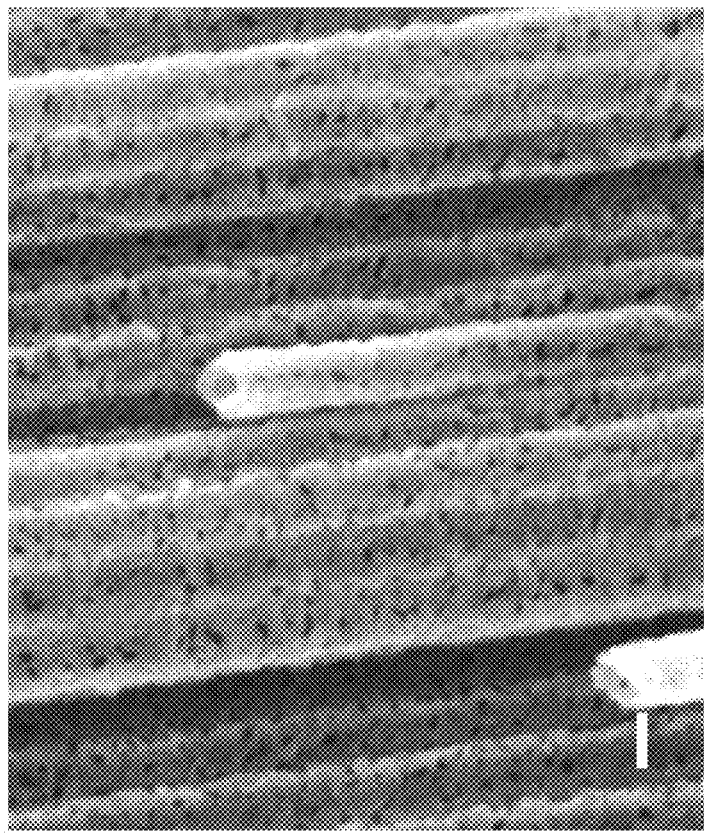
Figure 49B:
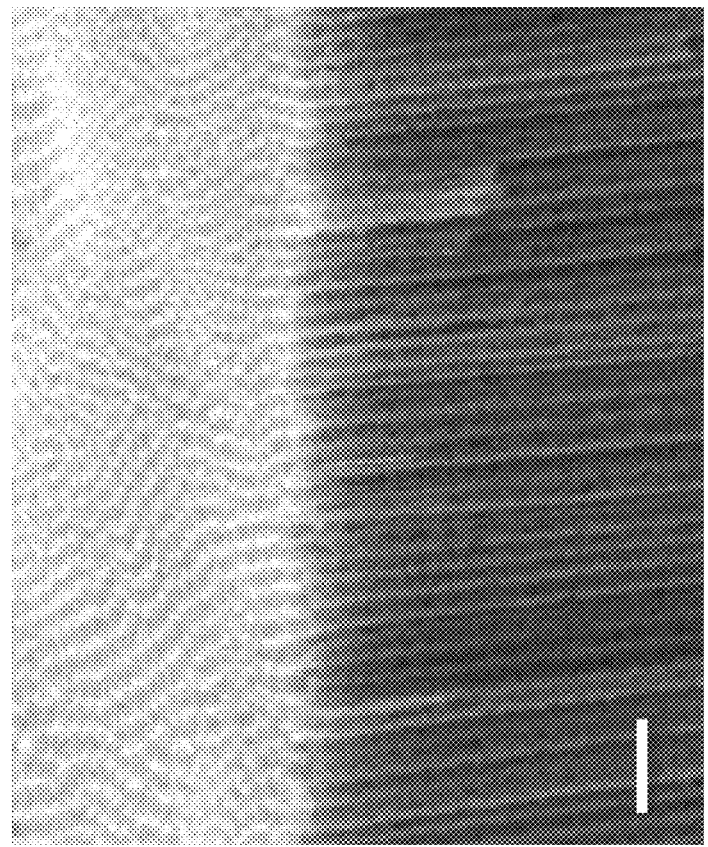

FIG. 49B shows a FESEM image of an exemplary TiN MIEC with a beehive open-pore structure formed from TiN nanotubes. The scale bar is 500 nm.

FIG. 49C shows a magnified FESEM image of the sides of the MIEC beehive of FIG. 49B. The scale bar is 100 nm.

Figure 49E:
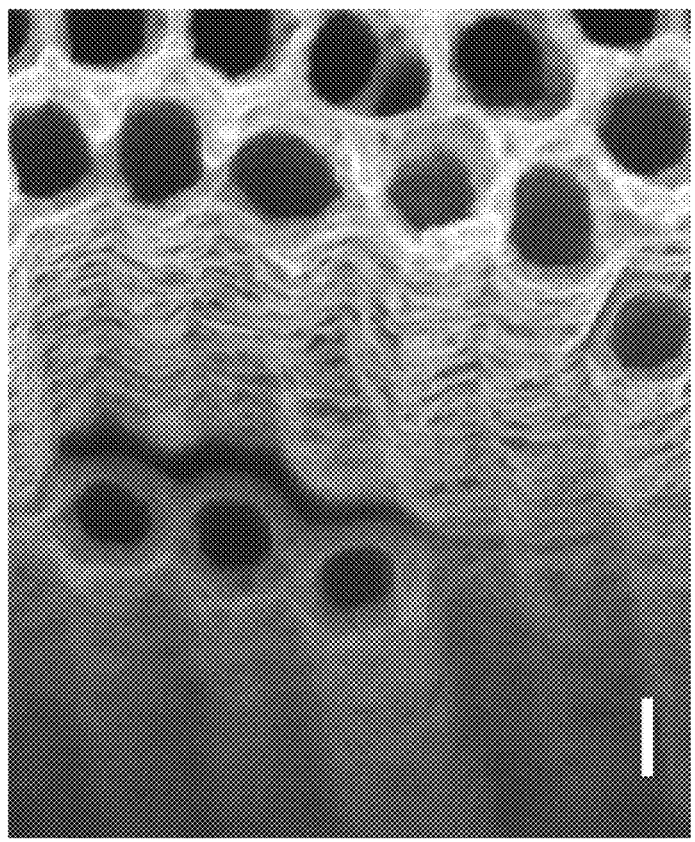
Figure 49D:
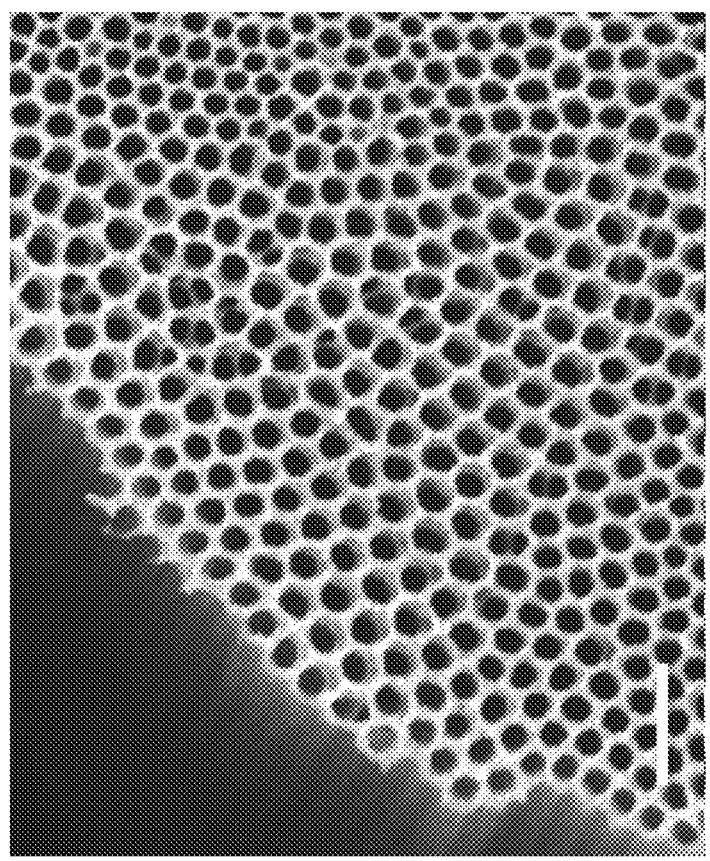

FIG. 49D shows a FESEM image of the ends of the MIEC beehive of FIG. 49B.

The scale bar is 500 nm.

FIG. 49E shows a magnified FESEM image of the ends of the MIEC beehive of FIG. 49D. The scale bar is 100 nm.

Figure 50A:
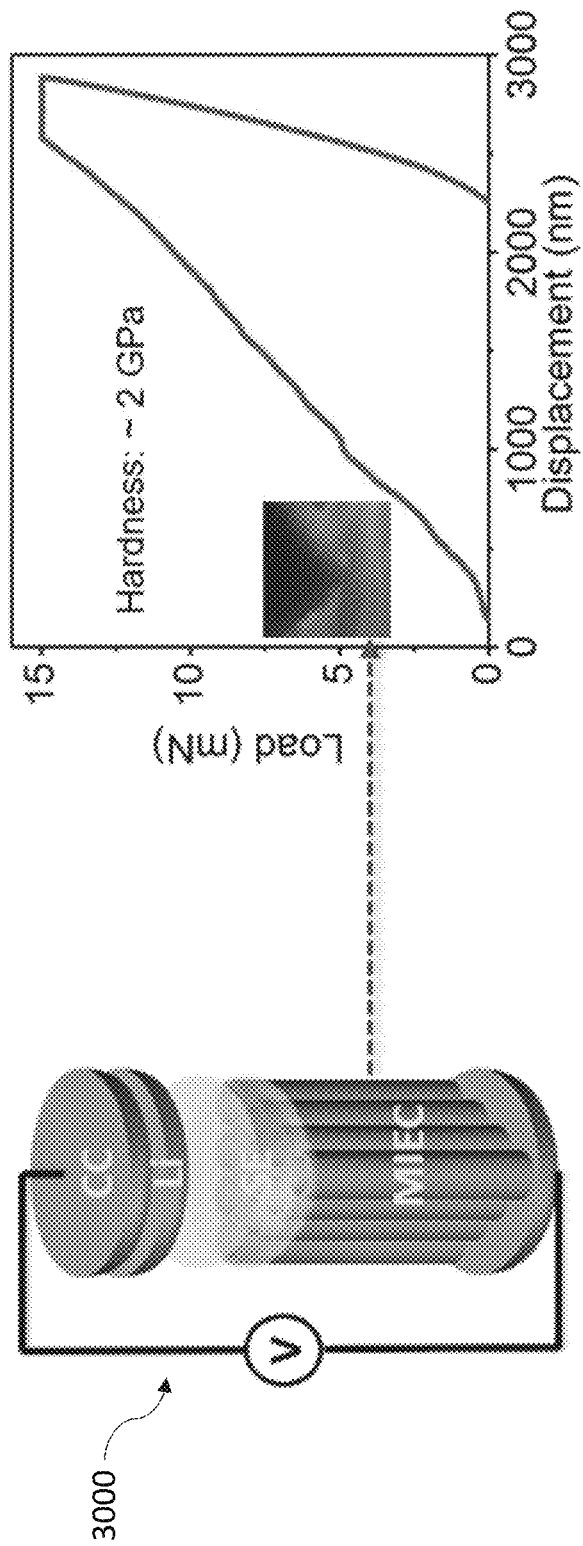

FIG. 50A shows a load-displacement curve of an exemplary TiN MIEC measured using a nanoindentation test.

Figure 50C:
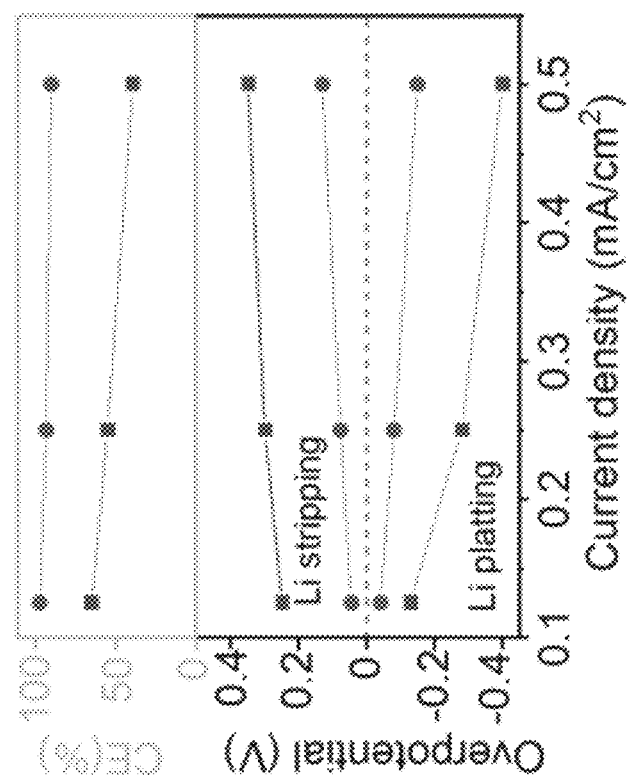
Figure 50B:
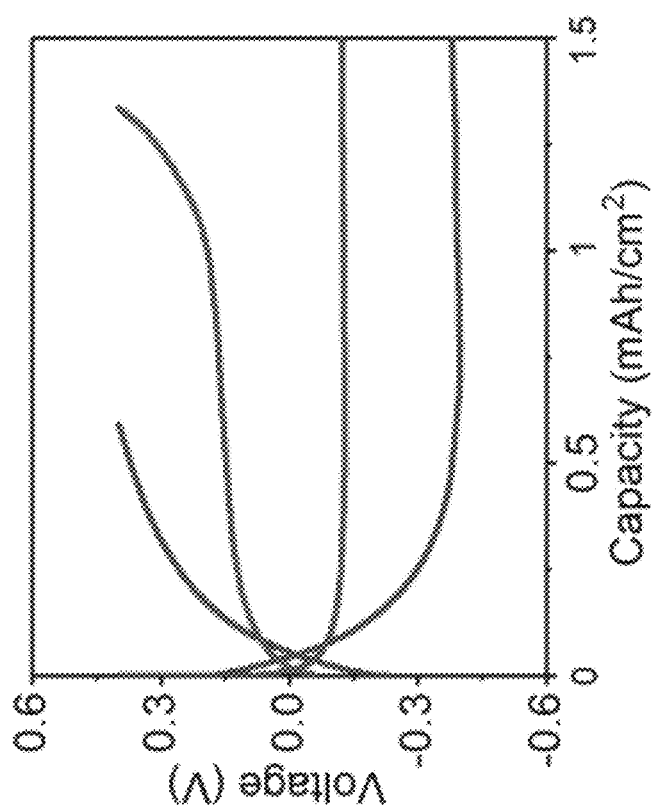

FIG. 50B shows an exemplary charge/discharge profile for Li plating/stripping in a TiN MIEC half-cell. The pink line is for a TiN MIEC beehive on as a Li host.

FIG. 50C shows the overpotential and CE of the TiN MIEC half-cell at various current densities. The pink line is for a TiN MIEC beehive on as a Li host.

Figure 50D:
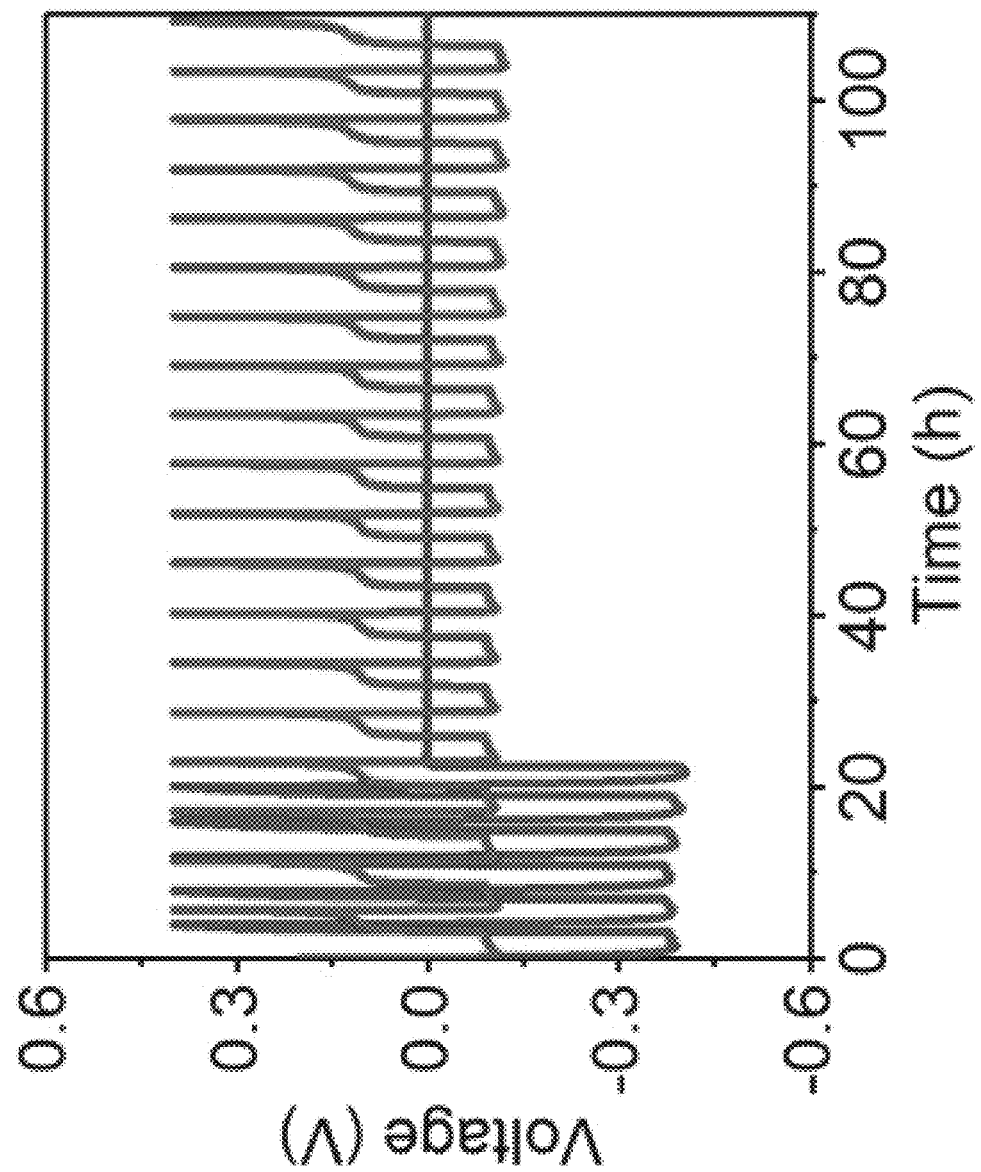

FIG. 50D shows the charge/discharge voltage profile of the Li/SE/TiN MIEC beehive half-cell as a function of time. The pink line is for a TiN MIEC beehive on as a Li host FIG. 51A shows an exemplary charge/discharge profile for Li plating/stripping in a TiN MIEC full-cell battery.

Figure 51B:
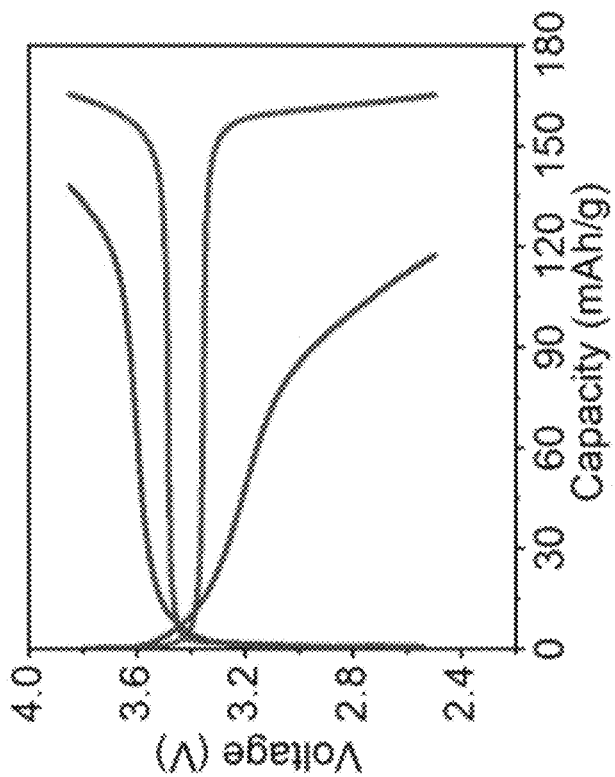
Figure 51A:
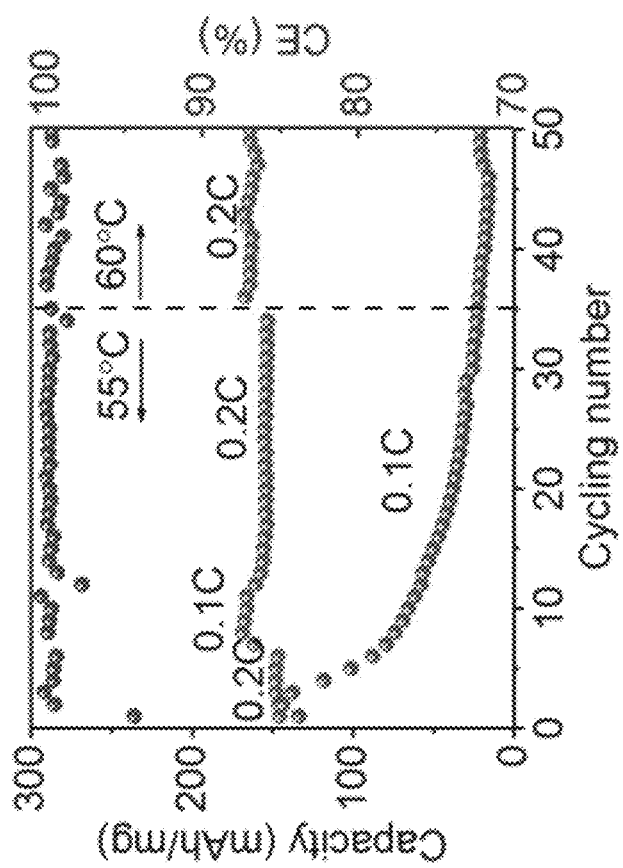

FIG. 51B shows the capacity and Coulombic efficiency (CE) as a function of the number of cycles for the TiN MIEC full-cell battery of FIG. 51A. The blue line is the CE of the TiN MIEC full-cell battery.

Figure 52A:
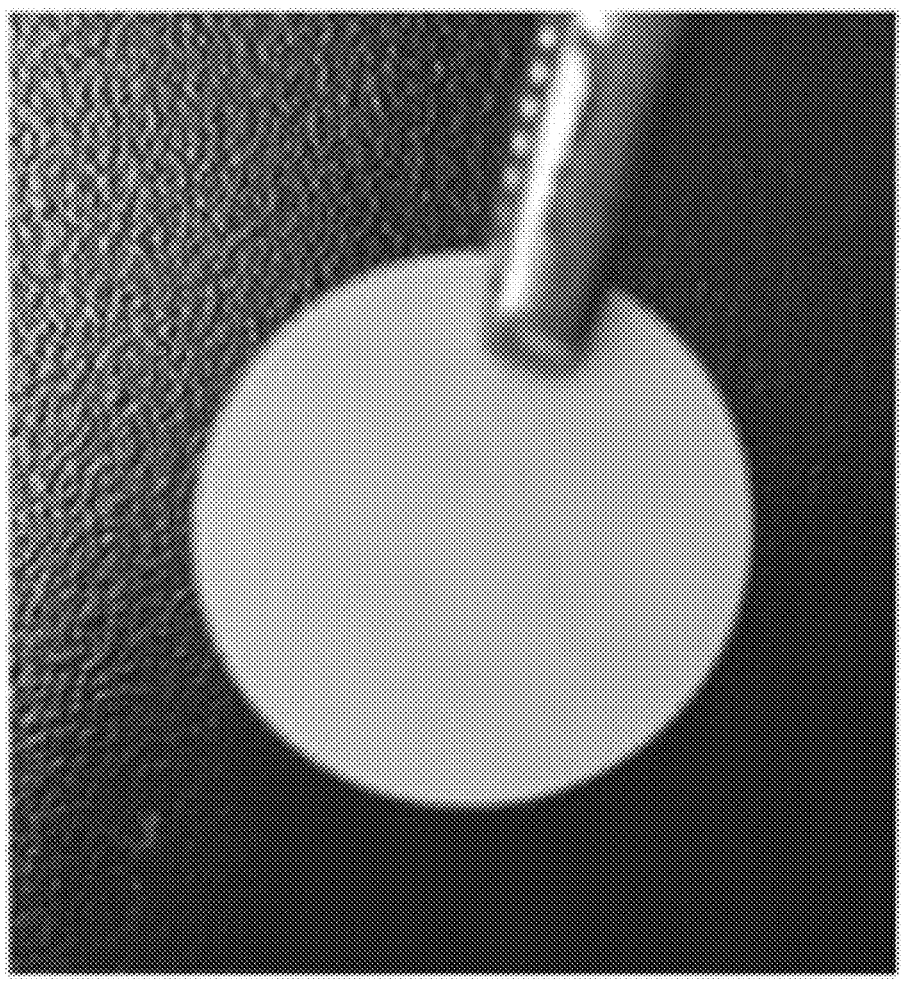

FIG. 52A shows an image of an exemplary MIEC formed using an anodic aluminum oxide (AAO) template.

Figure 52C:
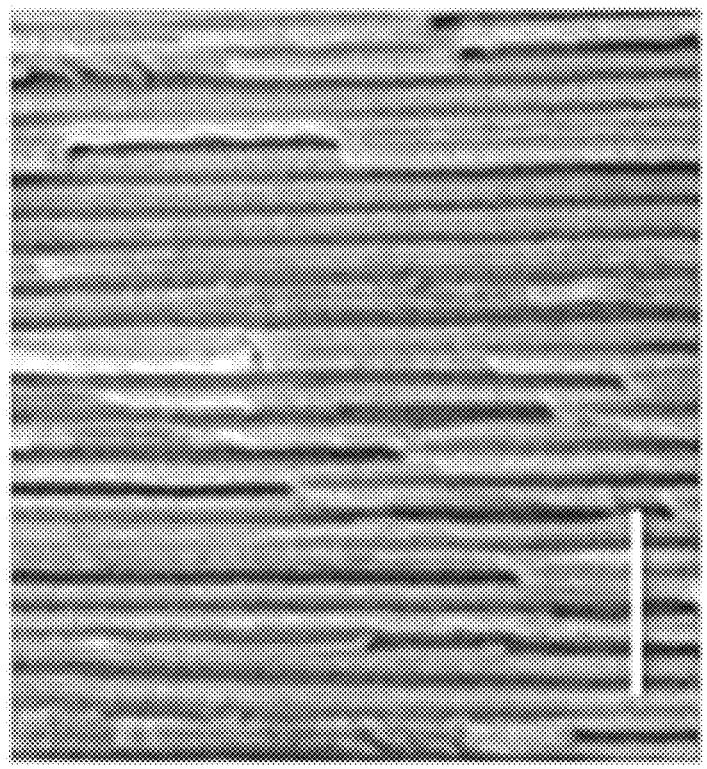
Figure 52B:
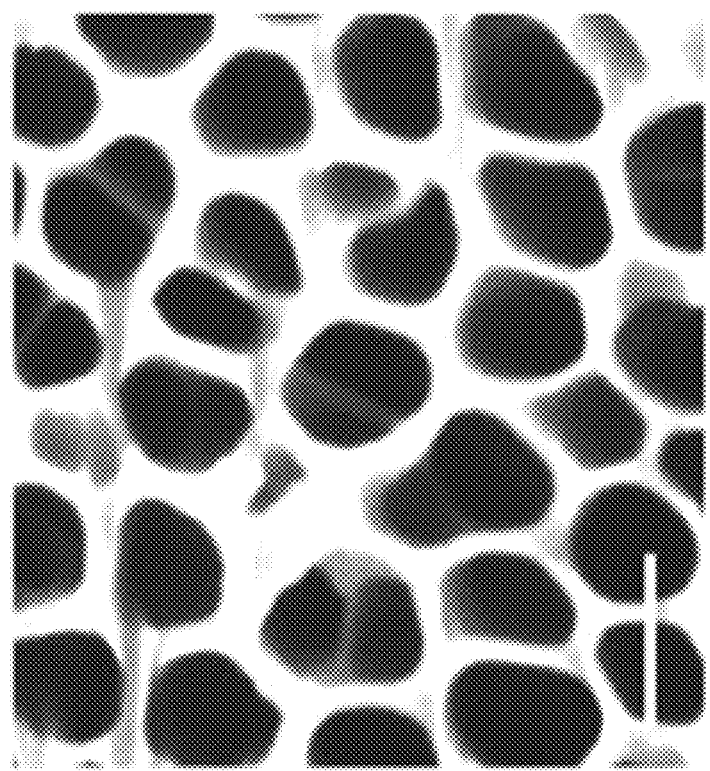

FIG. 52B shows a SEM image of the ends of the AAO MIEC of FIG. 52A.

FIG. 52C shows a SEM image of the sides of the AAO MIEC of FIG. 52A.

Figure 53B:
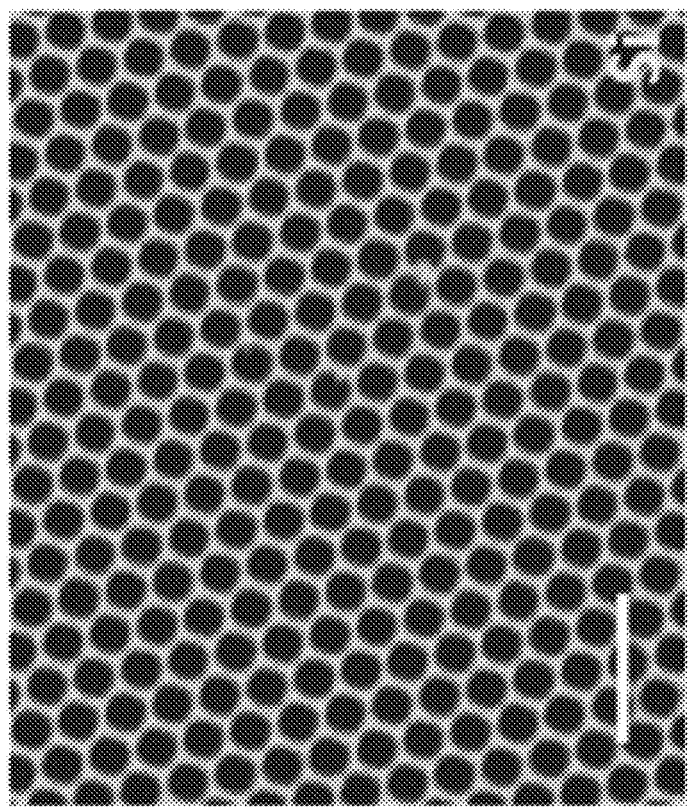
Figure 53A:
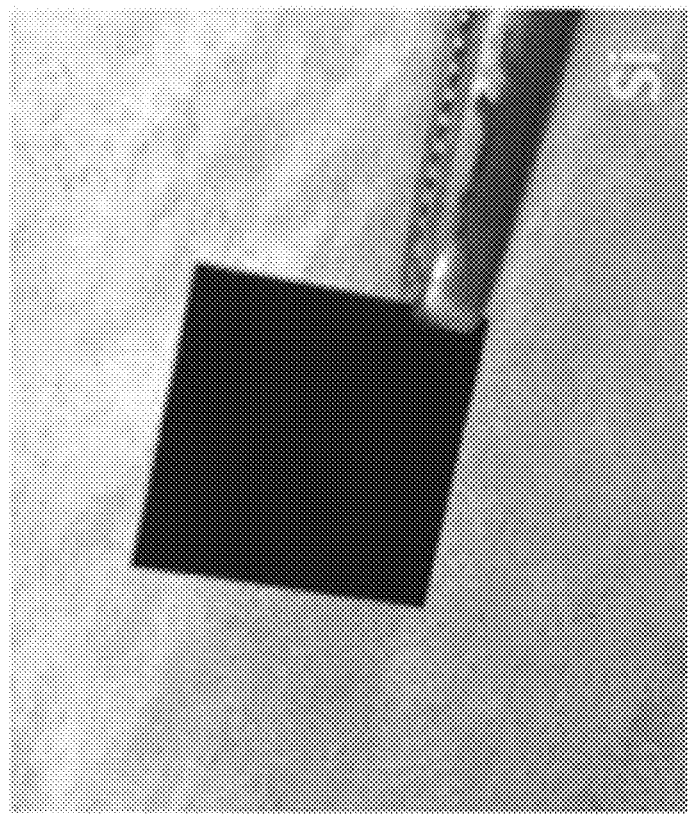

FIG. 53A shows an image of an exemplary MIEC formed using a silicon mesh.

FIG. 53B shows a SEM image of the ends of the Si MIEC of FIG. 53A.

Figure 53D:
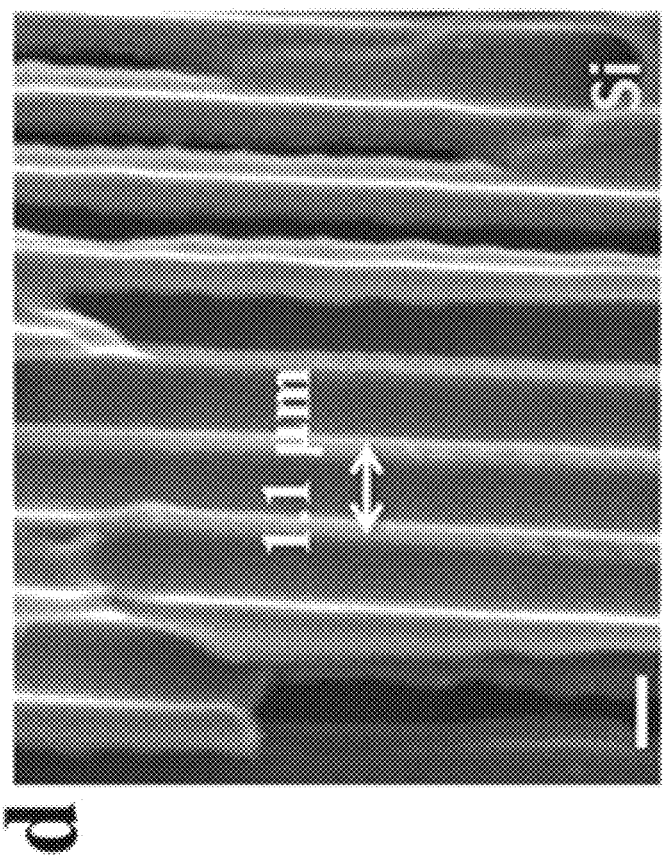
Figure 53C:
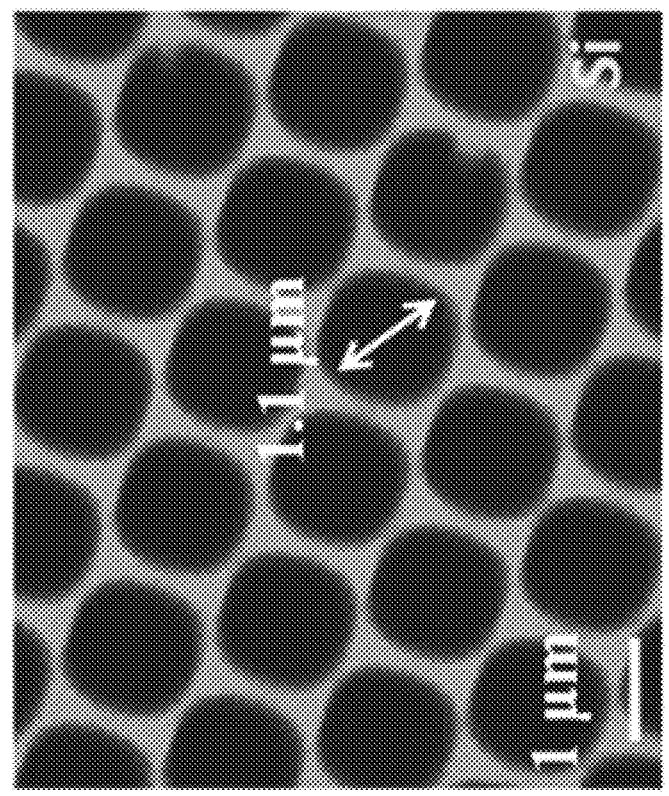

FIG. 53C shows a magnified SEM image of the ends of the SI MIEC of FIG. 53B.

FIG. 53D shows a SEM image of the sides of the Si MIEC of FIG. 53A.

Figure 54:
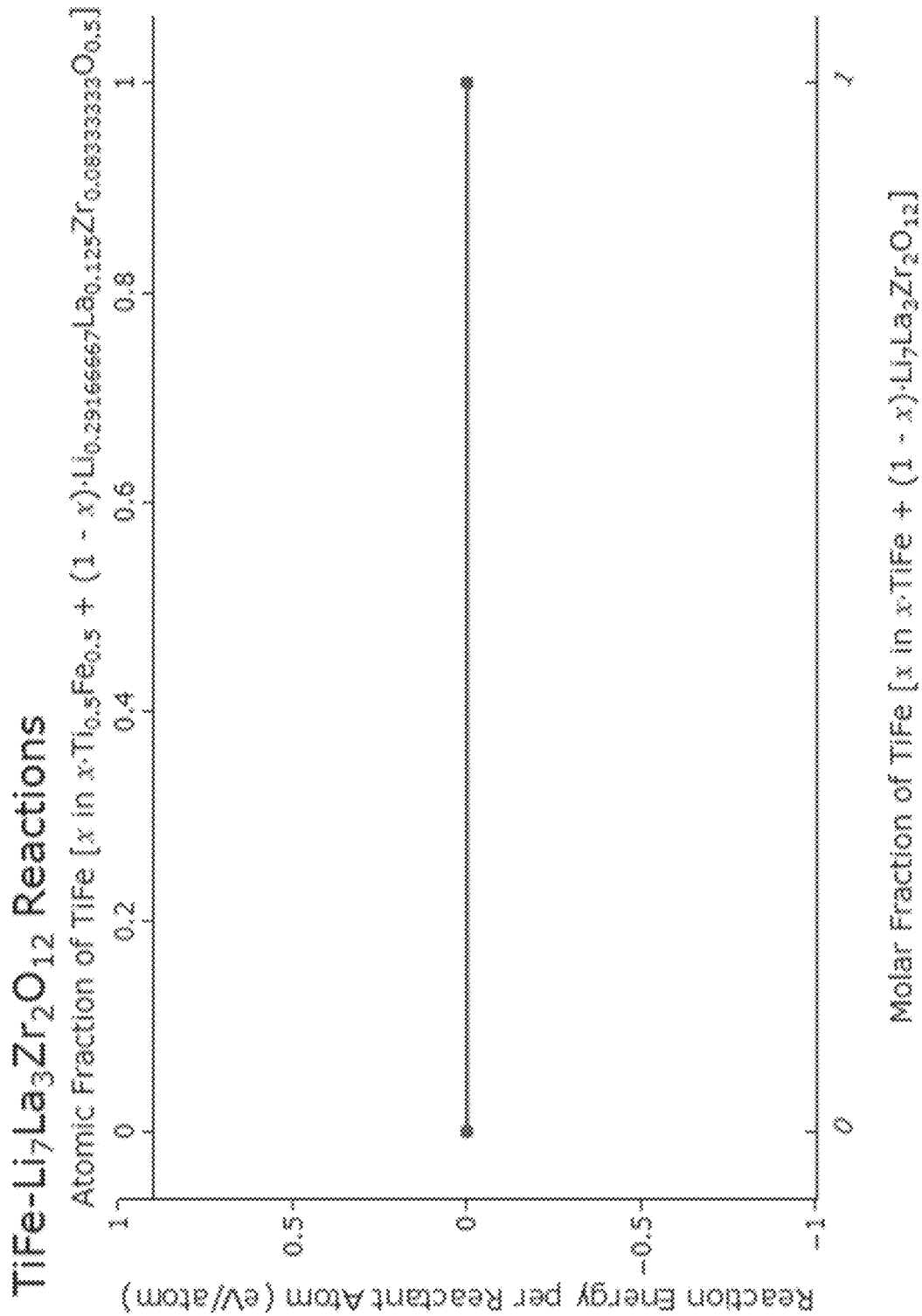

FIG. 54 shows an equilibrium phase diagram between TiFe and $Li_7La_3Zr_2O_{12}$.

Figure 55:
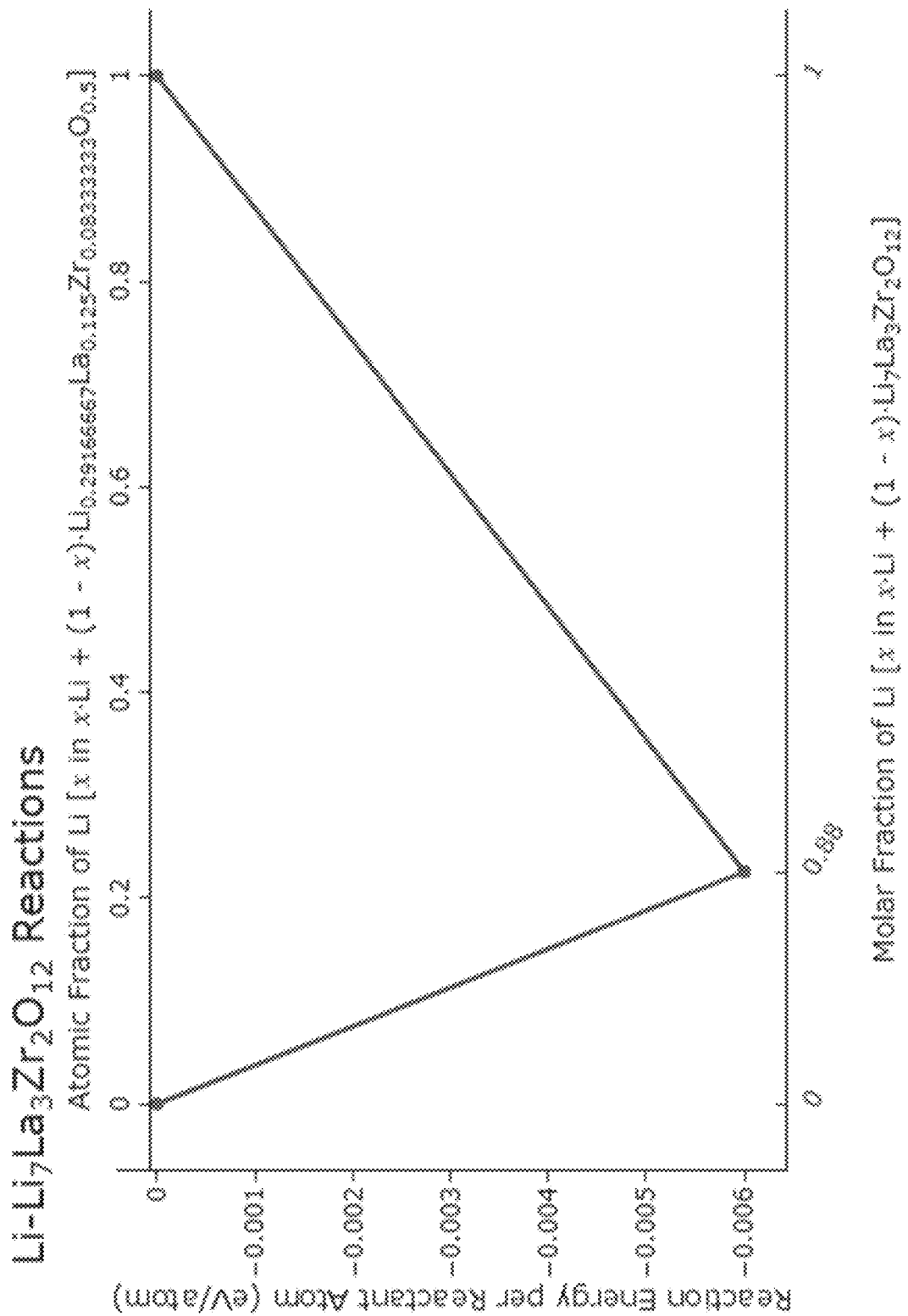

FIG. 55 shows an equilibrium phase diagram between Li and $Li_7La_3Zr_2O_{12}$.

Figure 56:
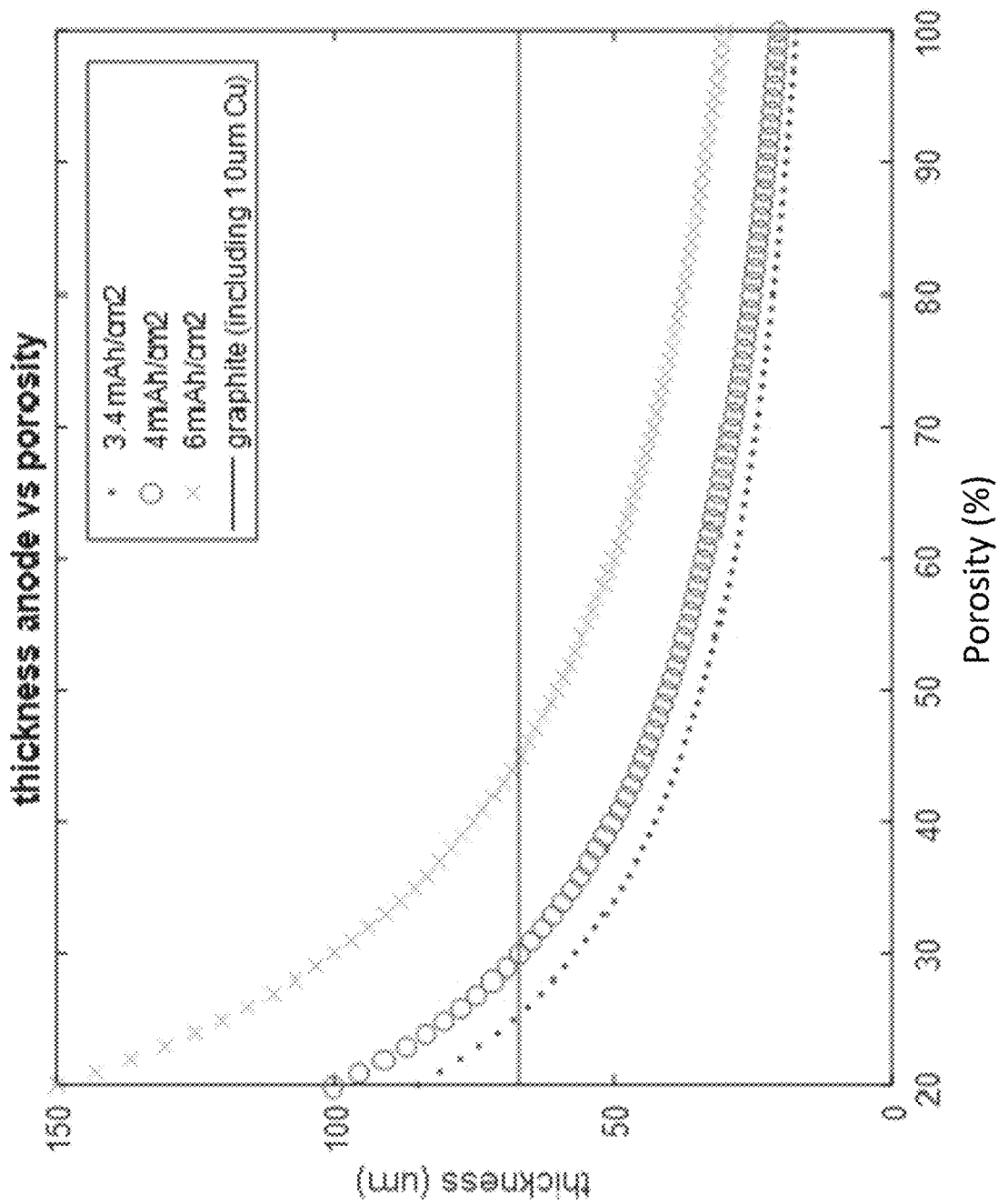

FIG. 56 shows the relationship between anode thickness and porosity for MIECs with different areal capacities.

DETAILED DESCRIPTION

Following below are more detailed descriptions of various concepts related to, and implementations of, an anode that includes a mixed ionic-electronic conductor (MIEC) forming an open pore structure to facilitate the transport of an alkali metal during charging or discharging of a battery. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of a MIEC, a solid electrolyte, an anode formed from the MIEC, an open pore structure, and a battery formed from the anode and the solid electrolyte. It should be appreciated that one or more features discussed in connection with a given example may be employed in other examples according to the present disclosure, such that the various features disclosed herein may be readily combined in a given system according to the present disclosure (provided that respective features are not mutually inconsistent).

An Exemplary Anode with a Mixed Ionic-Electronic Conductor (MIEC)

Figure 1:
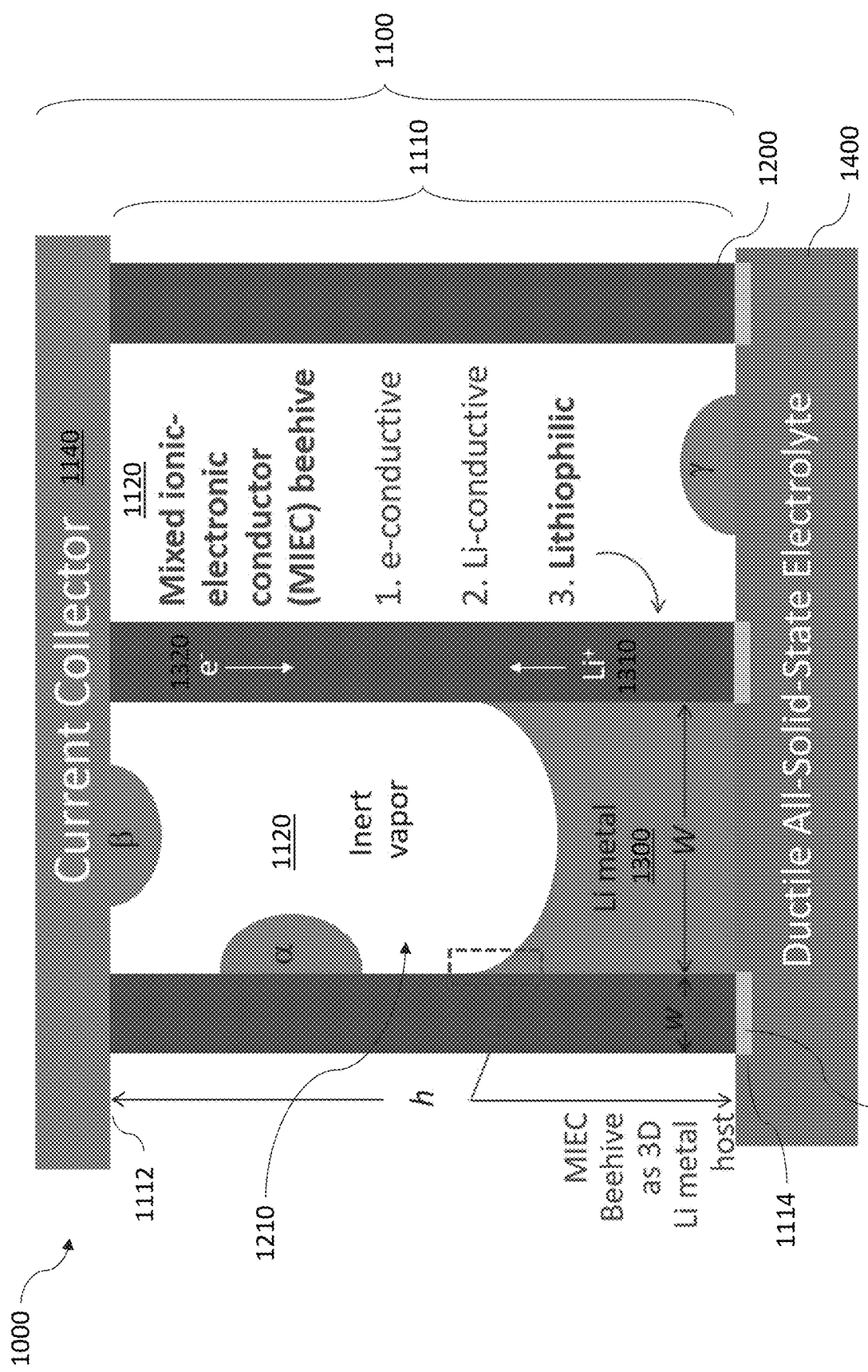
FIG. 1 shows a cross-sectional view of an exemplary battery with an anode formed, in part, using a mixed ionic-electronic conductor (MIEC) shaped as a honeycomb structure.

FIG. 1 shows an exemplary battery 1000 that comprises an anode 1100 and a solid electrolyte 1400. The anode 1100 may include a mixed ionic-electronic conductor (MIEC) 1110 that forms an open pore structure 1120. When the battery 1000 is being charged and/or discharged, an alkali metal 1300 may be transported into and/or out of the open pore structure 1120. Said in another way, the MIEC 1110 functions as a host for the alkali metal 1300 by storing and/or releasing the alkali metal 1300 via the open pore structure 1120. The open pore structure 1120 formed by the MIEC 1110 may have pores that extend across the MIEC 1110 between a first end 1112 and a second end 1114. The anode 1100 may include a current collector 1140 disposed on the first end 1112 of the MIEC 1110. The solid electrolyte 1400 may be disposed on the second end 1114 of the MIEC 1110.

The MIEC 1110 may be electrically conducting and ionically conducting with respect to an alkali metal ion 1310 in order to facilitate a reduction and/or oxidation reaction of the alkali metal 1300 during a charge or discharge process, respectively. For example, when the battery 1000 is being charged, alkali metal ions 1310 will be transported from a cathode (not shown), across the solid electrolyte 1400, and into the anode 1100 through the second opening 1114 of the MIEC 1110. A power source (not shown), such as a voltage source, may supply electrons 1320 to the anode 1100 through the current collector 1140. The electrons 1320 and the alkali metal ions 1310 may be transported by the MIEC 1110, resulting in the reduction of the alkali metal ion 1310 to a neutral alkali metal 1300, which is then stored within the open pore structure 1120. As the battery 1000 is charged, the amount of alkali metal 1300 in the open pore structure 1120 may increase, thus occupying a larger portion of the open pore structure 1120. In some implementations, the alkali metal 1300 may have a front (e.g., a surface on the alkali metal 1300 that interfaces the inert gas in the open pore structure 1120) that progressively moves within the open pore structure 1120 as the alkali metal 1300 backfills the open pore structure 1120.

When the battery 1000 is being discharged, the alkali metal 1300 undergoes an oxidation reaction that results in the generation of an electron 1320 and an alkali metal ion 1310. The electrons 1320 are transported out of the MIEC 1110 through the current collector 1140. The tendency for electrons 1320 to preferentially flow towards the current collector 1140 is based, in part, on the solid electrolyte 1400 being electrically insulating. The alkali metal ions 1310 are transported out of the MIEC 1110 towards the cathode and solid electrolyte 1400 through the second opening 1114. As alkali metal ions are transported from the anode 1100 to the cathode, the amount of alkali metal 1300 stored within the open pore structure 1120 may decrease, resulting in a retraction of the front of the alkali metal 1300.

The reserved pore space in the open pore structure 1120 may help relieve the stresses generated by the alkali metal 1300 (hydrostatic and deviatoric) by allowing the alkali metal 1300 to backfill. In this manner, the likelihood of fracturing the anode 1100 when cycling the battery 1000 may be substantially reduced while maintaining electronic and ionic contact. In some implementations, the transport of alkali metal 1300 may also be aided by alkaliphilic capillary wetting of the open pore structure 1120.

As described above, the open pore structure 1120 may be used to transport the alkali metal 1300 into and/or out of the MIEC 1110 for storage when charging the battery 1000 and/or release when discharging the battery 1000. The shape and dimensions of the open pore structure 1120 formed by the MIEC 1110 may thus affect the capacity and the charge/discharge rate of the battery 1000.

Generally, the open pore structure 1120 may include a plurality of pores that form percolation pathways extending across the MIEC 1110. The pores and/or percolation pathways may be separated by a portion of the MIEC 1110 (e.g., a wall). The plurality of pores may be substantially open to allow the alkali metal 1300 to enter and/or leave the MIEC 1110 through the solid electrolyte 1400 when cycling the battery 1000. In some implementations, the percolation pathways may intersect with one another. For example, two or more percolation pathways may merge into a single pathway and/or one percolation pathway may split into two or more percolation pathways. More generally, the tortuosity of the open pore structure may be small (e.g., about 1 corresponding to highly aligned percolation pathways) or large (e.g., greater than 1 corresponding to highly twisted percolation pathways).

The open pore structure 1120 may be a substantially isotropic structure where the orientation of the percolation pathways is distributed uniformly about a $4\pi$ solid angle space. For instance, the open pore structure 1120 may be a foam-like structure comprising a plurality of spherical cavities joined together to form the percolation pathways through which the alkali metal 1300 is deposited/stripped.

The open pore structure 1120 may be a substantially aligned array of cylindrical cavities that extend from a first end 1112 of the MIEC 1110 to a second end 1114 of the MIEC 1110. In some implementations, the first end 1112 and the second end 1114 may be disposed on opposite sides of the MIEC 1110, hence, the array of cylindrical cavities may be substantially straight. In some implementations, the first end 1112 and the second end 1114 may be disposed on sides of the MIEC 1110 that are not parallel. Thus, the array of cylindrical cavities may be uniformly curved or bent such that the respective ends of the cylindrical cavities terminate at the first end 1112 and the second end 1114. In this manner, the MIEC 1110 and/or the open pore structure 1120 may be shaped to conform to the form factor of the battery 1000 (e.g., a flat planar cell or a cylindrical cell).

FIG. 1 shows an exemplary open pore structure 1120 shaped as an array of aligned tubules 1210 within the MIEC 1110. The array of tubules 1210 may be arranged in various forms including, but not limited to a grid and a honeycomb structure. As shown, each tubule 1210 is separated from a neighboring tubule 1210 by a wall 1200 of the MIEC 1110. Each tubule 1210 may have a cross-sectional width W and each wall 1200 may have a thickness w. The height, h, of the open pore structure 1120 may extend across the entirety of the MIEC 1110. In some implementations, the width, W, of the tubule 1210 may be less than about 300 nm. In some implementations, the thickness of the wall 1200, w, may be between about 1 nm to about 30 nm. In some implementations, the height, h, of the tubules 1210 may be at least about 10 µm.

The MIEC 1110 may be fabricated using various approaches including, but not limited to a growth process (e.g., the open pore structure 1120 is formed during the growth of the MIEC 1110 from a substrate) and/or an etching process (e.g., the MIEC 1110 is deposited onto a substrate as a homogenous medium and the open pore structure 1120 is then formed by etching into the MIEC 1110). For example, the aligned tubules 1210 shown in FIG. 1 may be formed by growing the tubules 1210 from a substrate with a sufficient packing density such that the average separation distance between tubules is less than about 300 nm. In another example, the aligned tubules 1210 may be formed by etching a substrate in an anisotropic manner (e.g., deep reactive-ion etching) to form an array of highly aligned, large aspect ratio cavities (e.g., aligned cylindrical cavities).

In some implementations, the battery 1000 may be cycled by applying alternating negative and positive overpotentials. This may cause the alkali metal 1300 to move into and/or out of the open pore structure 1120 in a similar manner to a mechanical pump, resulting in a cyclical load applied to the MIEC 1110 that may cause fatigue. The MIEC 1110 and the open pore structure 1120 should thus be designed to have walls 1200 with a sufficiently large mechanical strength and ductility to accommodate the stresses generated by $P_{LiMetal}$ and capillarity thereby reducing the risk of fracture and/or fatigue in the MIEC 1110.

Generally, the pores of the open pore structure 1120 may vary in size and shape. However, in some implementations, it may be preferable for the pores (e.g., the tubules 1210) to be substantially uniform in terms of size, shape, and/or alkaliphilicity to reduce the formation of dead lithium and/or provide spatially uniform transport of the alkali metal 1300.

Prior to the alkali metal 1300 infiltrating the open pore structure 1120, the open spaces of the open pore structure 1120 may be evacuated and/or contain an inert gas phase. For ease of manufacture, it may be preferable for the open pore structure 1120 to initially contain a gas phase at $P_{gas}$=1 atm ($10^5$ Pa). The solid electrolyte 1400 should preferably form a hermetic seal on the second end 1114 of the MIEC 1110, otherwise the alkali metal 1300 may readily plate or flow through the solid electrolyte 1400 causing an electrical short with the cathode. The current collector 1140 should also preferably form a hermetic seal on the first end 1112 of the MIEC 1110. As a result, the deposition of the alkali metal 1300 in the open pore structure 1120 may compress the inert gas phase, resulting in a local $P_{gas}$ that increases as more alkali metal 1300 is deposited. The rise in $P_{gas}$ may be proportional to the compression ratio of the gas (e.g., $P_{gas}$ may be about 10 atm for a compression ratio of about 10x).

The rise in $P_{gas}$ generally does not affect the transport of the alkali metal 1300. For example, the pressure generated by Li, $P_{LiMetal}$, may be about $10^2$ MPa according to the Nernst equation, which is substantially larger than $P_{gas}$. In other words, the alkali metal 1300 may readily act as a piston to compress the gas. However, heterogeneities within the open pore structure 1120 may cause the alkali metal 1300 to be deposited non-uniformly. The non-uniform plating of the alkali metal 1300 may give rise to a pressure difference $\Delta P_{gas}$ between adjacent tubules 1210, which may bend or, in some instances, burst the wall 1200 of the MIEC 1110. Thus, in some implementations, the wall 1200 of the MIEC 1110 may be designed to be non-hermetic to allow $P_{gas}$ to equilibrate from cell to cell. In this manner, the internal pressure of the MIEC 1110 may be more homogenous, thus reducing the likelihood of one tubule 1210 expanding and collapsing a neighboring tubule 1210.

Figure 2:
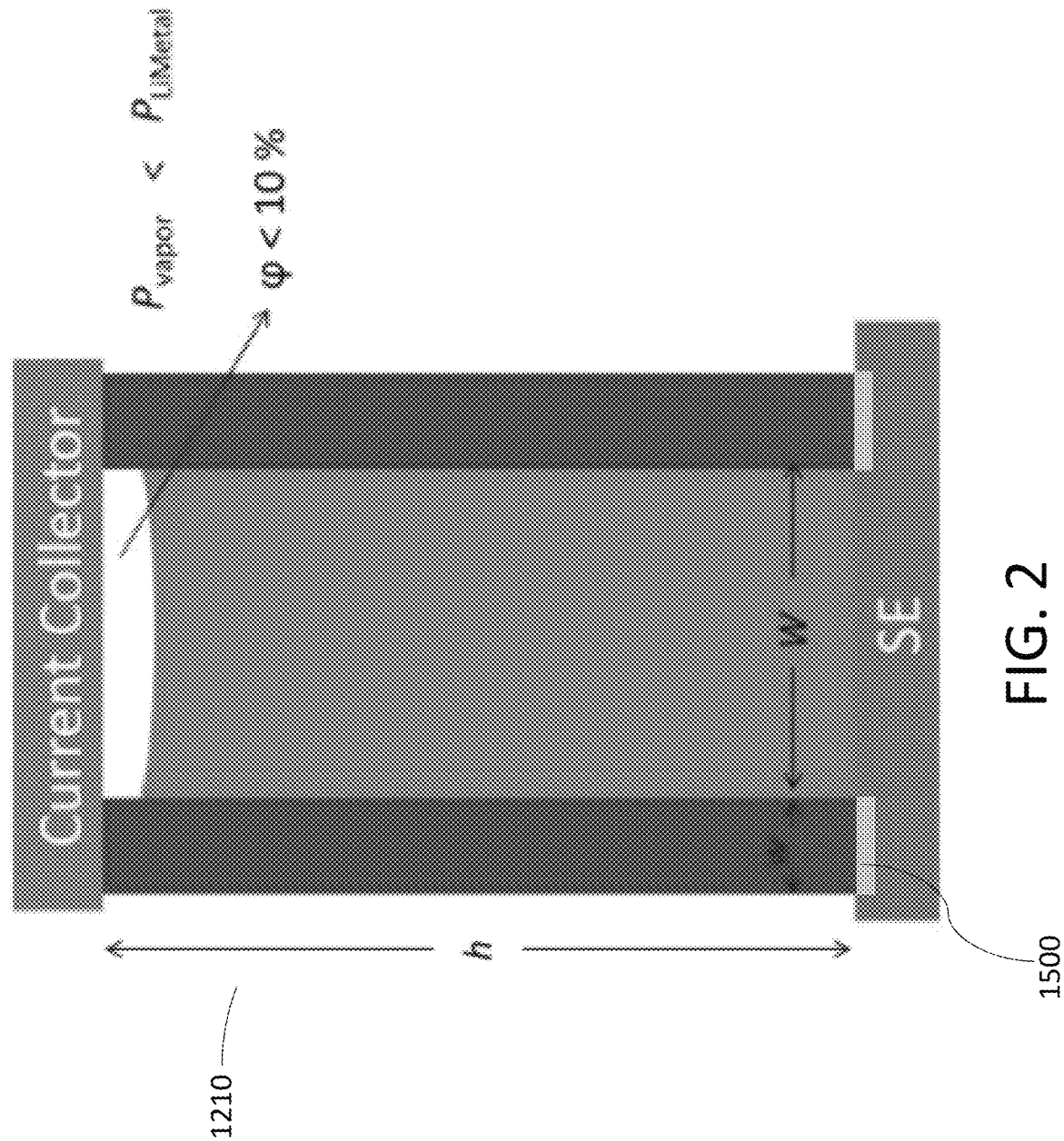
FIG. 2 shows a tubule formed by the MIEC of FIG. 1 plated with Li.

In some implementations, the height, h, of the open pore structure 1120 and the MIEC 1110 may include a reserved space for the inert gas phase to be compressed without generating exceedingly large $P_{gas}$. For example, FIG. 2 shows an exemplary tubule 1210 that is filled with the alkali metal 1300. A compression ratio of 10x corresponds to at least 90% of the free volume of the open pore structure 1120 being filled with the alkali metal 1300 with the remainder being the compressed gas. As described above, this compression ratio may be readily satisfied due to the large pressures generated by the alkali metal 1300. Although a portion of the open pore structure 1120 should be reserved for the gas phase, the volumetric capacity of the anode 1100 may still be enhanced due to the large volume fraction of alkali metal 1300. In general, the open pore structure 1120 may be shaped such that the alkali metal 1300 plated into the open pore structure 1120 may occupy at least about 30% of the total volume of the MIEC 1110.

The current collector 1140 may be formed from various electrically conductive materials including, but not limited to copper, aluminum, silver, and gold. In some implementations, the current collector 1140 may be a film that is deposited onto the MIEC 1110 or a substrate from which the MIEC 1110 is grown and/or deposited.

The solid electrolyte 1400 may have an ionic conductivity to ions of the alkali metal greater than or equal to 1 mS cm$^{-1}$ (e.g., 1 mS cm$^{-1}$, 2 mS cm$^{-1}$, 5 mS cm$^{-1}$, or 10 mS cm$^{-1}$) and a thickness less than or equal to 100 μm (e.g., 1 μm, 5 μm, 10 μm, 20 μm, 50 μm, 80 μm, or 100 μm).

The solid electrolyte 1400 may be formed from various materials including, but not limited to polymers and/or ceramics. The polymer may include at least one of a polyethylene, a polypropylene, a polyethylene oxide, a polyacetal, a polyolefin, a poly(alkylene oxide), a polymethacrylate, a polycarbonate, a polystyrene, a polyester, a polyamide, a polyimide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone, a polybenzoxazole, a polyphthalide, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyethylene terephthalate, a polybutylene terephthalate, a polyurethane, an ethylene propylene diene rubber, a polytetrafluoroethylene, a fluorinated ethylene propylene, a perfluoroalkoxyethylene, a polychlorotrifluoroethylene, or a polyvinylidene fluoride. Any of the compounds listed above may be the sole component of the solid electrolyte or may be used in combination.

The ceramic may include an antiperovskite structure having the formula $Li_3O_X$ and/or $Li_3SX_3$ wherein X is at least one of Cl, Br, or I, or a super halide such as $BH_4$ or $BF_4$. An exemplary antiperovskite is $Li_3OCl$.

The ceramic may include a phosphate-type solid electrolyte such as a NASICON structure of the general formula $Li_{1\pm x}M1_xM2_{2-x}(PO_4)_3$, wherein M is Al, Ga, In, Sc, Cr, Fe, Ta, or Nb; M2 is Ti, Zr, Hf, Si, or Ge, and wherein the number of moles of lithium per formula unit is 0<x<2, 0.2<1±x<1.8, 0.4>1±x<0.6. For example, the NASICON structure can be $LiTi_2(PO_4)_3$, $Li_{1+x}Al_xGe_{2-x}(PO_4)_3$ (LAGP), $Li_{1+x}Al_xTi_{2-x}(PO_4)_3$ (LATP), $Li_{1+x}Ti_{2-x}Al_xSi_y(PO_4)_{3-y}$, $Li_{1-x}Ti_{2-x}Ta_x(PO_4)_3$ wherein 0<x<1 and 0≤y<1, $LiAl_xZr_{2-x}(PO_4)_3$, and/or $LiTi_xZr_{2-x}(PO_4)_3$ wherein 0<x<2.

The ceramic can also include an oxide-type solid electrolyte such as a perovskite structure having the general formula $(La_{1-x}Li_x)TiO_3$ (LLTO)) wherein 0<x<1 The ceramic can also include a sulfide or glassy sulfide such as $Li_6PS_5X$ wherein X is Cl, Br, or I, $Li_{10}MP_2S_{12}$ wherein M is Ge, Si, or Sn; $Li_2S$—$P_2S_5$, $Li_2S$—$P_2S_5$-$L_4SiO_4$, $Li_2S$—$GeS_2$, $Li_2S$—$Sb_2S_3$—$GeS_2$, $Li_{3.25}$—$Ge_{0.25}$—$P_{0.75}S_4$, or $Li_1PS_4$, $Li_7P_3S_{11}$. The ceramic can also include Li—N, $Li_2S$, $LiBH_4$, or $Li_3BO_3$, optionally including derivatives with dopants on the cation or anion sites. The ceramic can be a garnet-type oxide, e.g., $Li_7La_3Zr_2O_{12}$. Optionally, the garnet-type oxide can further include one or more dopants, for example selected from Al, Ge, Ga, W, Ta, Nb, Ca, Y, Fe, or a combination thereof, wherein the dopant, if present, is contained in an amount of greater than 0 to 3 moles per formula unit in the unit formula $Li_7La_3Zr_2O_{12}$ on the La-site, and greater than 0 to 2 moles per formula unit on the Zr site. The ceramic may also include a lithium mixed-metal chlorospinel, e.g., $Li_2In_xSc_{0.666-x}Cl_4$ wherein 0≤x≤0.666; or $Li_{3-x}E_{1-x}Zr_xCl_6$ wherein E is at least one of Y or Er. Any of the compounds listed above may be the sole component of the solid electrolyte or may be used in combination.

In some embodiments, the deposition metal can be sodium, and the solid electrolyte can include an oxide-type solid electrolyte such as sodium β-$Al_2O_3$ or NASICON ($Na_{1+x}Zr_2Si_xP_{3-x}O_{12}$, 0<x<3); a sulfide type (e.g., $Na_3PS_4$); a closo-borate; or a polymer electrolyte such as poly(ethylene oxide) with a dissolved salt such as $NaAsF_6$.

For example, the solid electrolyte may include $Li_7La_3Zr_2O_{12}$; $Li_{1.3}Al_{0.3}Ti_{1.7}(PO_4)_3$; $Li_6PS_5Cl$; $Li_{10}MP_2S_{12}$ wherein M is at least one of Ge, Si, or Sn; $Li_3PS_4$; $Li_7P_3S_{11}$; $Li_3N$; $Li_2S$; $LiBH_4$; $Li_3BO_3$; $Li_2S$—$P_2S_5$; $Li_2S$—$P_2S_5$-$L_4SiO_4$; $Li_2S$—$Ga_2S_3$—$GeS_2$; $Li_2S$—$Sb_2S_3$—$GeS_2$; $Li_{3.25}$—$Ge_{0.25}$—$P_{0.75}S_4$; $(La_{1-x}Li_x)TiO_3$ wherein 0<x<1; $Li_6La_2CaTa_2O_{12}$; $Li_6La_2ANb_2O_{12}$ wherein A is at least one of Ca, Sr, or Ba; $Li_6La_3Zr_{1.5}WO_{12}$; $Li_{6.5}La_3Zr_{1.5}TaO_{12}$; $Li_{6.625}Al_{0.25}La_3Zr_2O_{12}$; $Li_3BO_{2.5}N_{0.5}$; $Li_9SiAlO_8$; $Li_{1+x}Al_xGe_{2-x}(PO_4)_3$; $Li_{1+x}Al_xTi_{2-x}(PO_4)_3$; $Li_{1+x}Ti_{2-x}Al_xSi_y(PO_4)_{3-y}$ wherein 0<x<1 and 0≤y<1; $LiAl_xZr_{2-x}(PO_4)_3$; $LiTi_xZr_{2-x}(PO_4)_3$ wherein 0<x<2; $Li_6PS_5X$, wherein X is at least one of Cl, Br, or I, or a combination thereof.

As another example, the solid electrolyte may include a polyether, a thiophosphate, and/or a garnet-type material. Examples of polyether solid electrolytes include polyethylene oxide (PEO). Examples of thiophosphate solid electrolytes include $Li_{10}GeP_2Si_2$ (LGPS), $Li_6PS_5X$ with X being at least one of Cl, Br, or I), and $Li_3PS_3$ (LPS). Examples of garnet-type solid electrolytes include $Li_7La_3Zr_2O$ (LLZO). The interface between the MIEC 1110 and the solid electrolyte 1400 is where the alkali metal 1300 is typically deposited first (when charging the battery 1000) and, hence, where $P_{LiMetal}$ is initiated. Thus, the way the solid electrolyte 1400 is coupled to the MIEC 1110 may affect the durability of the battery 1000. In some implementations, the tubules 1210 of the MIEC 1110 may be partially inserted and/or planted into the solid electrolyte 1400 as shown in FIG. 1 to provide greater mechanical strength. In some implementations, the portion 1500 of the wall 1200 of the MIEC 1110 inserted into the solid electrolyte 1400 should be an electronic and Li-ion insulator (ELI) to avoid issues related to the mechanical coupling between the MIEC 1110 and the solid electrolyte 1400. Said in another way, the ELI root 1500 should only provide mechanical support to the MIEC 1110. The solid electrolyte 1400 may be formed from a compliant material, such as PEO, to reduce the likelihood of brittle root-fracture caused by the deposition of alkali metal 1300 at the interface between the MIEC 1110 and the solid electrolyte 1400.

Figure 3:
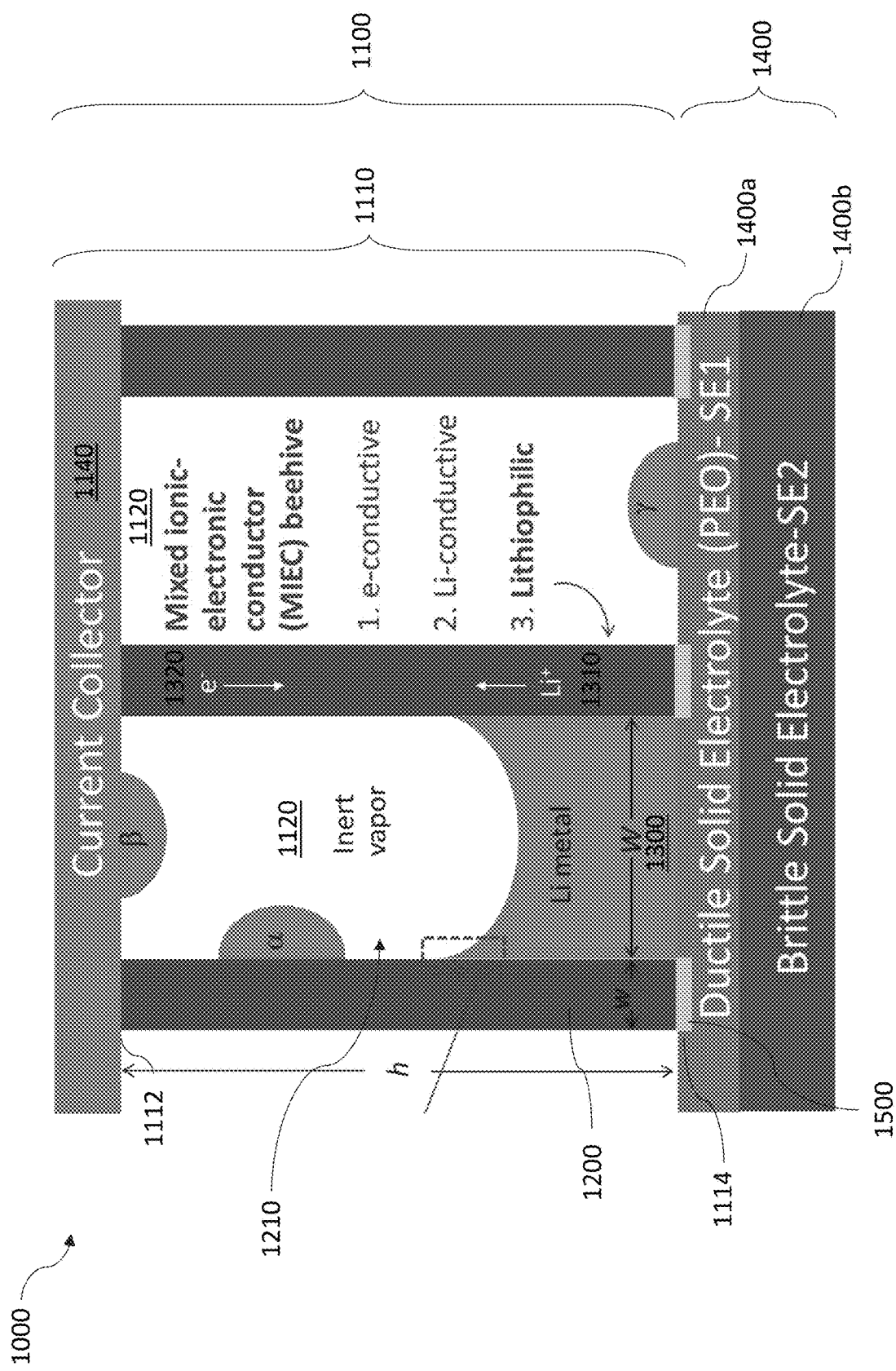
FIG. 3 shows another exemplary anode coupled to a composite solid electrolyte.

In some implementations, the solid electrolyte 1400 may be a composite formed from multiple materials. For example, the solid electrolyte 1400 may include both ceramic and polymer materials, thereby taking advantage of the respective benefits of each of these types of solid electrolytes. As an example, a polymer solid electrolyte may have favorable mechanical properties like a high ductility, but a lower ionic conductivity; and a ceramic solid electrolyte may have less favorable mechanical properties like brittleness, but a higher ionic conductivity. For example, FIG. 3 shows the solid electrolyte may include a ductile polymer solid electrolyte 1400*a*, such as PEO, to securely couple to the tubules of the MIEC 1110. The ductile solid electrolyte 1400*a* may have a thickness sufficient to blunt small cracks (e.g., between about 100 nm to 500 nm). The solid electrolyte 1400 may also include a brittle ceramic solid electrolyte 1400*b* disposed on the ductile solid electrolyte 1400*a*. The brittle solid electrolyte may be a more ionically conductive medium, such as LGPS, which is less electrochemically stable against Li, but more Li$^+$-conductive.

The charge/discharge rate of the battery 1000 depends, in part, on the manner in which the alkali metal 1300 is transported through the open pore structure 1120. In some implementations, the alkali metal 1300 may be transported as a solid-phase (e.g., a creep mechanism) within the open pore structure 1120. For many applications, it may be preferable to operate the battery 1000 at near room temperature (e.g., between about −20° C. and about 60° C.). At such temperatures, the alkali metal 1300 is typically a solid phase.

For example, the alkali metal 1300 may be Li, which is a soft metal at room temperature with a melting point of $T_M$=180° C. At a temperature of 300 K (e.g., room temperature), the homologous temperature for Li metal is $T/T_M$=0.66. Thus, the alkali metal 1300 may exhibit an appreciable creep strain rate $\dot{\varepsilon}(T,\sigma)$ where $\sigma$ is the deviatoric shear stress. The creep strain rate applied to a solid alkali metal 1300, such as Li at T=300 K, may deform the alkali metal 1300 to such an extent that the alkali metal 1300 may be viewed as behaving like an incompressible work fluid. Said in another way, the creep strain rate may deform the alkali metal 1300 thereby causing the alkali metal 1300 to advance and/or retract within the open pore structure 1120 as if the alkali metal 1300 were a fluid with an effective viscosity of $\eta \equiv \sigma/\dot{\varepsilon}(T,\sigma)$. The creep strain rate may be caused by various creep mechanisms including, but not limited to a diffusion mechanism (e.g., an interfacial-diffusion Coble creep mechanism, a bulk-diffusion Nabarro-Herring creep mechanism), a dislocation slip mechanism, and a combination of a diffusion and dislocation mechanism.

A purely diffusional creep mechanism, such as lattice-diffusional Nabarro-Herring creep or interfacial-diffusional Coble creep, may exhibit a strain rate of $\dot{\varepsilon}(T,\sigma) \partial \sigma$. Thus, the viscosity q depends on T and grain size, but not on a. The alkali metal 1300 thus behave like a Newtonian fluid when viewed from a continuum mechanics viewpoint. In contrast, a dislocation creep mechanism, such as power-law creep, may exhibit a viscosity $\eta \partial \sigma^{1-n}$ with n>1. This implies the alkali metal 1300 behaves like a shear-thinning, non-Newtonian fluid. Both types of mechanisms, however, may be used to transport the alkali metal 1300 within the open pore structure 1120 with the driving force being the chemical potential gradient $-\Omega \nabla P_{LiMetal}(x)$, which is related to the pressure gradient.

Although different transport mechanisms (e.g., dislocation vs. diffusion creep, interfacial Coble creep vs. bulk Nabarro-Herring creep) may be used to transport the alkali metal 1300 in the open pore structure 1120, the transport rate of the alkali metal 1300 may vary between the different mechanisms. In other words, the type of transport mechanism used may influence the overall transport rate of the alkali metal 1300, which in turn affects the current density and charge/discharge rate of the battery 1000. The contribution of different creep mechanisms on the transport rate of the alkali metal 1300 may depend on various factors including, but not limited to the grain size of the alkali metal 1300, the shape of the open pore structure 1120, and the size of the open pore structure 1120 (e.g., a characteristic width along a cross-section of a pore in the open pore structure 1120).

For example, a Coble creep mechanism typically contributes substantially to the transport of alkali metal 1300 when the characteristic width of the pores in the open pore structure 1120 are less than about 300 nm and the homologous temperature of the alkali metal 1300 is about $T/T_M \approx 2/3$. The creep strain rate due to the Coble creep may be estimated as follows, $$\dot{\varepsilon} = K \frac{\delta_I D_I \Omega}{D^3 k_B T} \sigma \tag{1}$$

where $\dot{\varepsilon}$ is creep strain rate due to the Coble creep mechanism, K is a dimensionless constant, $\delta_I$ is the nominal interfacial diffusion layer thickness, $D_I$ is the interfacial diffusion diffusivity, $\Omega$ is the atomic volume, D is the diameter size, $k_B$ is Boltzmann constant, T is temperature, and $\sigma$ is the yield stress.

As shown in Eq. (1), the yield stress $\sigma \partial D^3$ or $\sigma = kD^3$ for a fixed creep strain rate. Thus, the stress that arises from Coble diffusional creep, which is applied to the portions of the MIEC 1110 forming the open pore structure 1120 (e.g., the walls of the MIEC 1110) by the alkali metal 1300, decreases as the characteristic width of each pore in the open pore structure 1120 and the alkali metal 1300 contained therein becomes smaller. By using a smaller pore to reduce the mechanical stress applied to the MIEC 1110, mechanical degradation of the MIEC 1110 and the solid electrolyte 1400 covering the MIEC 1110 may be substantially reduced. However, the thickness of the walls of the MIEC 1110 should remain sufficiently thick (e.g., between about 1 nm to about 30 nm) to sustain electrochemically generated mechanical stress.

Eq. (1) also shows that the creep strain rate $\dot{\varepsilon}$ scales with $D^{-3}$ for a fixed stress. Thus, as D decreases, the creep strain rate may increase substantially. The transport of alkali metal 1300 is primarily driven by the Coble creep mechanism if the pores in the open pore structure 1120 have a diameter less than about 300 nm.

Figure 4A:
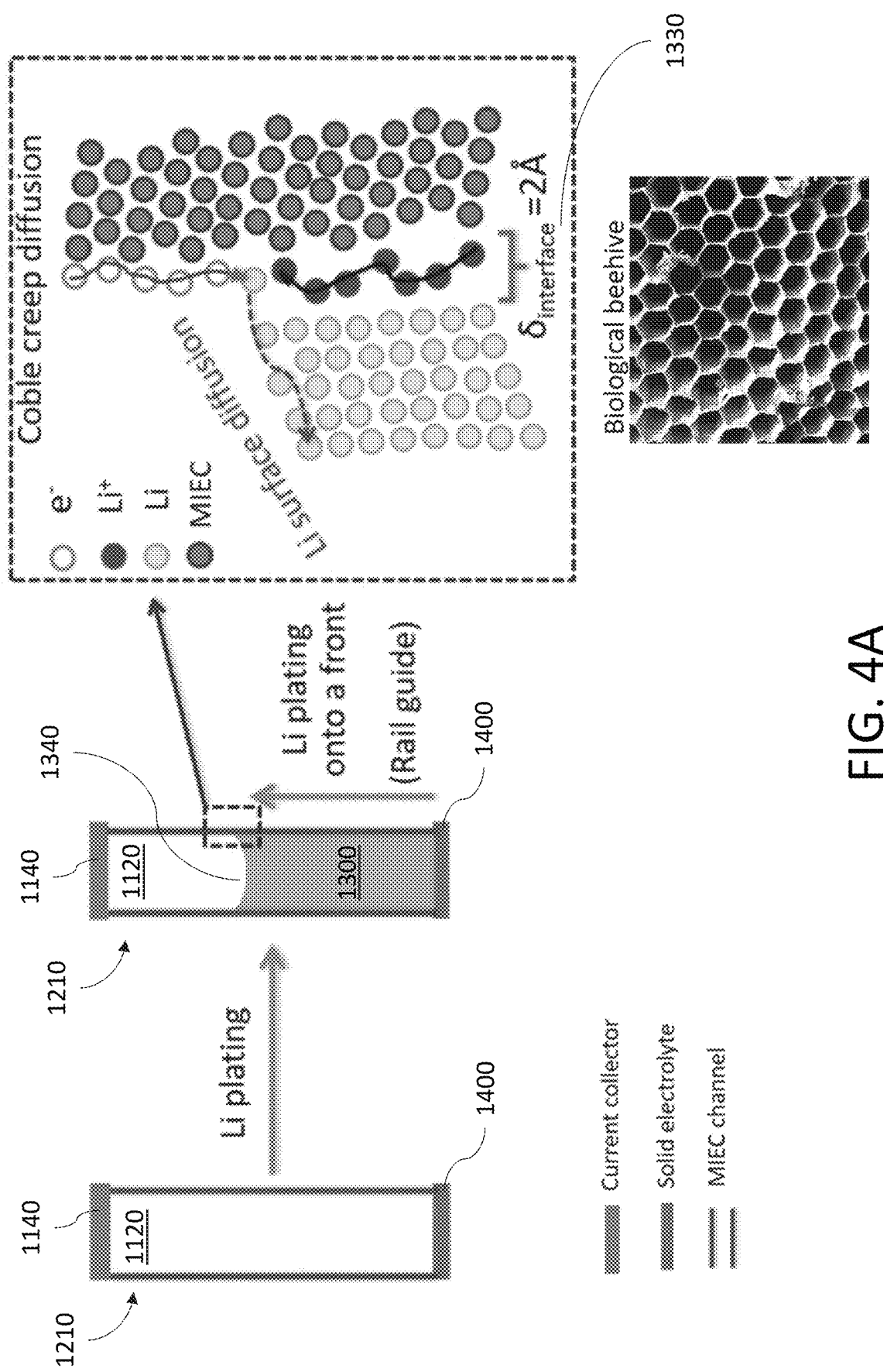
FIG. 4A shows an exemplary process where Li is deposited and/or stripped in a hollow tubule formed by the MIEC.

FIG. 4A shows the Coble creep mechanism may facilitate the transport of alkali metal 1300 in the open pore structure 1120 with a "rail-guided" behavior. As shown, the alkali metal ions (or atom) 1310 and the electrons 1320 may diffuse along a phase boundary 1330 between the alkali metal 1300 and the wall 1200 of the MIEC 1110. In this manner, the phase interface 1330 of the wall 1200 of the MIEC 1110 functions as a "rail", which "guides" the transport of alkali metal ions (or atom) 1310 and electrons 1320. When the alkali metal ions 1310 undergo a reduction reaction with the electrons 1320, the resulting alkali metal 1300 precipitates out onto a front 1340 of previously deposited alkali metal 1300. Thus, the transport of alkali metal 1300 occurs via progressive plating/stripping of alkali metal 1300 along said front 1340.

Figure 4B:
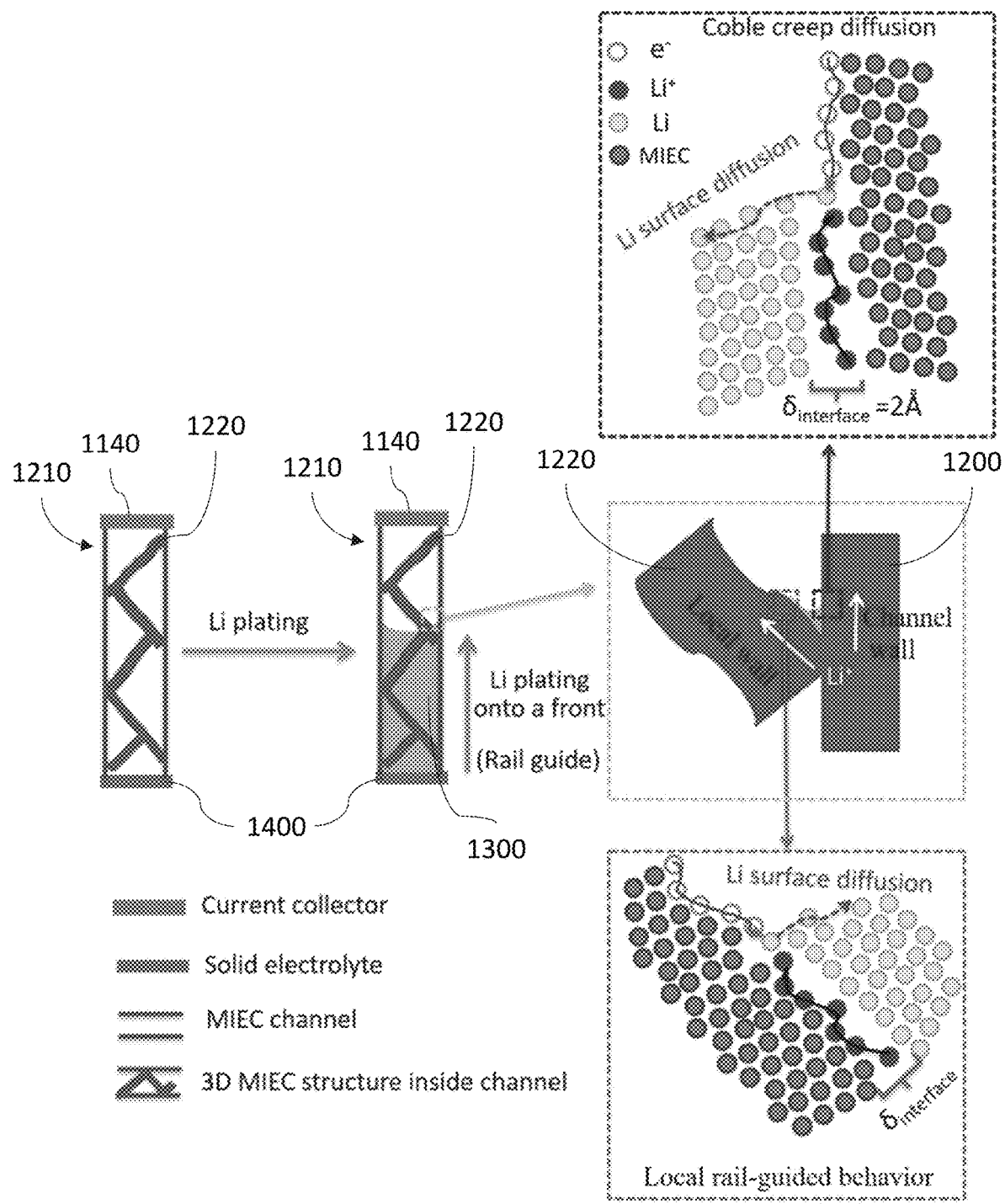
FIG. 4B shows an exemplary process where Li is deposited and/or stripped in a tubule formed by the MIEC with a three-dimensional (3D) structure inside the tubule.

The "rail-guided" behavior may also be used to transport alkali metal 1300 even when internal obstructions/obstacles are present within the open pore structure 1120. For example, FIG. 4B shows the Coble creep mechanism may occur along both the wall 1200 of the MIEC 1110 forming the pore and the surface of the obstruction 1220 (e.g., a three-dimensional structure disposed in the pore). However, the diffusion rate and/or the diffusion path length may vary depending on the orientation of the obstruction 1220. For instance, FIG. 4B shows the obstruction 1220 may be oriented at an angle relative to the wall 1200 resulting in the alkali metal ions (or atom) 1310 being transported along two different directions.

Figure 4C:
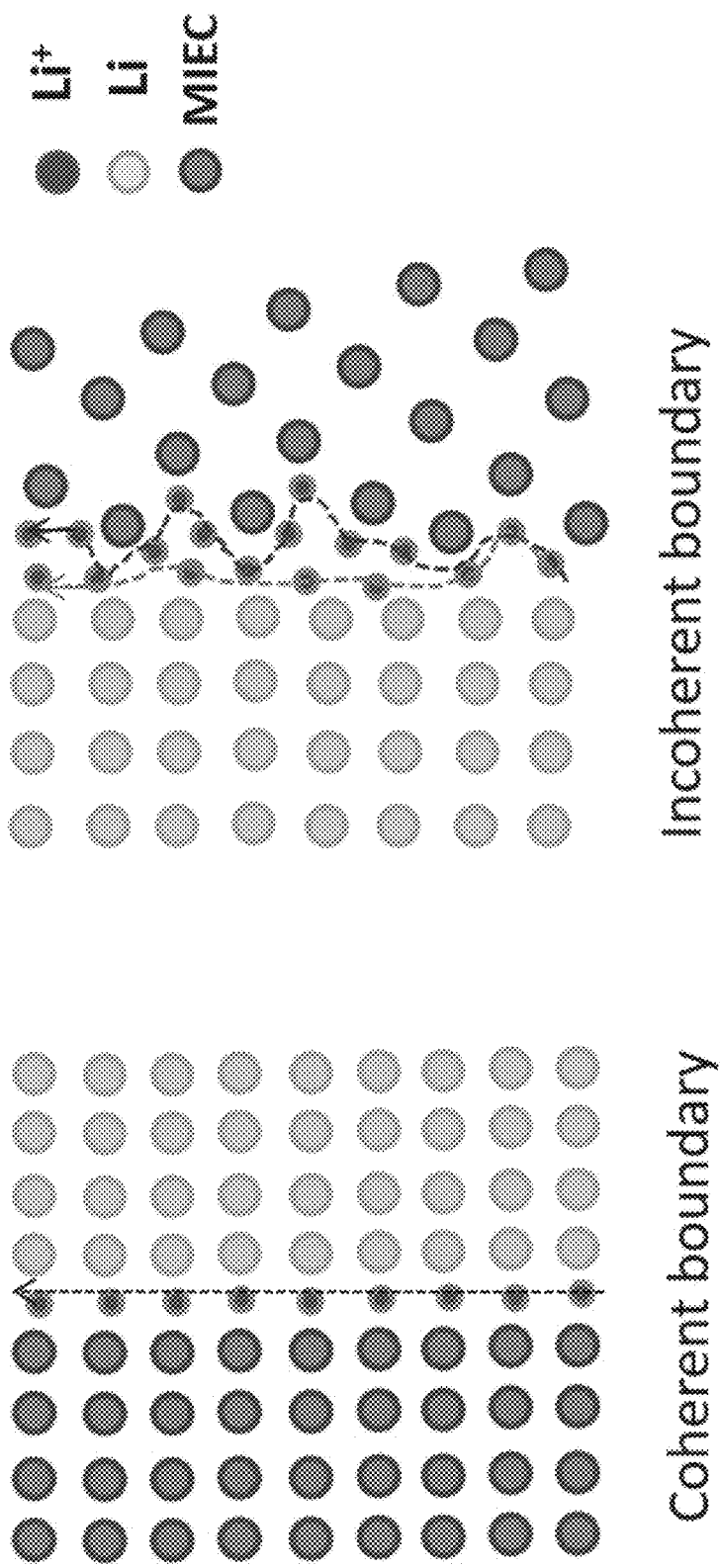
FIG. 4C shows an exemplary process where Li diffuses through a coherent and incoherent boundary.

The diffusion rate of the alkali metal 1300 may also vary depending on whether a coherent or incoherent boundary is formed between the alkali metal 1300 and the wall 1200 of the MIEC 1110 and/or the surface of the obstruction 1220. FIG. 4C shows that a coherent boundary is formed when the atomic planes of the alkali metal 1300 and the MIEC 1110 are substantially aligned and matched. Otherwise, the presence of vacancy defects on the MIEC 1110 and/or the alkali metal 1300 may result in a semicoherent or incoherent boundary. The diffusion rate generally depends on the free volume of the interfacial region defined between the MIEC 1110 and the alkali metal 1300. Typically, a larger free volume results in a higher diffusion rate. FIG. 4C shows that a coherent boundary may have a free volume that is locally dispersed with a delta-function like distribution. Said in another way, a coherent boundary has limited vacancy defects resulting in a small free volume and, hence, a low diffusion rate. In contrast, an incoherent boundary may have a larger free volume resulting in a higher diffusion rate.

In some implementations, the MIEC 1110 may support multiple types of phase boundaries. For example, a MIEC 1110 formed from lithiated carbon and a lithiophilic coating ($Li_2O$) may have two phase boundaries: (1) a phase boundary between the Li metal and the $Li_2O$ crystal (a few nanometers thick) and (2) a phase boundary between Li metal and lithiated carbon. In some implementations, the phase boundary between Li and $Li_2O$ crystals may not exhibit a matched lattice due, in part, to the $Li_2O$ being nanocrystalline, resulting in an incoherent boundary with a fast diffusion rate. Additionally, a MIEC 1110 formed from carbon may contain a mixture of graphite and amorphous carbon. As a result, the phase boundary between the Li metal and the lithiated carbon may have a free volume that spatially varies (i.e., not sharply localized at a certain site) between clusters of amorphous carbon, which may also increase the diffusion rate.

Figure 4D:
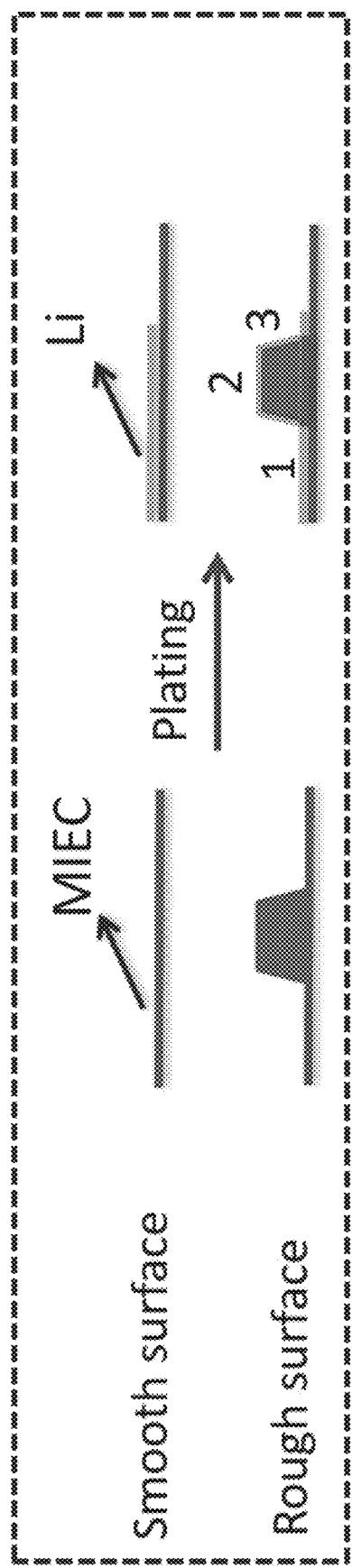
FIG. 4D shows the transport of Li across a smooth and a rough surface.

The local diffusion path length of the alkali metal 1300 may also vary based on the shape of the wall 1200 and/or the obstruction 1220 since the alkali metal 1300 follows the topology of a surface during deposition. FIG. 4D shows a comparison of the local diffusion path length between a rough surface (or a local structure with fine curvature) and a smooth surface. As shown, the local diffusion path length of the alkali metal 1300 is longer for the rough surface compared to the smooth surface.

Figures 5A, 5B:
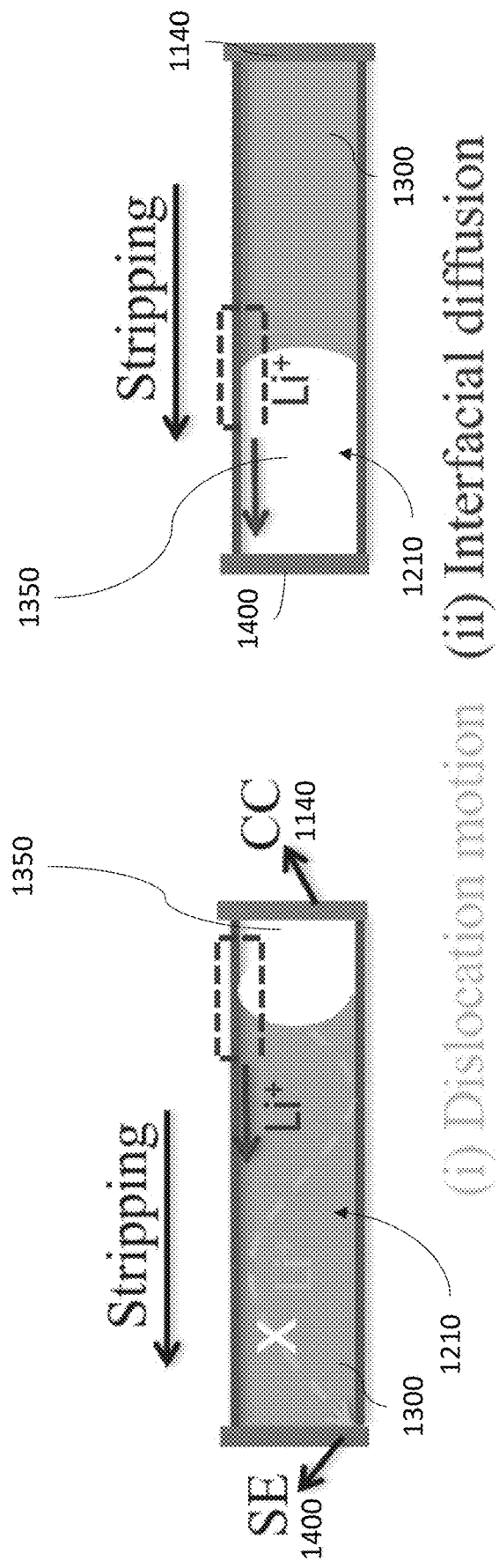
FIG. 5A shows Li being stripped in a tubule by a combination of dislocation motion and an interfacial diffusion mechanism.
FIG. 5B shows Li being stripped in a tubule by only the interfacial diffusion mechanism of FIG. 5A.

In some implementations, the process of stripping alkali metal 1300 from the MIEC 1110 may generate a void plug 1350 (also referred to herein as "void space") that grows between residual alkali metal 1300 and the solid electrolyte 1400. The presence of the void plug 1350, however, may not prevent the remaining alkali metal 1300 from being stripped. Rather, the void plug 1350 may continue to grow as more residual alkali metal 1300 is stripped from the MIEC 1110 by transporting the alkali metal 1300 along the interface and/or surface of the MIEC 1110. FIGS. 5A and 5B show two possible mechanisms for transport in the presence of a void plug. FIG. 5A shows a combination of dislocation and interfacial diffusion mechanisms may transport the alkali metal 1300. FIG. 5B shows only the interfacial diffusion mechanism transports alkali metal 1300. When a void plug occurs between the solid electrolyte 1400 and the residual alkali metal, dislocation power-law creep may be excluded as a transport mechanism since dislocation slip cannot occur in a void. Therefore, interfacial diffusion may be the primary mechanism for the deposition and stripping of the alkali metal 1300. In some implementations, interfacial diffusion may enable the alkali metal 1300 to climb over obstacles within the open pore structure 1120.

In some implementations, it may be preferable to design the open pore structure 1120 to preferentially increase contributions from a particular creep mechanism. For example, the shape and dimensions of the open pore structure may be chosen such that the alkali metal 1300 is driven primarily by a fast interfacial-diffusion creep mechanism, thereby achieving a desired current density through the MIEC 1110. In some implementations, an interfacial diffusion mechanism may also render the transport of alkali metal 1300 less dependent on the material used to form the MIEC 1110.

To illustrate the impact different transport mechanisms may have on the design and material choice of the MIEC 1110, the following example describes a MIEC 1110 applied to a Li battery. However, it should be appreciated that other alkali metals and performance metrics may be used depending on the application of the battery 1000. Batteries used in industrial applications should preferably exhibit an areal capacity Q about 3 $mAh/cm^2$ and a current density J≡dQ/dt about 3 $mA/cm^2$. In implementations where the alkali metal 1300 is Li, a typical Li-containing anode (LMA) may have an overpotential U versus $Li^+$/Li of approximately 50 mV.

As described above, the open pore structure 1120 formed by the MIEC 1110 may include multiple percolation pathways (e.g., about $10^{10}$ tubules) for alkali metal 1300 to flow through the MIEC 1110. The large number of percolation pathways may lead to heterogeneities within the MIEC 1110 that cause transport and reactions (e.g., an oxidation reaction, a reduction reaction) to vary spatially across the MIEC 1110. Additionally, an overpotential may be applied to the alkali metal 1300 to drive an electric current through the battery 1000. However, the overpotential may also cause the alkali metal 1300 to generate a pressure applied to the MIEC 1110 forming the open pore structure 1120. Due to the presence of heterogeneities within the MIEC 1110, the pressure produced by the alkali metal 1300 may vary spatially, resulting in an unbalanced load that may cause portions of the MIEC 1110 to deform or, in some instances, fracture.

The pressure generated by Li when subjected to an overpotential may be expressed as $maxP_{LiMetal}$ [MPa] =7410U[V]. Thus, a larger overpotential directly results in a larger pressure applied to the MIEC 1110, which may lead to more rapid mechanical degradation of the MIEC 1110. For reference, an overpotential U=50 mV produces a pressure $maxP_{LiMetal}$=370 MPa according to the relation above.

In practice, it is preferable to limit the overpotential U in order to reduce the mechanical load applied within the MIEC 1110. However, the overpotential U, which is a global parameter for the battery 1000, should still be sufficiently large to provide a desired global average current density J. Based on the typical overpotential U=50 mV, the average transport conductance of the MIEC 1110 may be estimated to be equal to or greater than about 3 $mA/cm^2$/50 mV=0.06 $S/cm^2$.

Figure 6A:
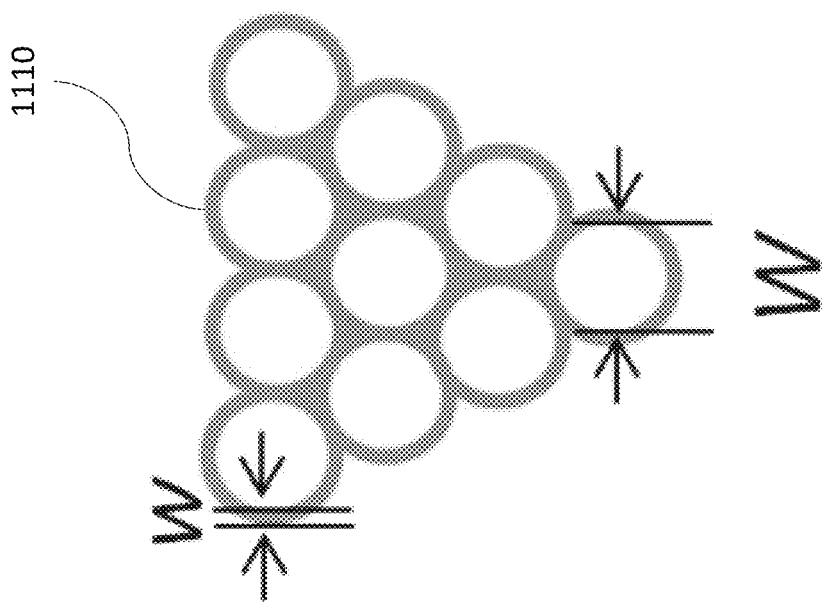
FIG. 6A shows a diagram of an exemplary MIEC formed from an array of carbon hollow tubules (CHT) arranged as a honeycomb structure.
Figure 6A:
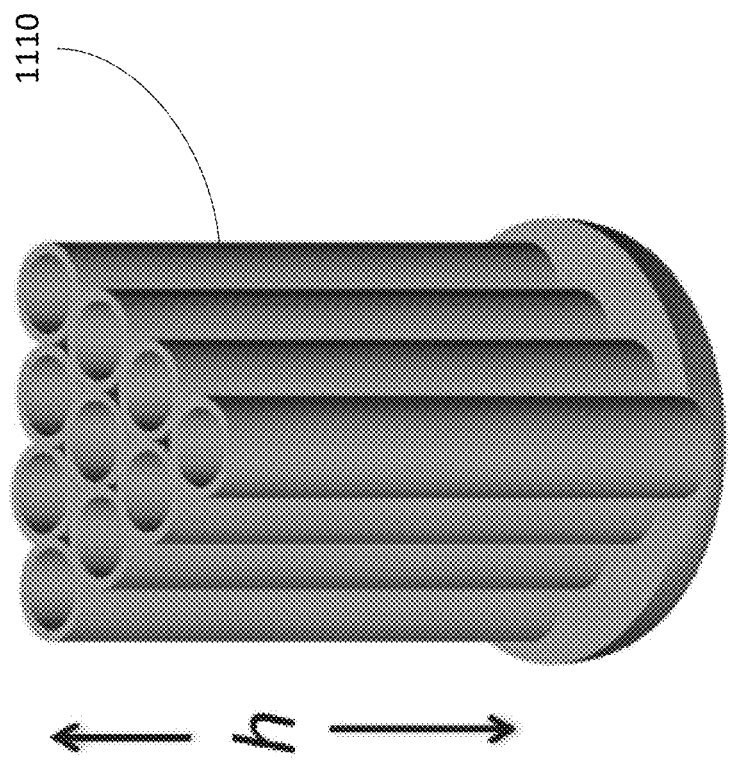
Figure 6C:
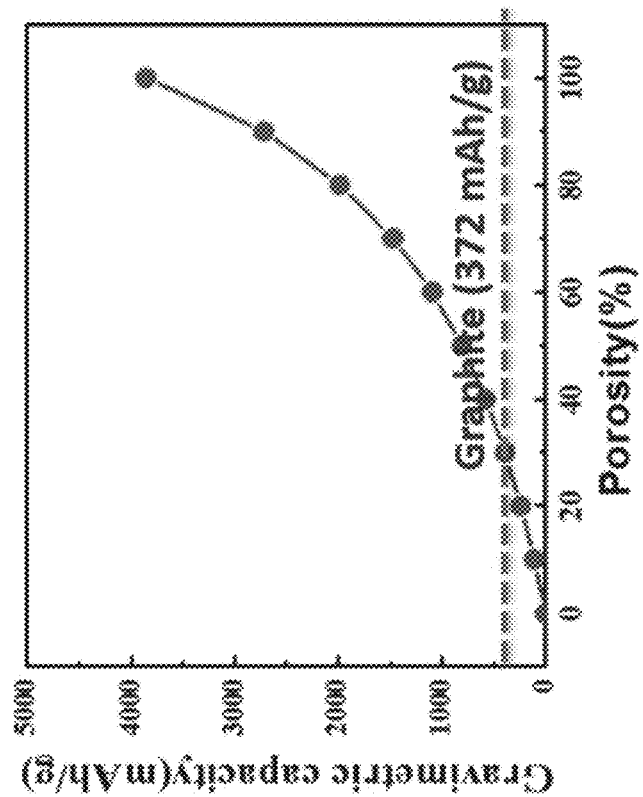
FIG. 6C shows the gravimetric capacity of the MIEC of FIG. 6A based on the weight of Li and the CHT as a function of porosity.
Figure 6B:
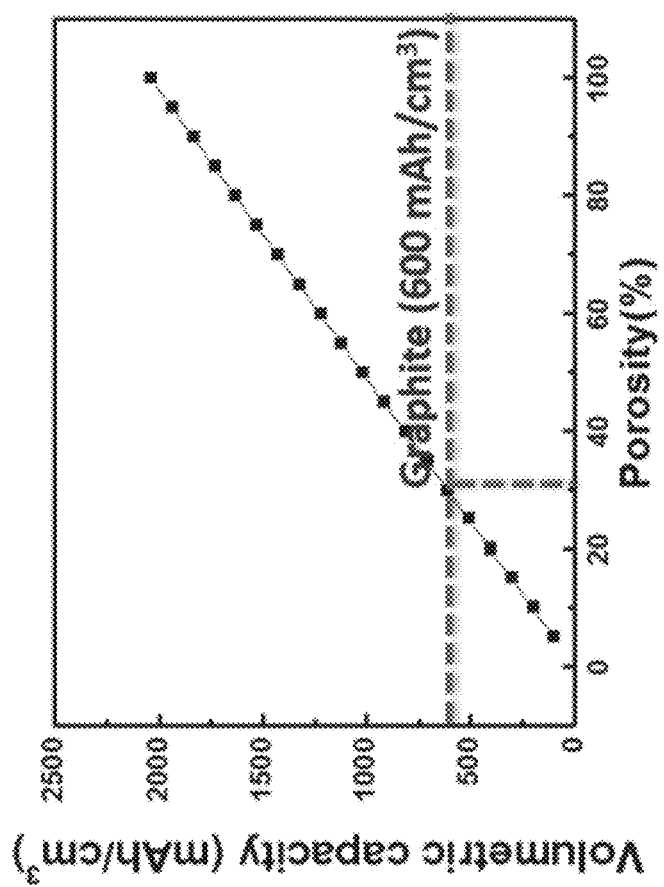
FIG. 6B shows the volumetric capacity of the MIEC of FIG. 6A based on the weight of Li and the CHT as a function of porosity.

For purposes of illustration, the open pore structure 1120 may be a honeycomb structure with substantially aligned tubules. The effective transport conductance of the MIEC 1110 with a honeycomb open pore structure 1120 may be expressed as ($\kappa_{MIEC}$/h)×w/(w+W), where $\kappa_{MIEC}$ [S/cm] is an effective Li conductivity, and w/(w+W) is the fill factor by the MIEC 1110 assuming substantially straight pores and a tortuosity=1. FIG. 6A shows an exemplary MIEC 1110 structured as a beehive (also referred to herein as "honeycomb"). FIGS. 6B and 6C show the volumetric and gravimetric capacity, respectively, of the MIEC 1110. Based on FIGS. 6B and 6C, the height h of the tubules should be at least about 20 µm in order for the anode 1100 to provide a capacity Q about 3 mAh/cm². The preferred height includes space for the inert host in the open pore structure 1120. For h=20 µm, the effective longitudinal transport conductance should be as follows, $$\kappa_{MIEC} \times w/(w+W) > 0.06 \text{ S/cm}^2 \times 20 \mu m = 0.12 \text{ mS/cm} \quad (2)$$

Various mechanisms may contribute to the effective transport conductance, $\kappa_{MIEC}$, of the MIEC 1110. For example, bulk diffusion of the alkali metal 1300 may occur within the MIEC 1110. The bulk diffusivity, $\kappa_{MIEC}^{bulk}$, may be expressed as follows, $$\kappa_{MIEC}^{bulk} \sim e^2 c_{Li} D L_{Li}^{bulk} / k_B T \quad (3)$$

where $c_{Li}$ (unit 1/cm³) is the Li atom concentration, $k_B$ is the Boltzmann constant, and $D_{Li}^{bulk}$ is the tracer diffusivity of Li atom in bulk MIEC 1110.

Based on Eq. (3), the contribution of bulk diffusion to the conductance of the MIEC 1110 may depend on the bulk diffusivity, $D_{Li}^{bulk}$, which may vary for different materials. Additionally, the MIEC 1110 should be compatible with the alkali metal 1300, which may be accomplished by alkaliating the material forming the MIEC 1110. For example, the MIEC 1110 may be compatible with Li when lithiated to below 0 V vs Li⁺/Li. Several anode materials may be used to form the MIEC 1110 including, but not limited to graphite or hard carbon (e.g., LiC$_6$), silicon (e.g., Li$_{22}$Si$_5$), and aluminum (e.g., Li$_9$Al$_4$). These materials are commonly used as anodes in previous Li batteries. Additional materials may be used to form the MIEC 1110 based on their electrochemical stability as will be described in further detail below. The bulk transport properties of carbon, silicon, and aluminum may be estimated to be the following: (1) LiC$_6$ has a $c_{Li}$=1.65×10²²/cm³ and an optimistic $D_{Li}^{bulk}$ about $10^{-7}$ cm²/s, (2) Li$_{22}$Si$_5$ has a $c_{Li}$=5.3×10²²/cm³ and an optimistic $D_{Li}^{bulk}$ about $10^{-11}$ cm²/s, and (3) Li$_9$Al$_4$ has a $c_{Li}$=4×10²²/cm³ and an optimistic $D_{Li}^{bulk}$ about $10^{-9}$ cm²/s.

Using Eq. (3), lithiated aluminum, Li$_9$Al$_4$, exhibits a $\kappa_{MIEC}$(Li$_9$Al$_4$) about 0.25 mS/cm, which is sufficient to satisfy the condition in Eq. (2). The MIEC fill factor is thus $$w/(w+W) = \frac{0.12 \frac{mS}{cm}}{k_{MIEC}}$$

about 0.5. For a 100 nm wide pore, w=W about 100 nm. In other words, the width of the tubules and the walls of the MIEC 1110 should be comparable in size. For lithiated silicon (Li$_{22}$Si$_5$), the bulk diffusivity of $D_{Li}^{bulk}$ about $10^{-11}$ cm²/s results in $\kappa_{MIEC}$(Li$_{22}$Si$_5$) about 0.003 mS/cm, which does not satisfy the condition in Eq. (2).

Lithiated carbon, LiC$_6$, exhibits the largest $c_{Li}D_{Li}^{bulk}$ amongst the three materials yielding a $\kappa_{MIEC}^{bulk}$(LiC$_6$) about 0.01 S/cm based on Eq. (3). These estimates are based on previous diffusivity data, which exhibited large uncertainties. For a more conservative estimate, the diffusivity may thus be assumed to be $D_{Li}^{bulk}$ about $10^{-8}$ cm²/s, resulting in $\kappa_{MIEC}^{bulk}$(LiC$_6$) about 1 mS/cm. For LiC$_6$, the fill factor of the MIEC 1110 should preferably be equal to or greater than $$w_{min}/(w_{min}+W) = \frac{0.12 \frac{mS}{cm}}{k_{MIEC}}$$

about 0.1. For a tubule width W about 100 nm, the thickness of the wall of the MIEC 1110 should thus be at least about w about 10 nm. These dimensions are similar to conventional graphite or hard carbon anodes used in Li-ion batteries (LIB), which typically have a film thickness of about 100 µm and are known to support a current density of 3 mA/cm² at an overpotential of about 50 mV.

However, an industrial LIB graphite anode typically operates near borderline conditions. A current density greater than about 3 mA/cm² through the LIB graphite anode may cause the local potential to drop below 0V vs Li⁺/Li. Under these conditions, Li metal would precipitate out of the anode resulting in the generation of new SEI when the Li metal contacts the flooding liquid electrolyte in the battery. The precipitation of Li metal and the generation of new SEI may severely degrade the cycle life and safety of LIB anodes.

Unlike conventional LIB graphite anodes, it is actually preferable for the alkali metal 1300 in the anode 1100 to "spill out" from the open pore structure 1120 of the MIEC 1110. The difference between the anode 1100 and previous anodes is the open pore structure 1120 formed by the MIEC 1110 enables a more controlled flow of alkali metal 1300. As described above, the open pore structure 1120 may substantially reduce or, in some instances, prevent a buildup of pressure $P_{LiMetal}$, which may otherwise crack the solid electrolyte 1400. Additionally, the MIEC 1110 may be electrochemically stable against the alkali metal 1300, thus substantially reducing or, in some instances, preventing the generation of new SEI since the expanding and/or shrinking portions of the alkali metal 1300 are in contact with only the MIEC 1110.

The above example shows that in implementations where the alkali metal 1300 is transported primarily by bulk diffusion in the MIEC 1110, the materials used to form the MIEC 1110 should preferably exhibit a sufficiently large diffusivity to meet a desired current density. For example, the MIEC 1110 should be formed from a material having $D_{Li}^{bulk}$ at least about $10^{-8}$ cm²/s to achieve a desired current density of J about 3 mA/cm².

However, bulk diffusion is not the only mechanism that may contribute to the transport of alkali metal 1300 within the MIEC 1110. Interfacial transport of alkali metal 1300 may also occur along the surfaces of the MIEC 1110 (e.g., the interface between the MIEC 1110 and the open pore structure 1120). In some implementations, the contribution of interfacial transport to the overall transport conductance of the MIEC 1110 may be substantial, particularly for smaller sized tubules (e.g., tubules with a width W=100 nm and a wall thickness w=10 nm) where the surface area is large relative to the volume of the MIEC 1110. In some implementations, the MIEC 1110 may support fast-diffusion paths of width $\delta_{interface}$ (typically taken to be 2 Å) at the phase boundary between the MIEC 1110 and the alkali metal 1300 (e.g., the red/gray interface in FIG. 1) or the surface of the MIEC 1110 (e.g., the red/white interface in FIG. 1). The contributions of both the bulk and interfacial diffusion mechanisms to the overall effective transport conductance may be included by adding a size-dependent factor to the conductance as follows, $$\kappa_{MIEC} = \kappa_{MIEC}^{bulk} \times (1 + 2D_{Li}^{interface} \delta_{interface} / D_{Li}^{bulk} w) \quad (4)$$

The surface diffusivity of alkali metal 1300 may be estimated using empirical formulations. For example, the surface diffusivity of Li on a BCC Li metal may be estimated as follows, $$D_{Li}^{surface}=0.014\exp(-6.54T_M/T)[\text{cm}^2/\text{s}] \quad (5)$$

Eq. (5) has been shown to accurately predict the diffusivity of monatomic metals. At room temperature, Eq. (5) predicts $D_{Li}^{surface}=7\times10^{-7}$ cm²/s in BCC Li, which is 70× larger than $D_{Li}^{bulk}$ about $10^{-8}$ cm²/s in LiC$_6$ in the previous example. The geometric factor, $2\delta_{interface}/w$, is approximately 4 Å/10 nm=1/25. If $D_{Li}^{interface}$ is assumed to be similar to $D_{Li}^{surface}$, the contribution of interfacial diffusion to the overall conductance may still be 3× larger than bulk diffusion within the MIEC 1110 for LiC$_6$.

Generally, the phase boundary between the MIEC 1110 and the alkali metal 1300 may have a lower atomic free volume compared to a free alkali metal surface. Thus, $D_{Li}^{interface}$ may be smaller than $D_{Li}^{interface}=7\times10^{-7}$ cm²/s. For example, experimental diffusivity data suggests that $D_{Li}^{interface}\approx 2\times10^{-7}$ cm²/s, which is still comparable to the bulk diffusivity of LiC$_6$. For Li$_9$Al$_4$ and Li$_{22}$Si$_5$, $D_{Li}^{interface}$ is several orders of magnitude larger than $D_{Li}^{bulk}$. In particular, the ratio $D_{Li}^{interface}/D_{Li}^{bulk}$ is 200 for Li$_9$Al$_4$ and 20,000 for Li$_{22}$Si$_5$, which is substantially larger than the geometric factor $2\delta_{interface}/w$ (1/25 for w=10 nm). As a result, the contribution of bulk diffusion in the MIEC 1110 for these materials may be treated as being negligible. Thus, interfacial diffusion alone may yield an effective 1MIEC about 1 mS/cm, which satisfies the conditions in Eq. (2). The MIEC fill factor is thus w/(w+W)=0.1.

When interfacial diffusion is substantial, the MIEC 1110 may achieve a desired current density even when formed from materials with a poor bulk diffusivity, such as Li$_9$Al$_4$ and Li$_{22}$Si$_5$, since the diffusion flux along the $\delta_{interface}\approx 2$ Å MIEC/metal incoherent interface and/or MIEC surface is substantially larger than the bulk diffusion through the wall of the MIEC 1110. As a result, the ionic transport within the open pore structure 1120 may depend solely on the dimensions of the open pore structure 1120, which allows the MIEC 1110 to be formed from a broader range of electrochemically stable materials. For example, the MIEC 1110 may be formed from a material that exhibits desirable mechanical properties (e.g., toughness, yield strength, ductility) despite having a low bulk diffusivity.

As described above, the MIEC 1110 may be formed from typical anode materials such as carbon, silicon, and aluminum. More generally, the MIEC 1110 may be formed from a material that is electrochemically stable against the alkali metal 1300 such that the MIEC 1110 does not decompose to form fresh SEI at the interface between the MIEC 1110 and the alkali metal 1300. The alkali metal 1300 may be various types of metals including, but not limited to lithium, sodium, and potassium. In some implementations, only the MIEC 1110 (and not the solid electrolyte 1400) may be formed of an electrochemically stable material since the front 1340 of the alkali metal 1300 remains in contact with only the MIEC 1110 when extending into the open pore structure 1120 or receding from the open pore structure 1120. In this manner, no new SEI is formed as the battery 1000 is cycled. In some implementations, the MIEC 1110 and the solid electrolyte 1400 may both be formed of an electrochemically stable material, thus eliminating the generation of SEI during cycling and initial charging of the battery 1000. It should be appreciated that if the MIEC 1110 crumbles into pieces that are then embedded into the alkali metal 1300, electronic and ionic percolation is still possible since the MIEC 1110 is electrically and ionically conductive.

The MIEC 1110 may be made compatible with the alkali metal 1300 by alkaliating the MIEC 1110. Referring to the above example, a MIEC 1110 used in a Li battery may be lithiated to below 0V vs Li$^+$/Li to form compounds such as LiC$_6$ using carbon, Li$_{22}$Si$_5$ using silicon, and Li$_9$Al$_4$ using aluminum. Electrochemical stability of the MIEC 1110 may be evaluated on the basis that a thermodynamically stable compound is formed between the MIEC 1110 and the alkali metal 1300.

Figure 7A:
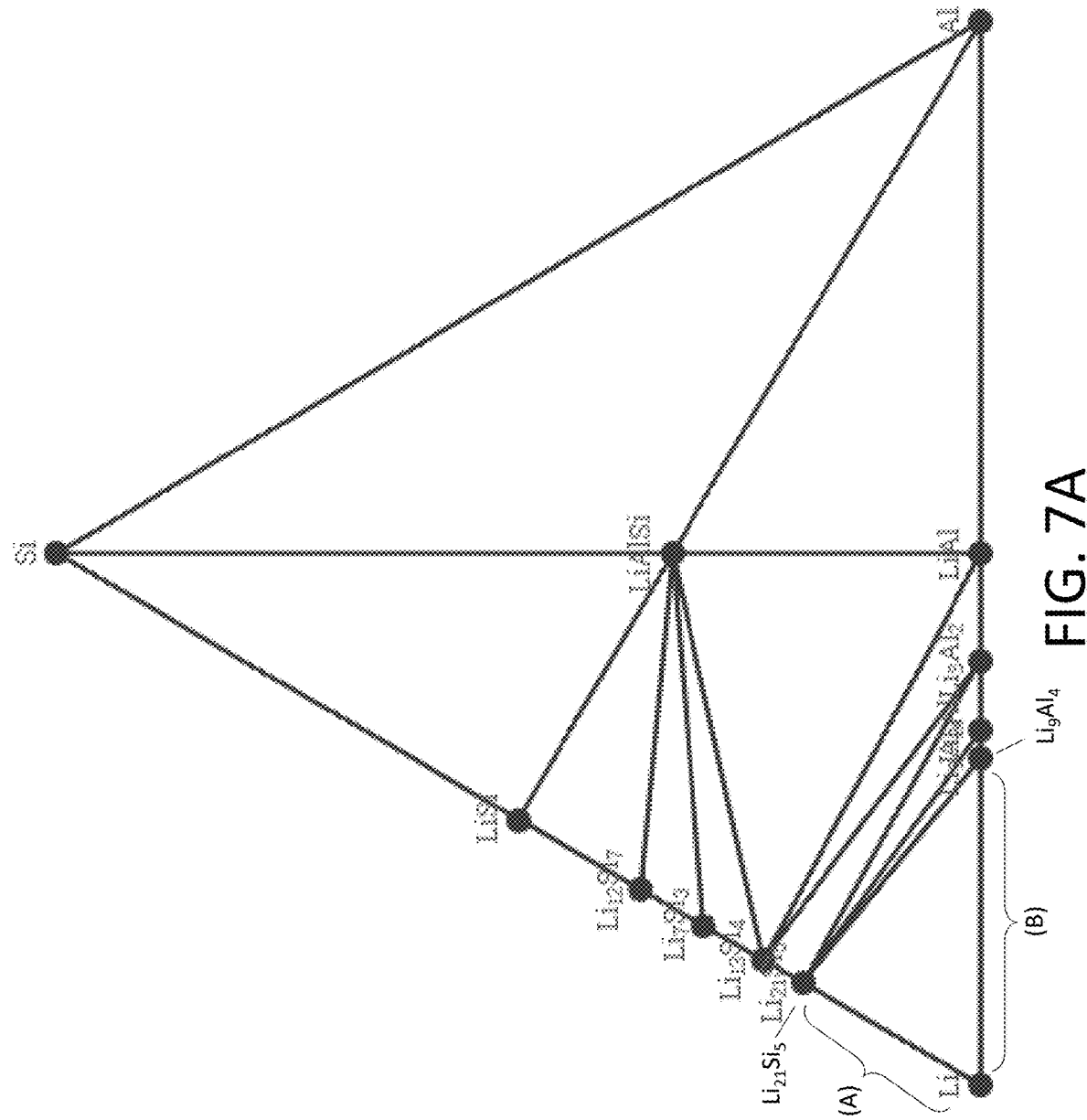
FIG. 7A shows an exemplary equilibrium phase diagram between Li, silicon (Si), and aluminum (Al).
Figure 7B:
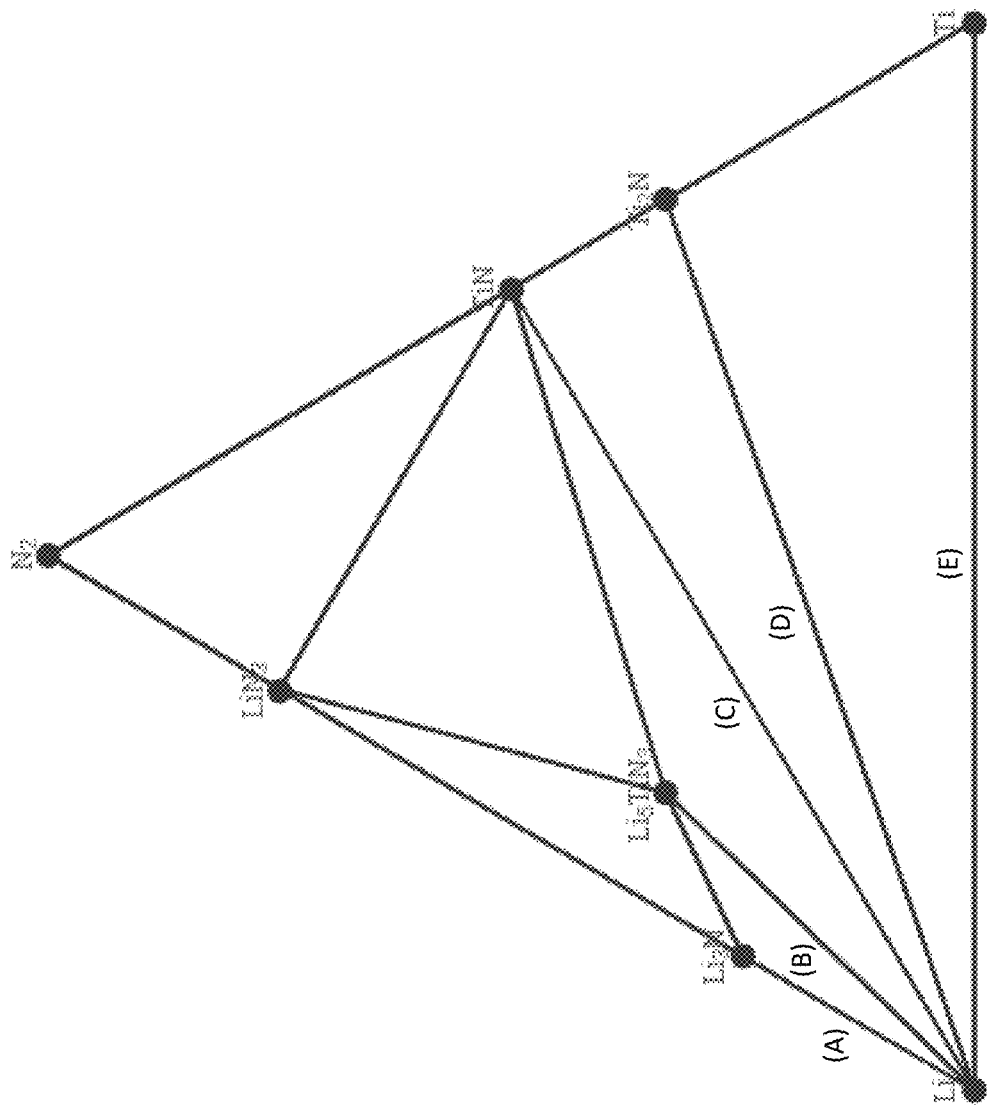
FIG. 7B shows an exemplary equilibrium phase diagram between Li, titanium (Ti), and nitrogen ($N_2$).

For example, FIG. 7A shows an equilibrium phase diagram between Li, Al, and Si. An electrochemically stable compound is formed when the alkaliated compound (e.g., a lithiated material in this case) is directly connected to the BCC Li metal phase by a tie-line. As shown, Li$_{22}$Si$_5$ and Li$_9$Al$_4$ are end-member phases directly connected to Li by tie-lines (A) and (B), respectively. The electrochemical stability of other materials may be evaluated in a similar manner, i.e., the alkialated compound has a direct tie-line to the alkali metal 1300. FIG. 7B shows another equilibrium phase diagram between Li, Ti, and N$_2$. As shown, numerous electrochemically stable lithiated compounds may be used including Li$_3$N, Li$_5$TiN$_3$, TiN, Ti$_2$N, and Ti. FIG. 7C shows yet another equilibrium phase diagram between Li, Ni, and Si. In this case, the electrochemically stable lithiated compounds are Ni, LiSiNi$_2$, and Li$_{22}$Si$_5$ (as before).

As evidenced by the phase diagrams of FIGS. 7A-7C, the MIEC 1110 may be formed from a wide range of materials, especially when compared to the solid electrolyte 1400, of which few materials are electrochemically stable against the alkali metal 1300. This provides greater flexibility in terms of using materials with desirable electrical, ionic, and mechanical properties. If the MIEC 1110 and the open pore structure 1120 are shaped and dimensioned such that the alkali metal 1300 is primarily driven by the interfacial transport mechanisms describe above, the ionic and/or electron transport properties and the mechanical stability of the MIEC 1110 may be decoupled from the material composition. This provides additional flexibility since a material may be selected for the MIEC 1110 based on fewer material parameters.

For example, the MIEC 1110 may be formed from a material having a large mechanical toughness (e.g., the material absorbs a large amount of energy before fracturing) to withstand the mechanical stresses generated by the alkali metal 1300 when cycling the battery 1000. In another example, the MIEC 1110 may be formed from a material that has an incoherent boundary/interface with the alkali metal 1300 to increase the free volume of the phase boundary and, in turn, increase the diffusion transport rate. In another example, the MIEC 1110 may be formed from a passive material (e.g., TiN) that does not store and/or release the alkali metal 1300 when cycling the battery 1000. For such materials, the alkali metal 1300 is primarily stored and/or release from the open pore structure 1120 formed by the MIEC 1110.

In some implementations, the surfaces of the MIEC 1110 forming the open pore structure 1120 may also be coated with an alkaliphilic coating to increase the electrical and ionic conductance between the MIEC 1110 and the alkali metal 1300. For example, a thin ZnO$_x$ film (e.g., about 1 nm) may be deposited onto the surfaces of the open pore structure 1120 in cases where the alkali metal 1300 is Li. The deposition of Li metal onto the ZnO$_x$ coating may cause a layer of Li$_2$O to form at the interface between the MIEC 1110 and the alkali metal 1300. The Li$_2$O film may increase the wettability of the Li metal to the MIEC 1110, ensuring contact is maintained as more alkali metal 1300 is deposited in the open pore structure 1120. The alkaliphilic coating may thus provide a deformable, wetting, and lubricating film to enhance contact and transport of the alkali metal 1300 in the MIEC 1110.

A First Exemplary Demonstration with a Single Carbon Hollow Tubule (CHT)

Figure 8:
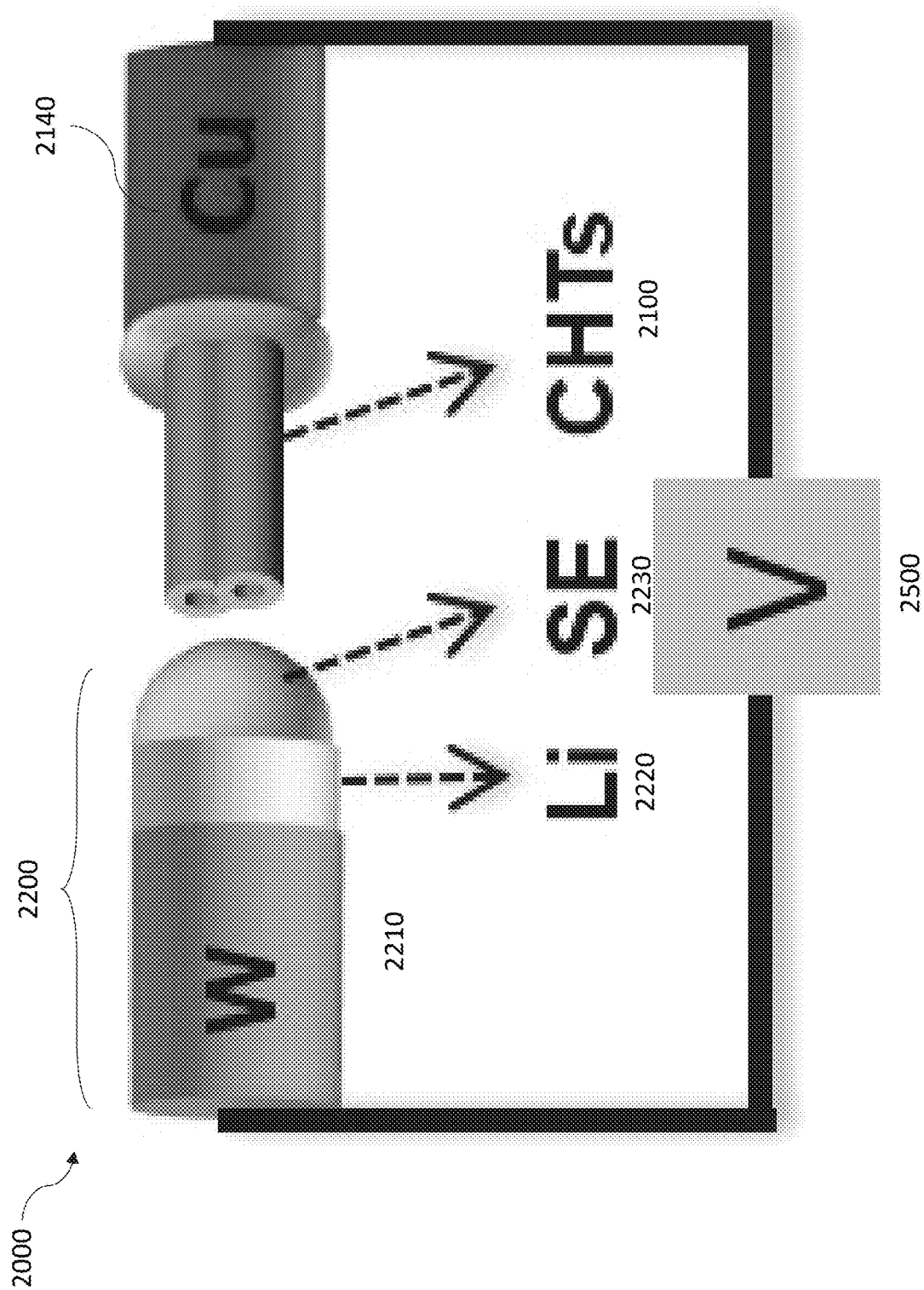
FIG. 8 shows a schematic of an experiment to characterize the deposition and/or stripping of Li in one or more tubules using a transmission electron microscope (TEM).

A demonstration of the MIEC 1110 will now be described. Specifically, the transport of the alkali metal 1300 through the open pore structure 1120 was observed and characterized by performing experiments where Li metal was transported through individual carbon hollow tubule (CHT). FIG. 8 shows a schematic diagram of the experimental setup 2000. As shown, the setup 2000 comprises a solid-state nanobattery 1000 electrically coupled to a voltage source 2500.

The nanobattery 1000 included an anode 1100 comprising one or more CHT's 2100. The CHT's 2100 were coupled to a transmission electron microscope (TEM) copper grid 2140 using silver conductive epoxy. Thus, the CHT's 2100 served as the MIEC 1110 and the copper grid 2140 served as the current collector 1140. The nanobattery 1000 also included a counter-electrode 2200 comprising a tungsten probe 2210, which was coated with Li metal 2220 in a glove box filled with Ar gas. A solid electrolyte 1400 comprising poly (ethylene oxide) (PEO) and Lithium bis(trifluoromethanesulfonyl)imide (LiTFSI) were dissolved in 1-Butyl-1-methylpyrrolidinium bis(trifluoromethylsulfonyl)imide (ionic liquid). The Li metal 2220 on the tungsten probe 2210 was then coated with an approximately 50 μm thick film of the solid electrolyte 1400 inside the glove box filled with Ar gas.

The nanobattery 1000 was placed in a TEM (JEOL 2010F) for in situ imaging and characterization at 200 kV. Specifically, the TEM included a Nanofactory STM/TEM holder, which held the counter-electrode 2200 via the tungsten probe 2210. The anode 1100 was mounted to a sample holder. After loading the counter-electrode 2200 and the anode 1100 into the TEM, the STM/TEM holder supporting the counter-electrode 2200 was moved until the solid electrolyte 1400 contacted the free ends of the CHT's 2100, thus completing the assembly of the nanobattery 1000.

The voltage source 2500 was used, in part, to electrically control the transport of Li metal into and/or out of the MIEC 1110. Specifically, lithium plating and stripping in the CHTs 2100 were realized by applying −2 V and +2 V with respect to the lithium metal.

The CHT's 2100 were synthesized using the following steps: (1) obtaining a solution by dissolving 1 g of polyacrylonitrile (PAN, Aldrich) and 1.89 g of $Zn(Ac)_2 \cdot 2H_2O$ in 30 mL of dimethylformamide (DMF, Aldrich) solvent, (2) synthesizing $PAN/Zn(Ac)_2$ composite fibers via electrospinning by using the solution of (1) at 17 kV of working voltage, 0.05 mm/min of flow rate, and 20 cm of electrospinning distance, (3) forming a layer of Zeolitic Imidazolate Framework (ZIF-8) on the surface of the composite fibers by adding the fibers into an ethanol solution containing 2-methylimidazole (0.65 g, Aldrich), and (4) heating the synthesized core-shell composite fibers at 600-700° C. for 12 h to obtain the CHTs with some lithiophilic $ZnO_x$. In step (3), a trace amount of cobalt acetate was introduced into the composite fibers to improve the degree of the graphitization of the synthesized CHTs.

Figure 9B:
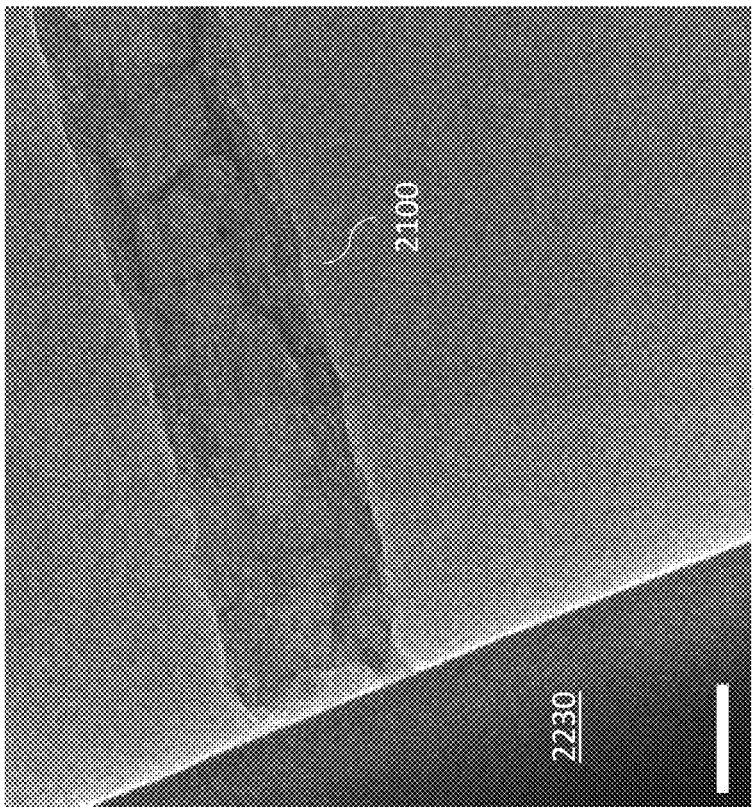
FIG. 9B shows a magnified TEM image of the single CHT and SE of FIG. 9A. The scale bar is 100 nm.
Figure 9A:
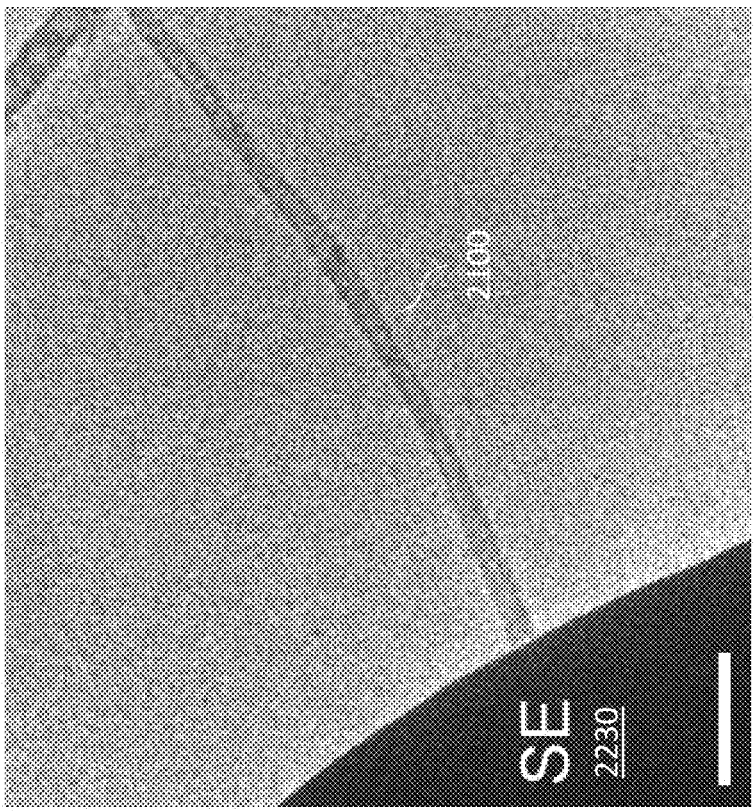
FIG. 9A shows a TEM image of an exemplary single CHT in contact with a solid electrolyte (SE). The scale bar is 1 μm.
Figure 9D:
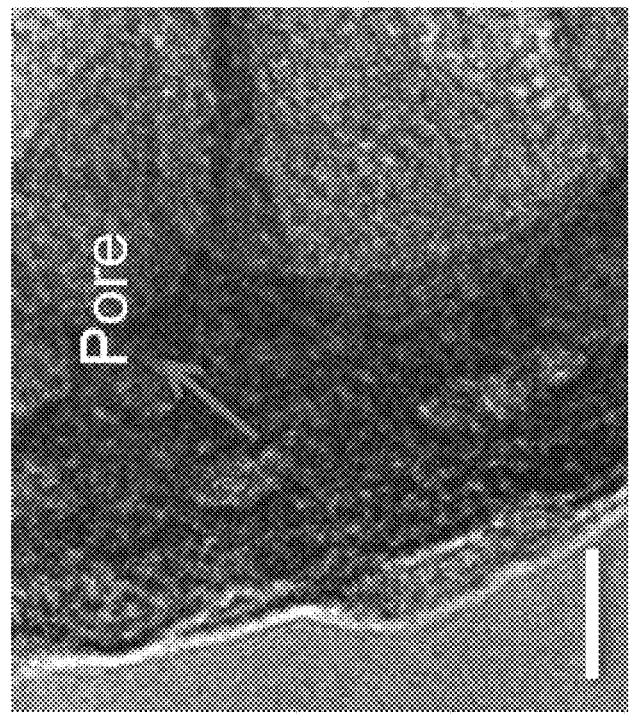
FIG. 9D shows a magnified TEM image of the single CHT of FIG. 9C. The scale bar is 20 nm.
Figure 9C:
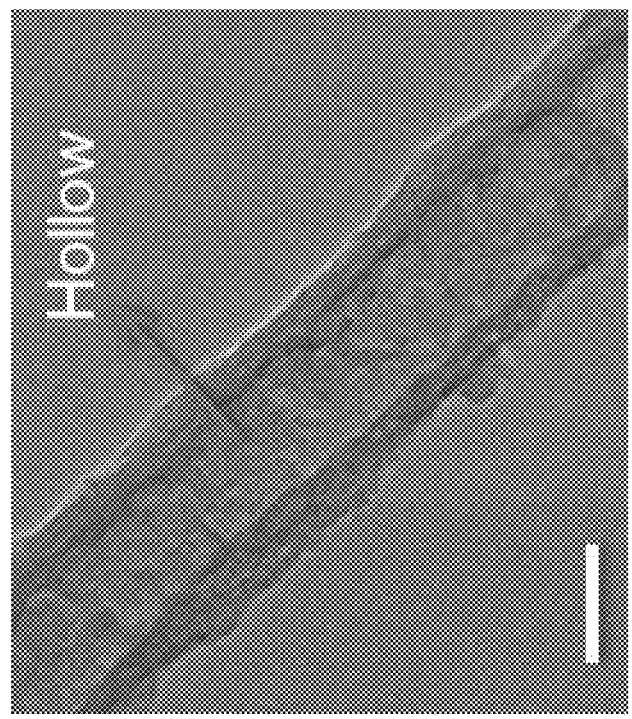
FIG. 9C shows a TEM image of an exemplary single CHT. The scale bar is 100 nm.

FIGS. 9A and 9B show TEM images of the CHT's 2100 coupled to the solid electrolyte (SE) 2230 after assembly in the TEM. FIGS. 9C and 9D show magnified TEM images of a single CHT 2100 fabricated using the above method. As shown, the resultant CHT's 2100 had an inner diameter W of about 100 nm and a wall thickness w of about 20 nm. FIG. 9D also shows the CHT 2100 is nanoporous. Thus, the CHT's 2100, as constructed, would allow the inert gas phase in a battery 1000 to equilibrate when depositing Li in the open pore structure 1120.

The in-situ TEM experiments were performed under conditions that reduced electron beam damage. Li metal is sensitive to electron beam irradiation in a TEM due, in part, to the elastic and inelastic scattering between the incident electron beam and the sample. The elastic interactions from electron-nucleus scattering may lead to sputtering damage. The inelastic interactions from electron-electron scattering may cause damage due to specimen heating and radiolysis. When taking images and/or video of the nanobattery 1000, an electron beam current of about 1.5 $mA/cm^2$ was used to reduce damage. Images were also acquired at a slight underfocus condition to enhance the contrast. The electron beam was also banked prior to imaging the sample and the exposure time (e.g., for taking a video) was limited to 2 minutes. The electron beam was also blanked while plating and stripping Li, except when making observations, to reduce the effect of electron beam impinging on the sample.

The nanobattery 1000 was also characterized by other instruments including a high-resolution TEM (HRTEM), a field emission scanning electron microscopy (FESEM, FEI Helios 600 Dual Beam FIB), an energy-dispersive X-ray spectroscope (EDX, oxford), and an X-ray photoelectron spectroscopy (XPS, PHI5600).

Figure 10:
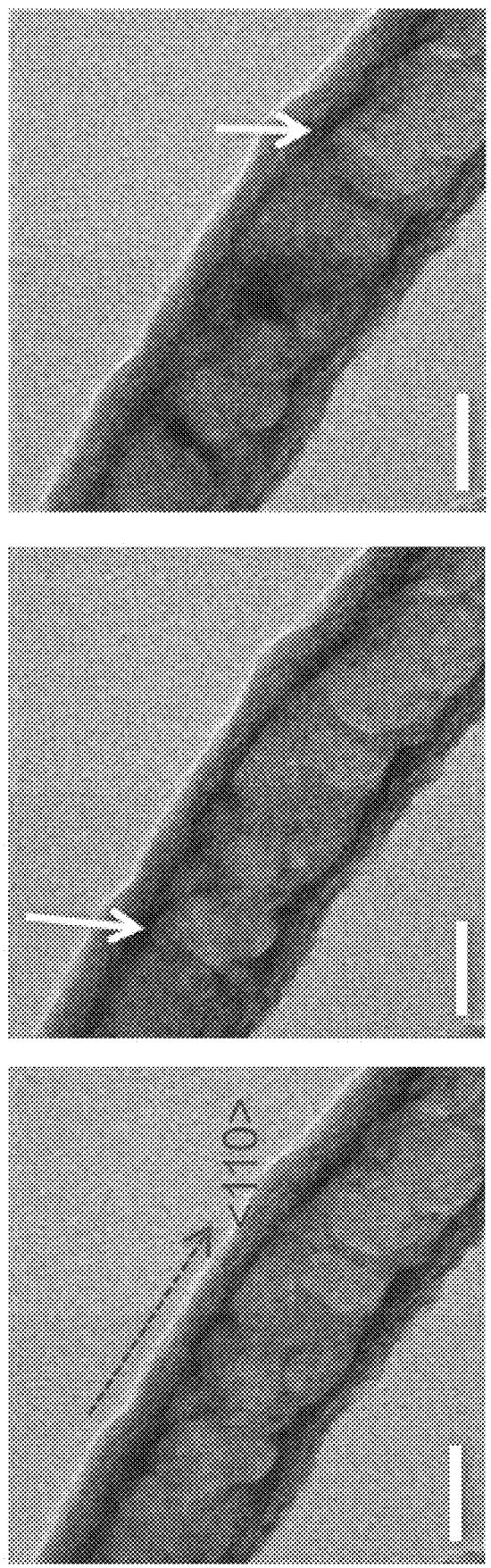
FIG. 10 shows a series of TEM images of Li being plated within a single CHT. The Li crystal is shown in dark gray and the Li front is marked by the arrow. The scale bar is 100 nm.
Figure 11:
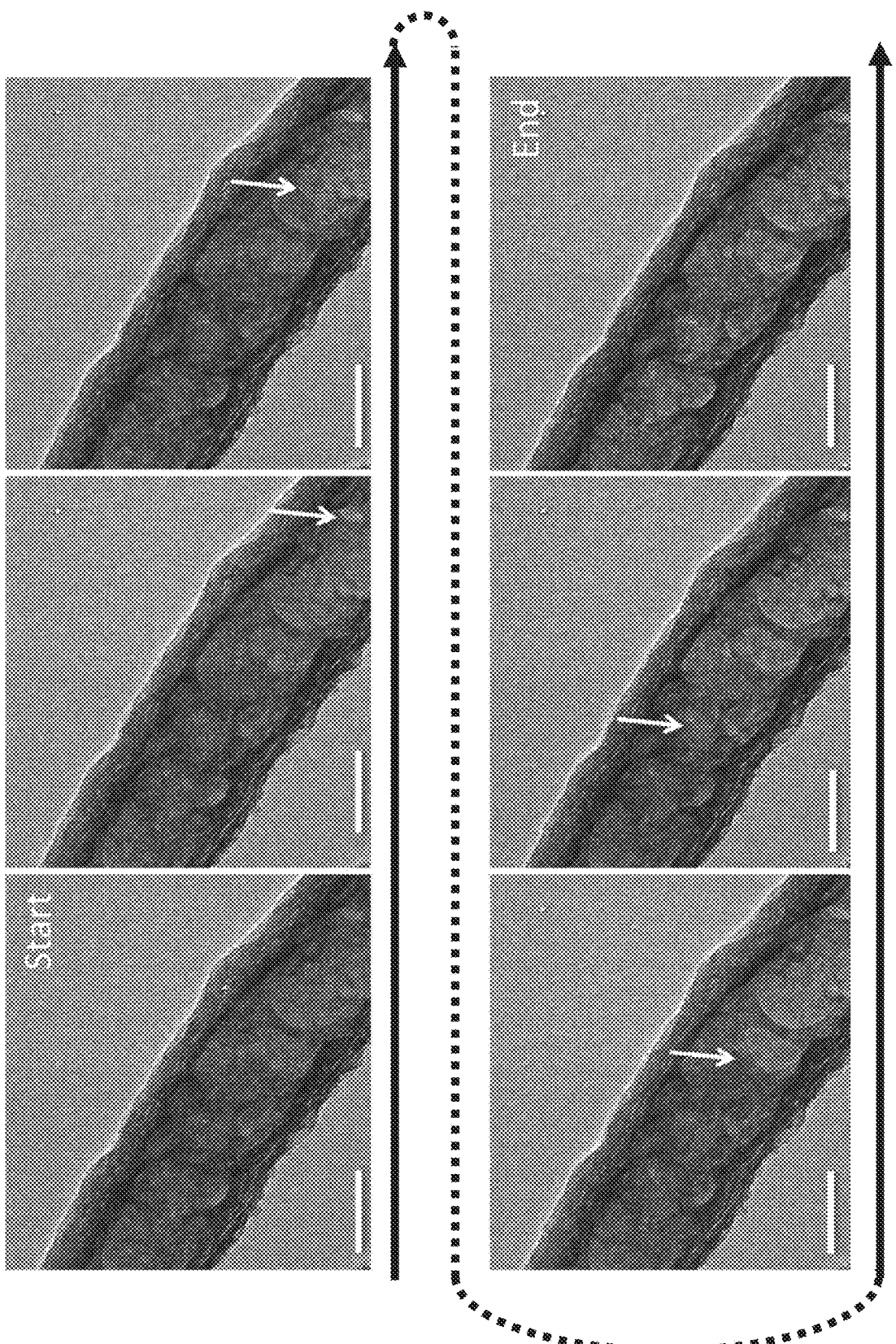
FIG. 11 shows a series of TEM images of Li being stripped within a single CHT. The Li crystal is shown in dark gray and the Li front is marked by the arrow. The scale bar is 100 nm.

FIG. 10 shows a series of TEM images where Li is progressively plated along a single CHT with $ZnO_x$. As shown, the Li exhibits a front (indicated by the white arrow) that moves along the CHT as more Li is deposited. The Li initially underwent electrodeposition at the end of the CHT and proceeded to fill the initial void plug of the tubule. FIG. 11 shows a series of TEM images where Li is progressively stripped along the CHT of FIG. 10. FIGS. 10 and 11 thus show Li can be reversible deposited/stripped within a CHT.

Figure 12B:
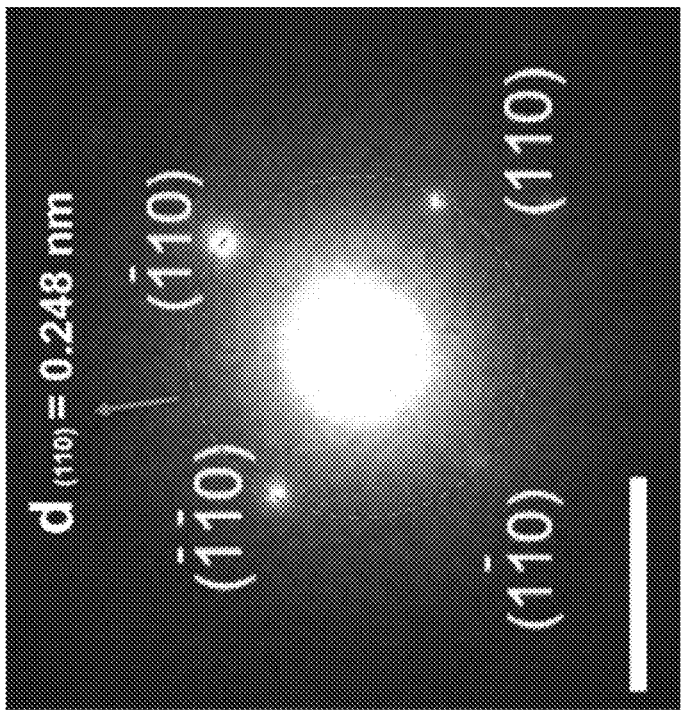
FIG. 12B shows a SAED pattern of an exemplary CHT plated with Li, which is indicated by the stable (110) and (110) reflections perpendicular and parallel to the CHT axis, respectively.
Figure 12A:
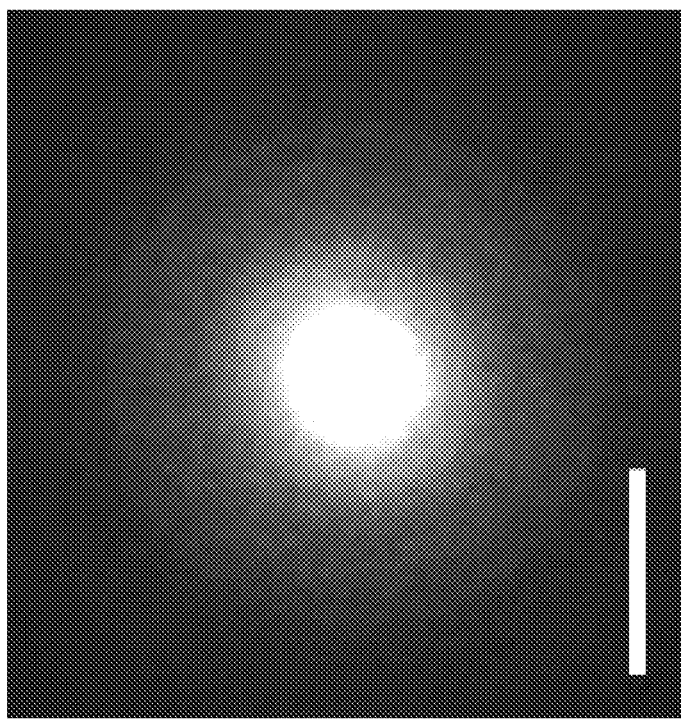
FIG. 12A shows a selected area electron diffraction (SAED) pattern of an exemplary CHT with no Li, which is indicated by an amorphous ring. The scale bar is 5 $nm^{-1}$.

FIGS. 12A and 12B show selected area electron diffraction (SAED) patterns before and after the Li metal front passes a portion of the CHT, respectively. The SAED patterns were acquired using a spread electron beam with an electron beam current below 1 $mA/cm^2$ to reduce irradiation damage. FIG. 12A shows a ring pattern indicating the CHT had an amorphous morphology. FIG. 12B shows a pattern with well-defined spots that correspond to the crystal planes of Li. In particular, the $(110)_{BCC\ Li}$ is found to be perpendicular to the longitudinal axis of the CHT and the $(1\bar{1}0)_{BCC\ Li}$ is found to be parallel to the CHT axis. A circle intersecting the spots in the SAED pattern of FIG. 12B indicates the lattice spacing is about 0.248 nm.

FIG. 13 further shows the SAED patterns of the CHT with Li may be used to evaluate the crystal structure of Li. In particular, the two pairs of symmetric diffraction spots in the two SAED patterns were offset by a measured angle of 60° from one another. The indexing and the measured 60° angle between the two pairs of the symmetric spots match the standard indexed diffraction patterns for a BCC crystal in a $[\bar{1}11]$ beam direction under six-fold symmetry. Additionally, the distance between the collected diffraction spots is similar to BCC lattice of Li. These results suggest the Li being transported through the CHT is indeed a solid-phase and, in fact, substantially single crystalline.

FIGS. 14A-14C show HRTEM images of a portion of the CHT as a fresh Li crystal is formed within the CHT. The HRTEM images of the Li metal plated inside the tubule were acquired using an electron beam current of about 0.3-0.5 Å/$cm^2$. FIG. 14C shows that when the Li crystal was first formed, lattice fringes with 0.248 nm lattice spacing were observed corresponding to the Li (110) planes. The Li lattice fringes remained for several seconds before vanishing due to electron beam irradiation damage. The CHTs helped to reduce irradiation damage when imaging the Li inside the tubule. The $Li_2O$ is also robust to electron beam irradiation. Sputtering damage due to elastic scattering was reduced by confining the Li inside the CHT. For inelastic scattering, the CHT provided sufficient thermal and electrical conduction to dissipate heat generated by electron irradiation.

FIG. 15A shows electron energy loss spectroscopy (EELS) spectra of the Li K-edge measured after Li deposition inside the CHT using an approximately parallel electron beam in diffraction mode with an energy resolution of 1.5 eV. The EELS spectra were collected using a scanning transmission electron microscope (STEM) mode. The electron beam spot size was about 1 nm with a semi-convergence angle of about 5 mrad and a semi-collection angle of about 10 mrad. As shown, the Li K-edge obtained exhibited a shoulder at 55.9 eV and a peak rising at 62.5 eV. These spectral features are similar to the features of the Li K-edge previously measured from a Li metal dendrite at cryogenic conditions (see FIG. 15B), further confirming the presence of Li in the CHT.

FIG. 16A shows another reference EELS spectra of Li K-edges for $Li_2O$ and LiOH with peaks appearing at 58.2 eV, 62.7 eV and 75 eV. FIG. 16B shows another reference EELS spectra of Li K-edges for $Li_2O_2$ and $Li_2CO_3$. A clear difference may be observed when comparing the measured EELS spectra of FIG. 15A to the reference EELS spectra of FIGS. 16A and 16B This indicates the Li phase deposited in the CHT is not $Li_2O$, LiOH, $Li_2O_2$ or $Li_2CO_3$. In other words, the EELS spectra show the Li phase deposited and stripped from the CHT is not a Li oxide or another phase.

FIGS. 17A-17E show TEM images of a long CHT, which was used to demonstrate Li metal transport across distances of several microns (i.e., a length scale comparable to the height of the MIEC 1110 in the battery 1000). FIG. 17A shows a low magnification image of the long CHT and FIGS. 17B and 17C show magnified images of sections (A) and (B) along the long CHT. FIG. 17D shows Li metal plating at section (A) of the CHT and FIG. 17E shows Li metal stripping at section (B) of the CHT. Section (B) of the long CHT was measured to be over 6 μm away from the solid electrolyte 1400. Thus, observations of Li metal at section (B) indicates the length of Li plated along the CHT was at least 6 μm.

FIGS. 18A-18F show TEM images of a CHT with obstructions disposed in the interior space of the CHT. FIGS. 18A and 18B show low magnification images of a section of the CHT before and after Li plating, respectively. These images show that Li deposition may still occur despite the presence of the obstructions within the CHT. This may be attributed to the Li metal being primarily driven by interfacial diffusion, which is insensitive to obstacles and/or obstructions within the MIEC 1110. In other words, interfacial diffusion may enable the Li metal to "climb over" obstructions within the CHT by following a more tortuous path due to the local structures of the obstructions in the CHT.

FIGS. 18C-18F show a series of images of a particular section of the CHT where Li first diffuses along the surface of a local 3D structure inside the CHT followed by Li plating and filling the open pores in the CHT. The thermodynamic driving force originating from the overpotential (chemical potential) may drive an atomic fountain-like behavior causing Li to fill the open pores and, on average, guide the Li flux along the overall direction of the CHT channel. Said in another way, the multi-tip-deposition of Li may initially fill the inside spaces defined by the 3D structures/obstructions in the CHT. Although Li plating may locally follow the surfaces of the 3D structures defining said spaces, the overall direction of Li deposition is ultimately confined by the walls of the CHT and, hence, should follow the longitudinal axis of the CHT (e.g., the overall "rail") as shown in FIGS. 18A and 18B.

As previously described, multiple types of creep mechanisms (e.g., interfacial diffusion, power-law dislocation) may contribute to the transport of alkali metal 1300 in the open pore structure 1120. To distinguish between the two creep mechanisms, experiments were performed based on the schematic of FIG. 5B. It should be appreciated that the stripping process depicted in FIG. 5A may allow both interfacial diffusion mechanism and dislocation motion mechanism to co-exist; hence, an in-situ TEM experiment would be unable to differentiate between the two mechanisms. However, the schematic of FIG. 5B includes a void space between the Li metal and the solid electrolyte. In this configuration, the dislocation-slip mechanism cannot occur due to the presence of the void space, thus observation of Li transport would imply interfacial diffusion along the MIEC wall interior or interface.

FIG. 19 show a series of TEM images of Li being stripped from a CHT with a void space between the Li metal and the solid electrolyte 1400. As shown, Li metal may still be stripped despite the presence of the void space in the CHT. The white arrows in FIG. 19 indicate the movement of the free surface of the Li metal crystal (LiBCC) as Li atoms on said free surface diffuse towards the Li(BCC)/MIEC interface and undergo interfacial diffusion. The stripping rate of Li was also measured to be similar to other experiments with no void space, which suggests dislocation power-law creep does not contribute appreciably to Li transport. Instead, these results indicate the transport of Li through the CHT is driven primarily by interfacial diffusion (i.e., Coble creep).

The mechanism for transporting alkali metal 1300 across a single pore in the open pore structure 1120 is scalable. For example, FIGS. 20A and 20B show two neighboring CHT's may also rail-guide Li plating and/or stripping along the length of each tubule. The filling ratio of Li inside the tubule was estimated by an EELS thickness measurement. The thickness measurement was performed using an absolute log-ratio method, which is based on the following, $$\frac{t}{\lambda} = \ln\left(\frac{I_t}{I_0}\right) \qquad (6)$$

where t stands for the thickness, λ stands for effective mean free path, $I_t$ is the intensity integrated over the EELS spectrum, and Jo is the intensity integrated under a zero loss peak.

The accelerating voltage, semi-convergence, and semi-collection angles previous described and the atomic number, $Z_{eff}$, was used to calculate X. Before Li plating, $Z_{eff}=6$ for the CHT. After Li plating, $Z_{eff}$ may be estimated based on a mixture of Li and CHT at the location where the EELS signal was recorded. For example, an atomic ratio between Li and C may be estimated to be 0.56:1 based on the observed geometry of the tubule (e.g., an inner diameter of about 100 nm and a wall thickness of about 28 nm). Thus, $Z_{eff}$ may be estimated using the following, $$Z_{\it eff} = \frac{\sum_i f_i Z_i^{1.3}}{\sum_i f_i Z_i^{0.3}} \quad (7)$$

Based on Eq. (7) and the above values, $Z_{\it eff}$=5.1 after Li plating. FIGS. 20C and 20D show EELS spectra before and after Li plating at the location marked (+) in FIG. 20A. The Li K-edge of Li was obtained by background subtraction. Based on the EELS spectra, the thickness of the CHT before and after Li plating were estimated to be about 68 nm and about 160 nm. Therefore, the thickness difference, which corresponds to the thickness of the Li plated, was estimated to be about 92 nm (the inner-diameter of the tubule is about 100 nm).

As further demonstration of the scalable nature of the MIEC 1110 mechanisms described herein, FIGS. 21A and 21B show another set of TEM images where Li is plated simultaneously along three aligned tubules. In FIG. 21B, the brightness is darker, indicating deposition of Li, despite blurring caused by thicker walls of each CHT. Larger scale demonstrations of an exemplary MIEC 1110 are described in further detail below.

As previously mentioned, the transport of the alkali metal 1300 may be primarily driven by the Coble creep mechanism when the characteristic width of each pore in the open pore structure 1120 is less than about 300 nm. For example, FIGS. 22A and 22B show Li plating and stripping, respectively, in a CHT with a 200 nm diameter. FIGS. 23A and 23B show Li plating and stripping, respectively, in a CHT with a 100 nm diameter. FIG. 24 shows Li plating in a CHT with a 30 nm diameter. FIG. 25 shows Li plating in a CHT with a 60 nm diameter. The wall thicknesses ranged between about 50 to 60 nm.

For FIGS. 24 and 25, the small amount of Li deposited within the CHT results in a low image contrast; hence, the presence of Li is difficult to observe. To show Li was plated in these smaller tubules, a large reverse bias voltage of 10 V may be applied, causing Li to overflow from the CHT. This is indicated by a bulge of Li in FIG. 24 and a leak of Li in FIG. 25.

As described above, the open pore structure 1120 formed by the MIEC 1110 may be coated with an alkaliphilic coating that increases wettability towards the alkali metal 1300, thus increasing ionic and electrical contact with the MIEC 1110. Experiments were performed to characterize the interface between the BCC Li metal (the alkali metal 1300) and a $Li_2O$ coating (the alkaliphilic coating) formed, in part, by coating the CHT with $ZnO_x$, which results a conversion/alloying reaction of $ZnO_x+(2x+y)Li=ZnLi_y+xLi_2O$. Due to challenges in observing the $Li_2O$ coating inside the CHT, the Li metal was intentionally over-plated during deposition in order to increase the pressure $P_{LiMetal}$ (x) until Li metal whiskers were extruded out of the CHT. The Li whiskers, which included the $Li_2O$ coating, were then analyzed.

FIG. 26A shows an SEM image of an exemplary CHT coated with $ZnO_x$. FIGS. 26B-26D show EDX maps of C, O, and Zn, respectively. As shown, the $ZnO_x$ coating is uniformly distributed in the CHT. FIGS. 27A-27C show corresponding XPS spectra for the Cis, $Zn2P_{3/2}$, and O1s lines, which further confirms the presence of $ZnO_x$. For instance, the O1s peak in FIG. 27C may be attributed to a sum of two peaks corresponding to C—O and Zn—O. FIGS. 28A and 28B show EDX spectra of the CHT sample before and after acid treatment. FIG. 29 shows a table of the Zn and O ratios in the CHT samples before and after said acid treatment. The stoichiometry of $ZnO_x$ may be estimated from FIG. 29 to be x about (10.01−9.09)/2.03=0.45. The atomic ratio of zinc atoms of zinc oxide to carbon atoms is about 2%.

FIGS. 30A-30E show a series of dark-field images of an exemplary CHT being over-plated with Li. FIG. 30A shows the Li metal is initially plated inside the CHT. FIG. 30B shows that after additional deposition of Li, the Li metal breaks through the CHT wall and begins to wet the outer surface of the CHT. FIGS. 30C and 30D show that with further Li deposition, the Li metal spreads across the exterior surface of the CHT. FIG. 30E shows that after Li sufficiently wets the outer surface of the CHT, subsequent deposition of Li results in an outgrowth of Li, thus forming the Li whisker.

FIG. 31 shows a HRTEM image of the CHT before Li plating. As shown, no $Li_2O$ layer was observed to be present on the outer surface of the CHT. FIGS. 32A-32C show the $Li_2O$ layer growing from the outer surface of the CHT as the Li metal is being over-plated in the CHT. FIG. 32D shows a magnified image of FIG. 32C where the lattice fringes of the $Li_2O$ coating are observable. As shown, the lattice fringes exhibit a spacing of 0.27 nm corresponding to the lattice spacing of the $Li_2O$ (111) planes. FIG. 33 shows an HRTEM image of the $Li_2O$ coating formed onto the carbon surface of the CHT.

FIG. 34A shows an image of a Li whisker extending from the outer surface of the CHT. As shown, the whisker exhibits favorable parallel interfaces between the {110} crystal planes of Li metal and the {111} crystal planes of $Li_2O$ (i.e. $\{110\}_{BCC\ Li}//\{111\}_{FCC\ Li2O}$). FIG. 34B shows a SAED pattern of the Li whisker and the $Li_2O$ coating where the side edges of the Li whisker are shown as $\{110\}_{BCC}$ planes. FIG. 34C further shows an HRTEM image of the $Li_2O$ layer on the Li metal. The side edges of the $Li_2O$ coating present $\{111\}_{FCC}$ planes.

The $Li_2O$ layer has an FCC crystal structure, thus the $\{110\}_{BCC}//\{111\}_{FCC}$ orientation relationship is similar to the Kurdjumov-Sachs orientation relationship (OR) in various steels. Both the $\{111\}_{FCC}$ and $\{110\}_{BCC}$ are slip planes, thus the orientation relationship may be formed due to minute local slippage. The OR provides strong adhesion between the Li and $Li_2O$ phases, thus enabling the $Li_2O$ crystalline layer to remain attached to the Li metal as a lubricant layer. The lateral growth of the $Li_2O$ layer by interfacial diffusion was observed on a thicker Li metal nanostructure outside the tubule. FIGS. 35A and 35B show the $\{111\}_{Li2O}$ planes, which are parallel to the outer surface of the CHT, advancing outwards. FIG. 35C shows EELS spectra of the Li K-edge on the outer layer of $Li_2O$. $Li_2O$ is shown as a shoulder feature in the spectra. These results show that post-formed $Li_2O$ nanocrystals may also creep and re-arrange to wet the Li metal.

Based on the results above, a few-nm thick $Li_2O$ layer may function as a 'lubricant' by enabling slight slippage between the Li and $Li_2O$ surfaces, which increases the mechanical durability and provides strong adhesion between the Li metal and the MIEC, thus ensuring lithiophilicity on the MIEC wall.

In some implementations, the thin lubricant layer may spread onto at least one of the current collector 1140 and/or the solid electrolyte 1400. Once this occurs, a thin wetting layer of Li metal may follow, forming an atomically-thin, but effective ionic and electronic conduction channel ("composite interfacial MIEC"). The thin wetting layer of Li metal may ensure any Li metal in the open pore structure 1120 (e.g., the Li metal beads α, β, and γ in FIG. 1) is connected to the MIEC 1110. In other words, the thin wetting layer of Li may prevent the formation of patches with poor conductivity that may otherwise generate dead Li in the MIEC 1110.

Cycling tests were also performed on a single CHT where Li metal was continually transported into and out of the CHT. FIG. 36A shows the charging profile (voltage as a function of time) for the first cycle (i.e., first lithiation) at a galvanostatic current of 50 pA. As shown, the voltage progressively decreases when larger than 0 V. This sloped voltage feature is attributed to the lithiation of the CHT, which enables the CHT to function as the MIEC 1110. When the voltage falls below 0 V during the same lithiation cycle, the voltage saturates to a stable plateau at about −0.25 V corresponding to the plating of Li metal inside the CHT.

FIG. 36B shows the charging profile for subsequent cycles after the CHT is first lithiated at a galvanostatic current of 50 pA. As shown, the voltage remains fairly stable below 0 V when charging the CHT, which corresponds to BCC Li being plated inside the CHT. When discharging the CHT, the voltage remains stable above 0 V corresponding to BCC Li being stripped form the CHT. The charge process occurred at an overpotential of about −0.15 V and the discharge process occurred at an overpotential of about 0.25V. FIG. 36B also shows corresponding TEM images of the CHT, the CHT after Li plating, and the CHT after Li stripping. As shown, the CHT after Li plating is a darker gray, which indicates Li metal filled the CHT.

FIGS. 37A-37K each show a series of TEM images of the CHT being charged (Li deposition) and discharged (Li stripping) for the $1^{st}$, $10^{th}$, $20^{th}$, $30^{th}$, $40^{th}$, $50^{th}$, $60^{th}$, $70^{th}$, $80^{th}$, $90^{th}$, and $100^{th}$ cycle. As shown, the CHT remains mechanically intact after 100 cycles of Li metal plating and stripping.

The experimental demonstrations described above have focused on using Li as the alkali metal 1300 in the MIEC 1110. However, it should be appreciated that the transport mechanisms and the designs for the MIEC 1110 and open pore structure 1120 are general and may be applied to other materials including, but not limited to sodium (Na) and potassium (K). For example, FIG. 38A shows a series of TEM images where Na metal is deposited inside a CHT. FIG. 38B shows a series of TEM images of Na metal being stripped from the CHT. Similar to the Li metal experiments, the Na metal may be transported through the interior space of the CHT with a well-defined front. This suggests Na metal may also be transported through the CHT by interfacial diffusion. FIG. 38C shows a SAED pattern of the CHT after being plated with Na metal. As shown, the pattern exhibits well-defined spots corresponding to Na crystal planes. This suggests the Na metal is transported as a substantially single crystalline solid in the CHT.

A Second Exemplary Demonstration with a Carbonaceous MIEC Beehive

The previous demonstration evaluated the transport of alkali metal 1300 through a single (or few) tubules representing the MIEC 1110. To demonstrate the scalability and use of the MIEC 1110 in a practical device, a large scale MIEC was fabricated and integrated into a cm×cm all-solid-state full cell battery. Specifically, a carbonaceous MIEC beehive was fabricated with about $10^{10}$ aligned tubules where each tubule had an aspect ratio on the order of about $10^2$. A half-cell and a full-cell were then assembled with the carbonaceous MIEC beehive for use with Li metal. It should be appreciated that the techniques previously described may also be used to characterize the carbonaceous MIEC beehive.

The carbonaceous MIEC beehive was synthesized as a Li host using the following steps: (1) growing a layer of carbon onto the inner surface of an anodic aluminum oxide (AAO) template using chemical vapor deposition (CVD) with a $C_2H_2$ gas flow rate of 90 sccm at 640° C., (2) depositing a layer of Pt onto the bottom of the AAO template as the current conductor via sputtering, (3) etching the AAO template using a 3M NaOH aqueous solution with a small amount of ethanol to obtain the carbonaceous MIEC beehive, and (4) depositing a 1 nm-thick ZnO layer onto the inner-surface of MIEC beehive using atomic layer deposition (ALD) to enhance the lithiophilicity of the MIEC beehive.

FIGS. 39A-39C show FESEM images of an exemplary carbonaceous MIEC beehive. As shown, the carbonaceous MIEC beehive is comprised of an array of aligned CHT's. FIG. 40 shows a TEM image of a couple CHT's within the carbonaceous MIEC beehive. FIG. 41A shows a SEM image of a portion of the carbonaceous MIEC beehive comprising several tubules. FIGS. 41B-41D show EDX maps of the portion of carbonaceous MIEC beehive of FIG. 41A for C, O, and Zn, respectively. As shown, the 1 nm-thick ZnO layer deposited on the surface of the CHT's is uniform.

Nanoindentation tests were performed to evaluate whether the carbonaceous MIEC beehive can sustain a gas-pressurized environment. FIG. 42 shows a load-displacement curve of the carbonaceous MIEC beehive, which indicates the measured nominal hardness is about 65 MPa. This hardness is sufficient to sustain at least a gas pressure of about $10^1$ MPa (i.e., a compression ratio of 10×) when the gas is compressed by Li metal deposition in the MIEC.

A half-cell 3000 was assembled that included the carbonaceous MIEC beehive, a solid electrolyte, and a Li metal counter-electrode. First, a about 200 nm thick layer of lithium phosphorus oxynitride (LiPON) was deposited onto the MIEC beehive via sputtering deposition to obstruct the open pores, thereby reducing the inflow of polymeric solid electrolyte into the MIEC beehive during testing at 55° C. FIG. 43 shows a FESEM image of an exemplary carbonaceous MIEC beehive partially covered with LiPON. The LiPON does not necessarily provide hermiticity to the carbonaceous MIEC beehive. However, a 50 μm thick contiguous polymeric solid electrolyte layer disposed thereafter does provide hermiticity. A P(EO/EM/AGE)/LiTFSI film (KISCO Ltd.) was used as the solid electrolyte for the half-cell 3000. The MIEC beehive and a Li metal chip (more than 100× excess) were pressed onto opposing sides of the solid electrolyte film to complete assembly of a 2032 coin cell. The Li metal chip was used as the counter-electrode. No (ionic) liquid or gel electrolyte was used.

FIG. 44A shows an image of an exemplary carbonaceous MIEC beehive. The cm×cm×50 μm piece was plated with Pt as the current collector 1140 (see FIG. 44C) and was readily handled during assembly without the MIEC beehive being damaged. FIG. 44B shows an image of an exemplary P(EO/EM/AGE)/LiTFSI film. FIG. 44D shows an FESEM image of the carbonaceous MIEC beehive coated with Pt as the current collector 1140.

FIG. 45A shows a schematic of an exemplary half-cell 3000 using the carbonaceous MIEC beehive for testing. As shown, a voltage source is coupled to the Li counter-electrode and the Pt current collector. The obtained Li/SE/MIEC beehive half-cell 3000 was tested at different current densities of 0.125, 0.25 and 0.5 mA/cm². The half-cell 3000 was initially cycled for several cycles to stabilize the interface between the solid electrolyte and the electrode. Additionally, a reference half-cell was constructed using a carbon-coated Cu foil as the Li host for comparison with the half-cell 3000 using the carbonaceous MIEC beehive.

FIGS. 45B and 45C show exemplary charge/discharge profiles for Li plating and stripping, respectively. The pink line represents the half-cell 3000 with the carbonaceous MIEC beehive and the green line represents the half-cell using the carbon-coated Cu foil as the Li host. FIG. 45D shows the overpotential and Coulombic efficiency (CE) as various current densities. The CE was obtained by calculating the ratio of the discharge and the charge capacity. FIG. 45E shows the charge/discharge voltage profile as a function of time for the half-cells to evaluate cycling stability. When compared to the reference half-cell, the half-cell 3000 with the MIEC exhibits a lower overpotential (39 mV vs 250 mV at 0.125 mA/cm$^2$), a higher CE (97.12% vs 74.34% at 0.125 mA/cm$^2$), and better cycling stability as indicated by the longer lifetime of the half-cell with the MIEC in FIG. 45E.

FIG. 45F shows a chart of the capacity and current density as measured for the half-cell 3000 with the MIEC and the reference half-cell and compared against previously demonstrated batteries. As shown, the half-cell 3000 is able to cycle a large amount of Li metal with a large areal capacity of about 1.5 mAh/cm$^2$, which is substantially larger than the reference half-cell (about 1.0 mAh/cm$^2$) and previous all-solid-state batteries (up to about 0.5 mAh/cm$^2$).

A full-cell was also assembled and tested using the carbonaceous MIEC beehive. The full-cell included a LiFePO$_4$ cathode, which was constructed from the active material LiFePO$_4$ (60 wt %), polyethylene oxide (PEO, 20 wt %), LiTFSI (10 wt %), and carbon black (10 wt %). The mass loading was 4-6 mg (LiFePO$_4$)/cm$^2$. FIG. 46 shows an image of an exemplary LiFePO$_4$ cathode. An exemplary 2032 coin cell was constructed using the carbonaceous MIEC beehive as the anode (pre-deposited with only 1× excess Li), the LiFePO$_4$ electrode as the cathode, and a solid electrolyte in an Ar-filled glove box. It should be appreciated that previous all-solid-state batteries typically use commercial Li foil (100× excess), which results in less efficient use of Li. The all-solid-state battery was tested at 55° C. with a LAND battery tester between 2.5 and 3.85 V. Again no (ionic) liquid or gel electrolyte was used. A reference full-cell was also constructed using a carbon-coated Cu foil as the Li host. Prior to testing, 1× excess Li was also pre-deposited into the Li host of the reference full-cell.

FIG. 47A shows the charge/discharge profile at 0.1 C of the two full-cells. FIG. 47B shows the capacity and CE of the full-cells as a function of the cycling number. The pink line represents the full-cell with the carbonaceous MIEC beehive, and the green line represents the reference full-cell. When compared to the reference full-cell, the full-cell with the carbonaceous MIEC beehive shows a lower overpotential (0.25 V vs 0.45 V), a higher discharge capacity (164 mAh/g vs 123 mAh/g), and a higher CE (99.83% vs 82.22%) at 0.1 C. Furthermore, the full-cell with the carbonaceous MIEC beehive shows little degradation in performance for over 50 cycles with a parsimonious lithium inventory. The full-cell with the carbonaceous MIEC beehive exhibited and average CE of 99.82% and a gravimetric capacity approaching 900 mAh/g (previous all-solid-state batteries yielded a capacity of about 100-300 mAh/g).

FIGS. 48A and 48B further show FESEM images of the carbonaceous MIEC beehive extracted from the full-cell before and after Li plating. As shown, the Li metal was well deposited inside the tubules of the carbonaceous MIEC beehive.

These results show that a practical full-cell device may be constructed using the MIEC 1110 according to theoretically derived design parameters (h=10-100 μm to ensure capacity, W about 100 nm to ensure interfacial Coble creep, w about 10 nm to ensure mechanical robustness, and hermetic soft SE cap for pressurization).

A Third Exemplary Demonstration with a Non-Carbonaceous MIEC Beehive

The MIEC 1110 may be formed from a broad range of materials that are electrochemically stable against the alkali metal 1300. In particular, the MIEC 1110 and the open pore structure 1120 may be configured to transport alkali metal 1300 primarily by an interfacial diffusion mechanism. As described above, this allows for greater flexibility when selecting the material to construct the MIEC 1110 because the electronic and ionic transport properties depend primarily on the structure and dimensions of the open pore structure 1120 rather than the material composition of the MIEC 1110.

To demonstrate the general applicability of the designs and mechanisms described herein, another exemplary MIEC 1110 was fabricated from titanium nitride (TiN). As shown in the equilibrium phase diagram of FIG. 7B, TiN is thermodynamically and electrochemically stable against Li. Thus, when TiN is in naked contact with Li metal, no reactions will occur and no SEI is formed. Additionally, TiN is a mechanically robust material (e.g., TiN is used as anti-wear coatings and drill bits), naturally metallic, and forms an incoherent interface with the Li metal.

A TiN honeycomb MIEC was synthesized by reacting anodized TiO$_2$ template with ammonia gas as shown in FIG. 49A. The TiN MIEC was fabricated to have the same dimensional parameters as the carbonaceous MIEC beehive described previously (e.g., about 10$^{10}$ parallel capped cylinders). FIGS. 49B-49E show various SEM images of an exemplary TiN MIEC. As shown, the MIEC is formed as a closed packed array of TiN tubules in a honeycomb arrangement. The TiN MIEC was found to be mechanically robust. For instance, a cm×cm piece of the MIEC 1110 was readily handled by a user's hands without fracturing. The TiN MIEC also exhibits a hardness up to about 2 GPa based on a nanoindentation test as shown in FIG. 50A. A 1 nm-thick Al$_2$O$_3$ (or ZnO) layer was deposited onto the inner-surface of the TiN MIEC beehive using atomic layer deposition (ALD) to enhance the lithiophilicity of the TiN MIEC beehive.

A half-cell 3000 was assembled with the TiN MIEC using a similar architecture to the carbonaceous MIEC previously described. The half-cell 3000 was tested at 55° C. FIG. 50B shows an exemplary Li plating and stripping voltage profile as a function of the capacity. FIG. 50C shows the overpotential and CE at various current densities. FIG. 50D shows the charge/discharge profiles of the Li/SE/TiN MIEC beehive half-cell 3000 as a function of time. The pink line represents the half-cell 3000 with the TiN MIEC. The green line represents a half-cell with a TiN-coated Ti foil as the Li host. As shown, the half-cell 3000 exhibits a lower overpotential (45 mV vs 250 mV for the reference half-cell at 0.125 mA/cm$^2$), a higher Coulombic efficiency (97% vs 65% for the reference half-cell at 0.125 mA/cm$^2$), and greater cycling stability. The half-cell 3000 was also able to cycle a large amount of Li metal with an areal capacity of 1.5 mAh/cm$^2$, which is substantially higher than previous all-solid batteries (typically less than 0.5 mAh/cm$^2$).

An all-solid-state full-cell was also assembled using the TiN MIEC. Specifically, the full cell comprised (1× excess) Li predeposited TiN MIEC beehive/SE/LiFePO$_4$ battery. A 1×excess amount of Li metal was predeposited electrochemically inside the TiN MIEC beehive before the full cell was cycled. FIG. 51A shows an exemplary charge/discharge profile of the full-cell. FIG. 51B shows the cycling life of the full-cell. A reference full-cell was also assembled using TiN-coated Ti foil as the Li host. Compared to the reference full-cell, the full-cell with the TiN MIEC exhibited a lower overpotential (0.17 V vs 0.4 V), a higher discharge capacity (162 mAh/g vs 117 mAh/g), and a higher CE (99.95% vs 85.09%) at 0.1 C. Additionally, the parsimonious excess Li full cell showed almost no degradation and maintained a high average CE up to 99.72% for over 50 cycles. These results show that the design of the MIEC 1110 and the transport mechanisms within the open pore structure 1120 are applicable to a broad range of materials.

FIGS. 52A-52C shows another exemplary MIEC 1110 formed from anodized aluminum oxide (AAO). FIG. 52A shows an image of a cm×cm piece of the AAO MIEC. FIGS. 52B and 52C show SEM images of the open pore structure formed within the AAO MIEC. As shown, the AAO MIEC may be formed with substantially aligned tubules. FIG. 53A shows yet another exemplary MIEC formed from a silicon mesh. FIGS. 53B-53D show the silicon MIEC may have highly aligned tubules arranged in a closed pack array.

MIEC Chemical Compositions

In some implementations, any of the MIECs described above may be formed from various binary, tertiary, or quaternary compound materials having a particular set of properties. These properties include electronic conductivity ($>10^6$ S/m), electrochemical stability against the alkali metal, and electrochemical stability against the solid electrolyte. Electrochemical stability of the MIEC against the alkali metal reduces or substantially prevents the MIEC from decomposing to form fresh SEI at the interface between the MIEC and the alkali metal. Electrochemical stability of the MIEC against the solid electrolyte reduces or substantially prevents the MIEC from decomposing to form fresh SEI at the interface between the MIEC and the solid electrolyte. Electrochemical stability may be evaluated based on thermodynamic stability.

The MIEC material may be computationally chosen from a database (e.g., The Materials Project: A materials genome approach to accelerating materials innovation) using the property criteria above. Specifically, a list of binary, tertiary, and quaternary compounds was generated. From this list, to screen for materials that are electronically conductive, any materials having a bandgap smaller than 3 eV were selected. Electrochemical stability of the MIEC against the alkali metal was screened using equilibrium phase diagrams. Materials with an end-member phase directly connected to an alkali metal by a tie-line in an equilibrium phase diagram were selected. Electrochemical stability of the MIEC against the solid electrolyte was screened using equilibrium phase diagrams and/or through experimentation. Materials with an end-member phase directly connected to the solid electrolyte by a tie-line in an equilibrium phase diagram were selected. Electrochemical stability against the solid electrolyte was screened experimentally by measuring the impedance over time of a bilayer of MIEC and solid electrolyte. Any materials having an impedance change over time less than 20% per hour were selected. The resulting list includes MIEC materials that have all three properties.

FIG. 55 shows an example equilibrium phase diagram between MIEC TiFe and the solid electrolyte $Li_7La_3Zr_2O_{12}$ (LLZO). An electrochemically stable compound is formed when the two compounds are directly connected by a tie-line. As shown, TiFe and LLZO are end-member phases directly connected to each other by a tie-line. Therefore, the MIEC TiFe is electrochemically stable against the solid electrolyte LLZO. For comparison, FIG. 56 shows an equilibrium phase diagram between Li metal and the solid electrolyte LLZO. As shown, Li and LLZO are not directly connected to each other by a tie-line. Instead, there is a lower energy intermediate phase between Li and LLZO, indicating that unstable phases (e.g., $Zr_4O$, $Li_2O$, or $La_2O_3$) may be formed at the interface between Li and LLZO.

In some implementations, the list of MIEC materials is additionally screened to select inexpensive chemical elements. Materials that only include inexpensive chemical elements may be cheaper to produce and may be preferably for large scale production. In one implementation, inexpensive chemical elements may be screened by excluding any lanthanide elements. In another implementation, inexpensive chemical elements may be screened by excluding any rare earth metals. In another implementation, inexpensive chemical elements may be screened by excluding any compounds that include any of the following elements: beryllium, scandium, vanadium, gallium, germanium, krypton, niobium, technetium, ruthenium, palladium, gold, indium, tellurium, xenon, hafnium, tantalum, rhenium, osmium, iridium, platinum, silver, thallium, praseodymium, neodymium, promethium, terbium, dysprosium, thulium, and lutetium.

The accompanying APPENDICES constitute part of the present disclosure. The APPENDICES 1-3 include lists of MIEC materials that may be used as anodes in lithium, sodium, and potassium-based batteries, respectively. The APPENDICES include the chemical formulas, Materials Project identification number ("Material ID"), bandgaps (eV), density (g/cm$^3$), price (USD), number of atoms in the compound, and price per atom for each of the MIEC materials. Compound price was calculated using prices of each element in in the compound. For example, if the prices of elements A and B are PA and PB, respectively, the price for $A_2B_3$ is $2 \times P_A + 3 \times P_B$. The price per atom is the compound price divided by the number of atoms in the compound's chemical formula. For example, for the compound $A_2B_3$, the price per atom is $(2 \times P_A + 3 \times P_B)/(2+3)$. The price per atom is a way of comparing prices between compounds with different numbers of atoms, since a compound with a fewer number of atoms will likely have a lower compound price, as calculated here, than a compound with a higher number of atoms.

All of the materials in the APPENDICES have an energy above hull equal to zero, indicating thermodynamic stability.

The MIEC material may include an aluminum (Al) alloy. For example, the MIEC material may be formed from aluminum alloyed with nickel, cobalt, iron, molybdenum, or vanadium.

The MIEC material may include a barium (Ba) compound. For example, the MIEC material may be formed from a barium compound including sodium, mercury, lead, boron, carbon, copper, lithium, or strontium.

The MIEC material may include beryllium (Be) or a beryllium compound. For example, the beryllium compound may include carbon or copper.

The MIEC material may include a calcium (Ca) compound. For example, the calcium compound may include gallium, copper, nitrogen, silicon, zinc, boron, beryllium, copper, magnesium, or nickel.

The MIEC material may include cerium (Ce) or a cerium compound. For example, the cerium compound may include carbon, gallium, silicon, aluminum, boron, copper, gallium, nitrogen, or zinc.

The MIEC material may include cobalt (Co) or a cobalt compound. For example, the cobalt compound may include nickel, tungsten, or boron.

The MIEC material may include chromium (Cr) or a chromium compound. For example, the chromium compound may include carbon, boron, silicon, or nickel.

The MIEC material may include cesium (Ce) or a cesium compound. For example, the cesium compound may include carbon.

The MIEC material may include erbium (Er) or an erbium compound. For example, the erbium compound may include aluminum, carbon, gallium, boron, or nitrogen.

The MIEC material may include europium (Eu) or a europium compound. For example, the europium compound may include nitrogen, gallium, silicon, boron, carbon, or mercury.

The MIEC material may include iron (Fe) or an iron compound. For example, the iron compound may include cobalt, boron, cobalt, silicon, boron, or nickel.

The MIEC material may include gadolinium (Ga) or a gadolinium compound. For example, the gadolinium compound may include boron, carbon, indium, aluminum, boron, gallium, or nitrogen.

The MIEC material may include hafnium (Hf) or a hafnium compound. For example, the hafnium compound may include nitrogen or carbon.

The MIEC material may include holmium (Ho) or a holmium compound. For example, the holmium compound may include aluminum, carbon, gallium, or boron.

The MIEC material may include potassium (K) or a potassium compound. For example, the potassium compound may include carbon.

The MIEC material may include lithium (Li) or a lithium compound. For example, the lithium compound may include indium, chromium, nitrogen, lead, tin, silicon, aluminum, calcium, nitrogen, cerium, europium, gallium, gadolinium, tellurium, hafnium, holmium, neodymium, samarium, ytterbium, yttrium, zinc, copper, zirconium, cadmium, mercury, scandium, titanium, molybdenum, manganese, boron, beryllium, cobalt, erbium, magnesium, and/or nickel.

The MIEC material may include a magnesium (Mg) compound. For example, the magnesium compound may include copper or nickel.

The MIEC material may include manganese (Mn) or a manganese compound. For example, the manganese compound may include carbon, boron, chromium, cobalt, niobium, silicon, iron, aluminum, nickel and/or vanadium.

The MIEC material may include molybdenum (Mo) and/or sodium (Na).

The MIEC material may include niobium (Nb) or a niobium compound. For example, the niobium compound may include boron, nitrogen, cobalt, chromium, iron, nickel, vanadium, and/or tungsten.

The MIEC material may include neodymium (Nd) or a neodymium compound. For example, the neodymium compound may include boron, carbon, cobalt, gallium, silicon, aluminum, copper, nitrogen, or zinc.

The MIEC material may include nickel (Ni) or a nickel compound. For example, the nickel compound may include boron, molybdenum, or tungsten.

The MIEC material may include rubidium (Rb) or a rubidium compound. For example, the rubidium compound may include carbon.

The MIEC material may include scandium (Sc) or a scandium compound. For example, the scandium compound may include iron, silicon, aluminum, carbon, cobalt, gallium, indium, boron, copper, nitrogen, and/or zinc.

The MIEC material may include samarium (Sm) or a samarium compound. For example, the samarium compound may include boron, carbon, gallium, silicon, aluminum, boron, copper, or nitrogen.

The MIEC material may include strontium (Sr) or a strontium compound. For example, the strontium compound may include lithium, mercury, cobalt, nitrogen, tellurium, lead, chromium, calcium, silicon, tin, or magnesium.

The MIEC material may include tantalum (Ta) or a tantalum compound. For example, the tantalum compound may include aluminum, beryllium, nitrogen, silicon, or tungsten.

The MIEC material may include titanium (Ti) or a titanium compound. For example, the titanium compound may include manganese, carbon, cobalt, copper, gallium, manganese, iron, nickel, nitrogen, zinc, aluminum, and/or boron.

The MIEC material may include vanadium (V) or a vanadium compound. For example, the vanadium compound may include boron, carbon, chromium, iron, nickel, cobalt, silicon, and/or tungsten.

The MIEC material may include tungsten (W) or a tungsten compound. For example, the tungsten compound may include carbon.

The MIEC material may include yttrium (Y) or an yttrium compound. For example, the yttrium compound may include nickel, carbon, cobalt, gallium, lead, silicon, tin, aluminum, boron, copper, iron, magnesium, manganese, zinc, or nitrogen.

The MIEC material may include ytterbium (Yb) or an ytterbium compound. For example, the ytterbium compound may include carbon, gallium, silicon, nitrogen, boron, indium, tellurium, aluminum, copper, or mercury.

The MIEC material may include zirconium (Zr) or a zirconium compound. For example, the zirconium compound may include carbon, copper, beryllium, nitrogen, silicon, iron, scandium, manganese, or nickel.

FIG. 56 shows the relationship between anode thickness and porosity for MIECs with different areal capacities. The graph shows the anode minimum anode thickness needed for a given MIEC porosity and desired areal capacity. The three exemplary areal capacities are 3.4 mAh cm$^{-2}$, 4 mAh cm$^{-2}$, and 6 mAh cm$^{-2}$. The trends show that MIECs with higher porosity can have the desired areal capacities with smaller thickness as compared to MIECS with lower porosity. For example, for an areal capacity of 6 mAh cm$^{-2}$, a 150 μm thick MIEC can have 20% porosity or higher. On the other hand, an anode approaching a porosity of 100% can be as thin as 30 μm in thickness. The graph compares the MIEC trends to a graphite anode with a thickness of 67 μm, illustrating that MIECs thinner than 67 μm may have an areal capacity of 6 mAh cm$^{-2}$ with porosities of about 45% or higher.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. I, is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A mixed ionic-electronic conductor (MIEC) in contact with a solid electrolyte comprising:
    a material having a bandgap less than 3 eV, the material comprising an end-member phase directly connected to an alkali metal by a tie-line in an equilibrium phase diagram, and the material being thermodynamically stable with the solid electrolyte; and
    a plurality of open pores, formed within the MIEC, to facilitate motion of the alkali metal to at least one of store the alkali metal in the plurality of open pores or release the alkali metal from the plurality of open pores, wherein the solid electrolyte has an ionic conductivity to ions of the alkali metal greater than 1 mS cm$^{-1}$, a thickness less than 100 µm, and comprises at least one of a ceramic or a polymer.

2. The MIEC of claim 1, wherein the material excludes any lanthanides.

3. The MIEC of claim 1, wherein the material excludes any rare earth metals.

4. The MIEC of claim 1, wherein:
    the solid electrolyte comprises the polymer; and
    the polymer comprises at least one of, a polyacetal, a polyolefin, a poly (alkylene oxide), a polymethacrylate, a polycarbonate, a polystyrene, a polyester, a polyamide, a polyimide, a polyarylate, a polyarylsulfone, a polyethersulfone, a polyphenylene sulfide, a polyvinyl chloride, a polysulfone, a polytetrafluoroethylene, a polyetherketone, a polybenzoxazole, a polyphthalide, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfonamide, a polyurea, a polyphosphazene, a polysilazane, a polyurethane, an ethylene propylene diene rubber, a fluorinated ethylene propylene, a perfluoroalkoxyethylene, a polychlorotrifluoroethylene, or a polyvinylidene fluoride.

5. The MIEC of claim 1, wherein:
the solid electrolyte comprises the ceramic; and
the ceramic comprises at least one of:
- $Li_7La_3Zr_2O_{12}$;
- $Li_3OX$ wherein X is at least one of Cl, Br, or I;
- $Li_3SX$ wherein X is at least one of Cl, Br, or I;
- $Li_{1.3}Al_{0.3}Ti_{1.7}(PO_4)_3$;
- $Li_{10}MP_2S_{12}$ wherein M is at least one of Ge, Si, or Sn;
- $Li_3PS_4$;
- $Li_7P_3S_{11}$;
- $Li_3N$;
- $Li_2S$;
- $LiBH_4$;
- $Li_3BO_3$;
- $Li_2S-P_2S_5$;
- $Li_2S-P_2S_5$-L4SiO_4$;
- $Li_2S-Ga_2S_3$-$GeS_2$;
- $Li_2S-Sb_2S_3$-$GeS_2$;
- $Li_{3.25}-Ge_{0.25}-P_{0.75}S_4$;
- $(La_{1-x}Li_x)TiO_3$ wherein $0<x<1$;
- $Li_6La_2CaTa_2O_{12}$;
- $Li_6La_2ANb_2O_{12}$ wherein A is at least one of Ca, Sr, or Ba;
- $Li_6La_3Zr_{1.5}WO_{12}$;
- $Li_{6.5}La_3Zr_{1.5}TaO_{12}$;
- $Li_{6.625}Al_{0.25}La_3Zr_2O_{12}$;
- $Li_3BO_{2.5}N_{0.5}$;
- $Li_9SiAlO_8$;
- $Li_{1+x}Al_xGe_{2-x}(PO_4)_3$ wherein $0<x<1$;
- $Li_{1+x}Al_xTi_{2-x}(PO_4)_3$ wherein $0<x<1$;
- $Li_{1+x}Ti_{2-x}Al_xSi_y(PO_4)_{3-y}$ wherein $0<x<1$ and $0\le y<1$;
- $LiAl_xZr_{2-x}(PO_4)_3$ wherein $0<x<2$;
- $LiTi_xZr_{2-x}(PO_4)_3$ wherein $0<x<2$;
- $Li_6PS_5X$, wherein X is at least one of Cl, Br, or I; or
- $Li_7In_xSc_{0.666-x}Cl_4$ wherein $0\le x\le 0.666$.

6. An anode comprising:
the mixed ionic-electronic conductor (MIEC) of claim 1, wherein the MIEC does not reversibly store and release the alkali metal.

7. The anode of claim 6, wherein:
the MIEC has a thickness of about 0.5 μm to about 67 μm;
the MIEC has a porosity greater than 45%; and
the anode has an areal capacity of about 6+0.5 mAh cm$^{-2}$.

8. The anode of claim 6, further comprising the alkali metal.

9. A battery comprising:
the anode of claim 6; and
the solid electrolyte.

10. An anode comprising a mixed ionic-electronic conductor (MIEC), the MIEC comprising:
at least one of $A_xB_y$, $A_xB_yC_z$, or $A_xB_yC_zD_w$; and
a plurality of open pores, formed within the MIEC, to facilitate motion of an alkali metal to at least one of store the alkali metal in the plurality of open pores or release the alkali metal from the plurality of open pores,
wherein:
the MIEC does not reversibly store and release the alkali metal;
the at least one of $A_xB_y$, $A_xB_yC_z$, or $A_xB_yC_zD_w$ comprises an end-member phase directly connected to an alkali metal by a tie-line in an equilibrium phase diagram;
A is the alkali metal;
at least one of B, C, or D is at least one of an alkaline earth metal, a group 13 element, Sc, Y, Ti, Zr, Hf, V, Nb, Ta, Cr, Mo, W, Mn, Fe, Co, Ni, Cu, Zn, Cd, Hg, C, N, Si, Sn, Pb, Bi, La, Ce, Nd, Sm, Eu, Gd, Ho, Er, or Yb; and
x, y, z, and w each have a value of about 1 to about 149.

11. The anode of claim 10, wherein B, C, and D is each at least one of the alkaline earth metal, the group 13 element, Sc, Y, Ti, Zr, Hf, V, Nb, Ta, Cr, Mo, W, Mn, Fe, Co, Ni, Cu, Zn, Cd, Hg, C, N, Si, Sn, Pb, Bi, La, Ce, Nd, Sm, Eu, Gd, Ho, Er, or Yb.

12. The anode of claim 10, wherein B is the alkaline earth metal.

13. The anode of claim 10, wherein B is the group 13 element.

14. The anode of claim 10, wherein B is a period 4 transition metal.

15. The anode of claim 10, wherein B is a period 5 transition metal.

16. The anode of claim 10, wherein B is a period 6 transition metal.

17. The anode of claim 10, wherein B is a lanthanide.

18. The anode of claim 10, wherein the alkali metal comprises at least one of lithium (Li), sodium (Na), or potassium (K).

19. An anode, comprising:
a mixed ionic-electronic conductor (MIEC) comprising $Ti_wAlC_yNi_z$; and
a plurality of open pores, formed within the MIEC, to facilitate motion of an alkali metal to at least one of store the alkali metal in the plurality of open pores or release the alkali metal from the plurality of open pores,
wherein x, y, z, and w each have a value less than or equal to 8.

20. A battery comprising:
the anode of claim 19; and
a solid electrolyte, coupled to a portion of the MIEC, the solid electrolyte comprising polyethylene oxide (PEO).

* * * * *